(12) United States Patent
Graves

(10) Patent No.: US 9,860,614 B2
(45) Date of Patent: Jan. 2, 2018

(54) SYSTEM AND METHOD FOR HYBRID PHOTONIC ELECTRONIC SWITCHING

(71) Applicant: Huawei Technologies Co., Ltd., Shenzhen (CN)

(72) Inventor: Alan Frank Graves, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 14/711,098

(22) Filed: May 13, 2015

(65) Prior Publication Data

US 2016/0337723 A1    Nov. 17, 2016

(51) Int. Cl.
*H04J 14/00* (2006.01)
*H04Q 11/00* (2006.01)

(52) U.S. Cl.
CPC ..... *H04Q 11/0003* (2013.01); *H04Q 11/0005* (2013.01); *H04Q 2011/005* (2013.01); *H04Q 2011/0045* (2013.01)

(58) Field of Classification Search
CPC ........... H04Q 11/0003; H04Q 11/0005; H04Q 2011/0045; H04Q 11/0066; H04Q 2011/0039; H04Q 2011/005; H04L 47/628; H04L 45/74; H04L 49/10; H04L 49/9042
USPC ............................ 398/45, 51, 54, 49, 50, 46
See application file for complete search history.

(56) References Cited

U.S. PATENT DOCUMENTS

| 7,369,555 | B2 * | 5/2008 | Jarl ..................... H04L 12/5601 370/389 |
| 8,971,321 | B2 * | 3/2015 | Graves ............... H04Q 11/0005 370/389 |
| 9,282,384 | B1 * | 3/2016 | Graves ............... H04Q 11/0005 |
| 9,654,849 | B2 * | 5/2017 | Graves ............... H04Q 11/0003 |
| 9,654,853 | B2 * | 5/2017 | Mehrvar ........... H04Q 11/0066 |
| 2002/0101919 | A1 | 8/2002 | Takada et al. |
| 2002/0191250 | A1 | 12/2002 | Graves et al. |
| 2003/0026262 | A1 | 2/2003 | Jarl |

(Continued)

FOREIGN PATENT DOCUMENTS

CN    1451211 A    10/2003
CN    101601209 A    12/2009

OTHER PUBLICATIONS

A Hybrid Photonic-Electronic Switching Architecture for Next Generation Datacenters. Bernier et al. © 2015.*

(Continued)

*Primary Examiner* — Hibret Woldekidan
(74) *Attorney, Agent, or Firm* — Slater Matsil, LLP

(57) ABSTRACT

A method includes comparing a length of a first packet to a threshold, determining that the first packet is a short packet when the length of the first packet is less than the threshold, and determining that the first packet is a long packet when the length of the first packet is greater than or equal to the threshold. The method also includes when the first packet is a long packet placing the first packet in a long packet container and transmitting the long packet container to a photonic switch. Additionally, the method includes when the first packet is a short packet placing a first portion of the first packet in a first short packet container, where the first short packet container includes a sequence number, a source top-of-rack switch (TOR) address, and a destination TOR address and transmitting the first short packet container to an electronic switch.

18 Claims, 29 Drawing Sheets

(56) References Cited

U.S. PATENT DOCUMENTS

| | | |
|---|---|---|
| 2006/0053221 A1 | 3/2006 | Matsui et al. |
| 2006/0165416 A1 | 7/2006 | Moursund et al. |
| 2007/0025731 A1 | 2/2007 | Schofield et al. |
| 2008/0205901 A1 | 8/2008 | Bai et al. |
| 2009/0168723 A1 | 7/2009 | Meylan |
| 2012/0051747 A1 | 3/2012 | Haran et al. |
| 2013/0229916 A1 | 9/2013 | Isobe et al. |
| 2014/0269351 A1* | 9/2014 | Graves .................. H04L 49/10 370/250 |
| 2014/0334818 A1 | 11/2014 | Mehrvar |
| 2014/0334819 A1 | 11/2014 | Mehrvar et al. |
| 2014/0355977 A1* | 12/2014 | Bjornstad .......... H04Q 11/0062 398/25 |
| 2015/0263945 A1* | 9/2015 | Blessing ................ H04L 45/74 370/392 |
| 2015/0289035 A1* | 10/2015 | Mehrvar ............... H04L 49/356 398/51 |
| 2016/0044393 A1* | 2/2016 | Graves ............... H04Q 11/0003 398/51 |
| 2016/0065484 A1 | 3/2016 | Suzuki et al. |
| 2016/0334575 A1 | 11/2016 | Graves et al. |
| 2016/0337723 A1 | 11/2016 | Graves |
| 2016/0337725 A1 | 11/2016 | Graves |
| 2016/0337731 A1 | 11/2016 | Graves |

OTHER PUBLICATIONS

Benson, T., et al., "Understanding Data Center Traffic Characteristics," WREN '09, Barcelona, Spain, Aug. 21, 2009, 8 pgs.

\* cited by examiner

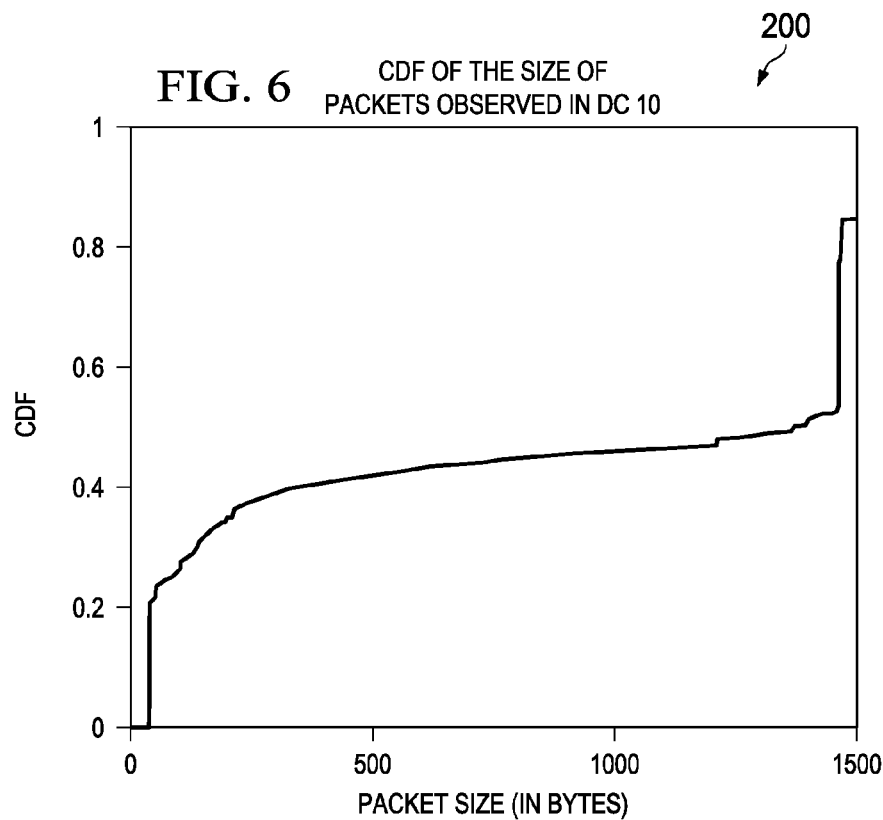
FIG. 6 CDF OF THE SIZE OF PACKETS OBSERVED IN DC 10
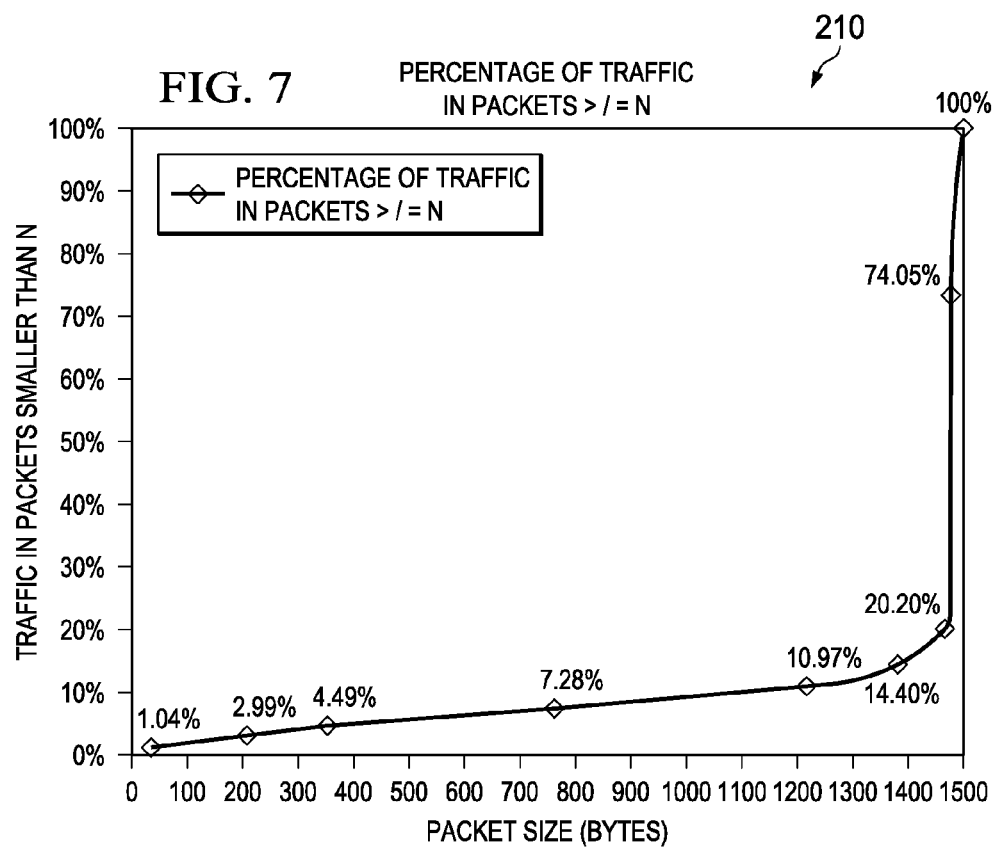
FIG. 7 PERCENTAGE OF TRAFFIC IN PACKETS > / = N

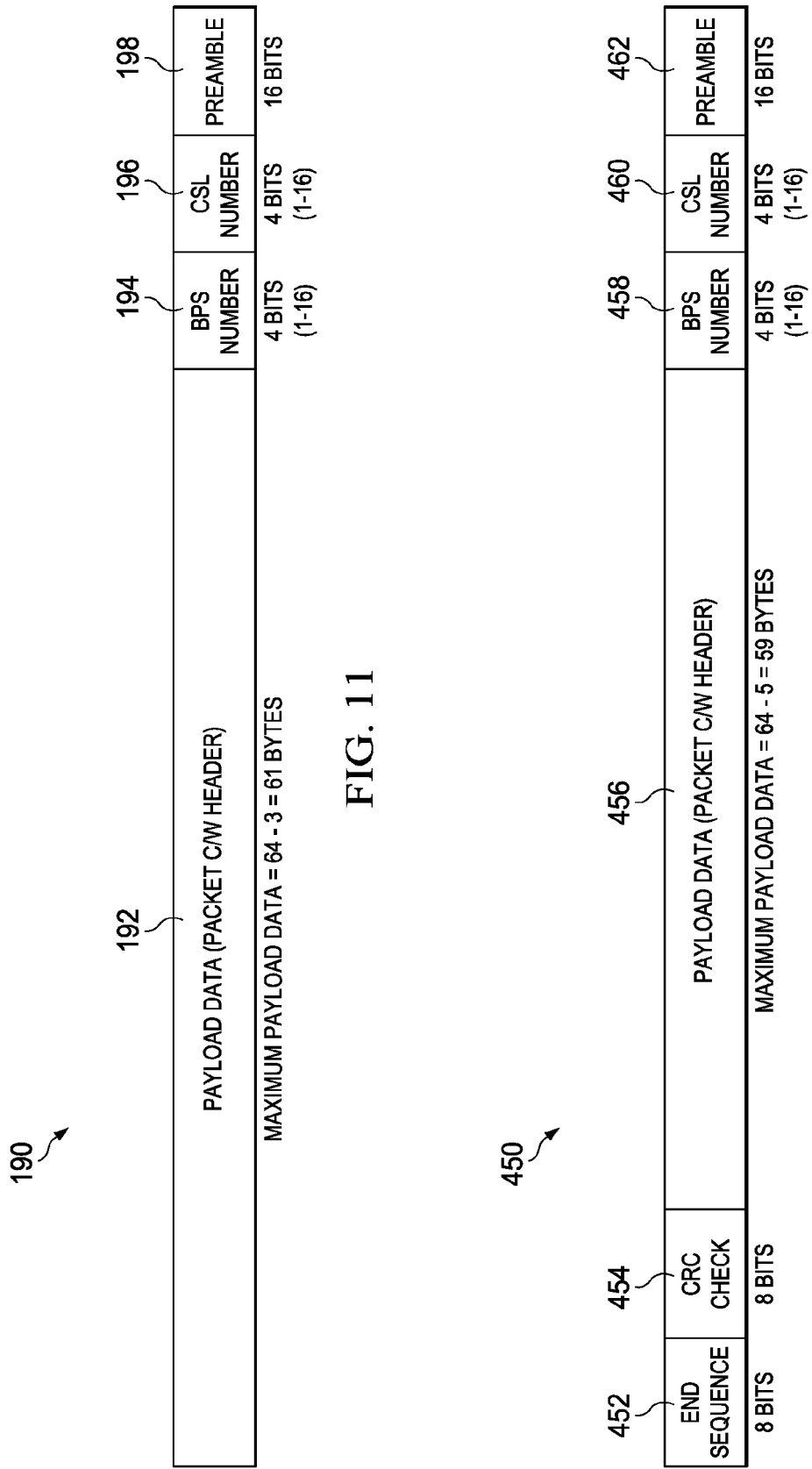

SYSTEM AND METHOD FOR HYBRID PHOTONIC ELECTRONIC SWITCHING

TECHNICAL FIELD

The present invention relates to a system and method for switching, and, in particular, to a system and method for hybrid photonic electronic switching.

BACKGROUND

Data centers route massive quantities of data. Currently, data centers may have a throughput of 5-10 terabytes per second, which is expected to increase in the future. Data centers contain huge numbers of racks of servers, racks of storage devices, and other racks often with top-of-rack (TOR) switches, which are interconnected via massive centralized packet switching resources. In data centers, electrical packet switches are used to route data in these data centers. However, electrical packet switches have capacity limitations.

SUMMARY

An embodiment method includes comparing a length of a first packet to a threshold, determining that the first packet is a short packet when the length of the first packet is less than the threshold, and determining that the first packet is a long packet when the length of the first packet is greater than or equal to the threshold. The method also includes when the first packet is a long packet placing the first packet in a long packet container and transmitting the long packet container to a photonic switch. Additionally, the method includes when the first packet is a short packet placing a first portion of the first packet in a first short packet container, where the first short packet container includes a sequence number, a source top-of-rack switch (TOR) address, and a destination TOR address and transmitting the first short packet container to an electronic switch.

An embodiment switching structure includes an electronic switch fabric, where the electronic switch fabric includes a first plurality of rectangular orthogonal multiplexers, where the first plurality of rectangular orthogonal multiplexers is configured to receive a first plurality of container streams to produce a plurality of organized containers and a plurality of electronic switching cells electrically coupled to the first plurality of rectangular orthogonal multiplexers, where a switching cell of the plurality of switching cells is a time division multiplexing (TDM) switch, and where the plurality of electronic switching cells is configured to switch the plurality of organized containers to produce a plurality of switched containers. The electronic switching fabric also includes a second plurality of rectangular orthogonal multiplexers electrically coupled to the plurality of electronic switching cells, where the second plurality of rectangular orthogonal multiplexers are configured to output a plurality of output containers.

An embodiment method includes receiving a first address request for a first output port in a first timeslot on a first bus and receiving a second address request for the first output port in the first timeslot on the first bus. The method also includes detecting a collision between the first address request and the second address request and writing the first address request to an electronic switching structure. Additionally, the method includes transmitting a negative acknowledgment message (NACK) corresponding to the second address request.

An embodiment method includes receiving, from an electronic switch, a first container, where the first container includes a first sequence number and extracting a first packet payload from the first container. The method also includes determining a first packet in accordance with the first packet payload and receiving, from a photonic switch, a second container, where the second container includes a second sequence number. Additionally, the method includes extracting a second packet from the second container and reconstructing a packet stream including the first packet and the second packet in accordance with the first sequence number and the second sequence number.

An embodiment includes comparing a length of a first packet to a threshold, determining that the first packet is a short packet when the length of the first packet is less than the threshold, and determining that the first packet is a long packet when the length of the first packet is greater than or equal to the threshold. The method also includes when the first packet is a long packet placing the packet in a long packet container, where the long packet container only contains one packet and transmitting the long packet container to a first synchronous framed switch. Additionally, the method includes when the first packet is a short packet placing the packet in a short packet container, where the short packet container only contains one packet and transmitting the short packet container to a second synchronous framed switch.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 illustrates a graph of cumulative density function (CDF) of packet size in a data center (DC);

FIG. 7 illustrates a graph of the percentage of packets smaller than a given packet size;

FIG. 11 illustrates an embodiment intermediate concatenated short packet container;

FIG. 12 illustrates an embodiment ending concatenated short packet container;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
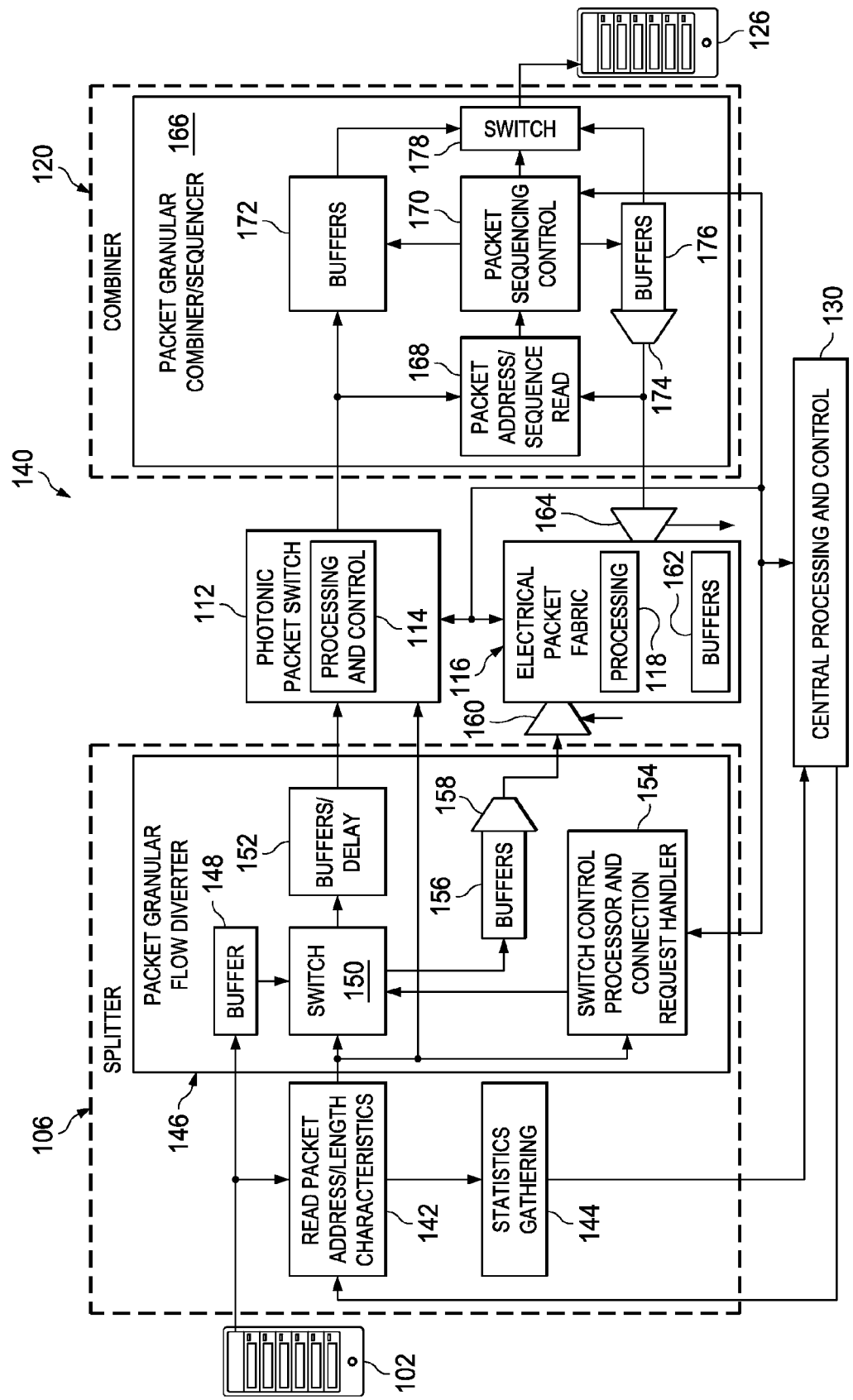
FIG. 1 illustrates an embodiment hybrid photonic electronic switching system.

It should be understood at the outset that although an illustrative implementation of one or more embodiments are provided below, the disclosed systems and/or methods may be implemented using any number of techniques, whether currently known or later developed. The disclosure should in no way be limited to the illustrative implementations, drawings, and techniques illustrated below, including the designs and implementations illustrated and described herein, but may be modified within the scope of the appended claims along with their full scope of equivalents.

In an embodiment data center core data switch, hybrid photonic electronic packet switching is used. A photonic switch switches a majority of the bandwidth. An input packet stream is split into two packet streams based on the length of the individual packets; the photonic switch switches the long packet stream, which contains the majority of the bandwidth, for example between 85% to 95% of the bandwidth, depending on the packet length threshold, and the electronic switch switches the short packet stream, which contains the remaining 5% to 15% of the bandwidth. Thus, the electronic switch bandwidth is between 15/85 and 5/95 of the photonic switch bandwidth (i.e. 1/5.7 to 1/19) of the photonic switch bandwidth. Thus, the electronic switch may be lower capacity and/or a simpler cell switch or ultra-fast time-space circuit switch. The electronic packet switch switches streams using a per-packet container and top-of-rack switch (TOR)-TOR or a hierarchical TOR group-to-TOR group and TOR within group to TOR within group addressing structure which does not affect the overall packet handling.

When switching sub-streams of different types, it is desirable for the switching to be compatible so the streams may be readily recombined after switching. For example, delay, sequencing, and/or traffic identification issues within the sub-streams may cause recombination issues. In one example, when a short packet stream is processed through a packet router, the transmission control protocol (TCP) internet protocol (IP) properties may be modified, and the resultant short packets might not be integrated into the reconstructed stream correctly. Additionally, the use of a full packet or Ethernet frame to switch streams of small packet size with a limited address field size (for TOR-to-TOR switching) may not be well matched.

An IP version 4 (IPv4) packet header may be between 160 bits and 192 bits in length with a 32 bit source address and a 32 bit destination address. With an average short packet length of about 70 bytes, the header would be about 28% to about 34% of the packet bandwidth. A 32 bit address may be translated into a TOR address every time the header is read in a multi-stage buffered packet switch. For TOR-TOR address fields supporting up to 65,536 TORs, a 16 bit address field may be used for a source TOR address and a destination TOR address. Also, the address may be appended to the packet, so the address is retained for use once the packet reaches the destination TOR.

FIG. 1 illustrates system 140 for routing packet streams. Initially, the packet stream is fed to a buffer 148 in packet granular flow diverter 146, which diverts individual packets into one path or another based upon a measured or detected packet attribute, such as packet length, while read packet address and length characteristics module 142 determines the packet address and the length of the packet. The packet address and length are fed to statistics gathering module 144, which gathers statistics to send to control unit 130. Control unit 130 gathers statistics on the mix of packet lengths for non-real time uses, such as dynamic optimization of the packet size threshold value. Switch control processor and connection request handler 154 handles the real time packet-by-packet processes within packet granular flow diverter 146. The packet stream passes through the packet granular flow diverter 146, which contains buffer 148, switch 150, buffer and delay 152, switch control processor and connection request handler 154, buffer 156, and statistical multiplexer 158, under control of switch control processor and connection request handler 154. Packet granular flow diverter 146 may optionally contain an accelerator, which accelerates the packet in time and increases the inter-packet gap of the packet stream.

Buffer 148 stores the packet while the packet address and length are read. Buffer 148 may include an array of buffers, so that packets with different destination addresses (i.e. different packet flows) may be buffered until the appropriate switching fabric output port has capacity available for them without delaying packets in other packet flows with other destination addresses where output port capacity is available. Also, the packet address and length characteristic are fed to read packet address and length characteristics module 142 and to switch control processor and connection request handler 154. The output of switch control processor and connection request handler 154 is fed to switch 150, which is operated based on whether the packet length exceeds or does not exceed the packet size threshold value. Additionally, the packet is conveyed to switch 150, which is set by the output from switch control processor and connection request handler 154 so the packet will be routed to photonic switching fabric 112 or to electrical packet switching fabric 116, depending on whether the packet is a large packet or a small packet. For example, the routing is based on the determination by switch control processor and connection request handler 154 based on whether the length of the packet exceeds or does not exceed a set packet length threshold. Switch 150 may be a simple switch. When the packet is routed to photonic switching fabric 112, it is passed to buffer and delay 152, and then to photonic switching fabric 112. Buffer and delay 152 stores the packet until the appropriate destination port of photonic switching fabric 112 becomes available, because of the lack of photonic buffering or storage. Buffer and delay 152 may include an array of buffers to provide buffering and delay for packets going to a particular address or output port which is busy without delaying traffic to other output ports from the photonic switch.

On the other hand, when the packet is routed to electrical packet switching fabric 116, it goes to buffer 156, statistical multiplexer 158, and statistical demultiplexer 160, then to electrical packet switching fabric 116. Buffer 156, which may contain an array of buffers, stores the packets until they are sent to electrical packet switching fabric 116. Electrical packet switching fabric 116 includes processing block 118 and buffers 162. Packets from multiple packet streams may be statistically multiplexed by statistical multiplexer 158, so the ports of electrical packet switching fabric 116 may be better utilized. Statistical multiplexing may be performed to concentrate the short packet streams to a reasonable occupancy, so existing electrical packet switch ports are suitably filled with packets. For example, when the split in packet lengths is set up for an 8:1 ratio in bandwidths for the photonic switching fabric and the electrical packet switching fabric, the links to the electrical packet switching fabric may use 8:1 statistical multiplexing to achieve relatively filled links. This statistical multiplexing introduces additional delay in the short packet path, which may trigger incorrect packet sequencing during the combining process. Then, statistical demultiplexer 160 performs statistical demultiplexing for low occupancy data streams into a series of parallel data buffers.

Photonic switching fabric 112 contains control unit 114. The photonic switching fabric 112 may be a multistage solid state photonic switching fabric created from a series of several stages of solid state photonic switches. In an example, photonic switching fabric 112 is a photonic fast circuit switch suitable for use as a synchronous long packet switch implemented, for example, as a 3 stage or a 5 stage Clos fabric composed of N×N and M×2M monolithic integrated photonic crosspoint chips in silicon or indium phosphide, where N is an integer that may range from about 8 to about 32 and M is an integer that may range from about 8 to about 16. In another example, photonic switching fabric 112 is a matrixed photonic switch.

Electrical packet switching fabric 116 is a fast electronic packet switch. Electrical packet switching fabric 116 may receive packets using statistical demultiplexer 160 and statistically multiplex already switched packets using statistical multiplexer 164. The packets are then demultiplexed by statistical demultiplexer 174 in packet combiner 120. Because the bandwidth flowing through photonic switching fabric 112 is greater than the bandwidth flowing through electrical packet switching fabric 116, the number of links to and from photonic switching fabric 112 may be greater than the number of links to and from electrical packet switching fabric 116.

The switched packets from photonic switching fabric 112 and electrical packet switching fabric 116 are fed to packet combiner 120, which combines the two switched packet streams. Packet combiner 120 contains packet granular combiner and sequencer 166. The photonic packet stream is fed to buffer 172 to be stored, while the address and sequence is read by packet address and sequence reader 168, which determines the source and destination address and sequence number of the photonic packet. The electrical packet stream is also fed to statistical demultiplexer 174 to be statistically demultiplexed and to buffer 176 to be stored, while its characteristics are determined by the packet address and sequence reader 168. Then, packet address and sequence reader 168 determines the sequence to read packets from buffer 172 and buffer 176 based on interleaving packets from both paths to restore a sequential sequence numbering of the packets in each packet flow, so the packets of the two streams are read out in the correct sequence. The packet sequencing control unit 170 releases the packets in each flow in their original sequence. As the packets are released by packet sequence control unit 170, they are combined using switch 178, which may be a simple switch.

Splitter 106 may be integrated in TOR switch 102, and packet combiner 120 may be implemented in TOR switch 126. Also, packet granular combiner and sequencer 166 may optionally contain a decelerator, which decelerates the packet stream in time, decreasing the inter-packet gap. For example, a decelerator may reduce the inter-packet gap to the original inter-packet gap before the accelerator. Additional details on a hybrid photonic electronic packet switching system, such as the system illustrated in FIG. 1, are included in U.S. patent application Ser. No. 13/902,008 entitled, "System and Method for Steering Patent Streams," submitted on May 24, 2013, which this application incorporates hereby by reference.

In one example of hybrid photonic electronic packet switching, entire long packets, including the header structure, are switched through the photonic switch. The long packets are padded and containerized with a TOR-TOR or TOR-group-TOR group addressing. The acceleration level depends on the length of the smoothing buffer, and may be combined with packet acceleration for increasing the inter-packet gap (IPG) or inter-container gap (ICG) for more time for setting up the photonic switch and handling timing skew. Additional details on controlling optical switch setup times are included in U.S. patent application Ser. No. 14/455,034 and U.S. patent application Ser. No. 14/508,676 filed on Oct. 7, 2014, and entitled "System and Method for Commutation in Photonic Switching," which this application incorporates hereby by reference.

Figure 2:
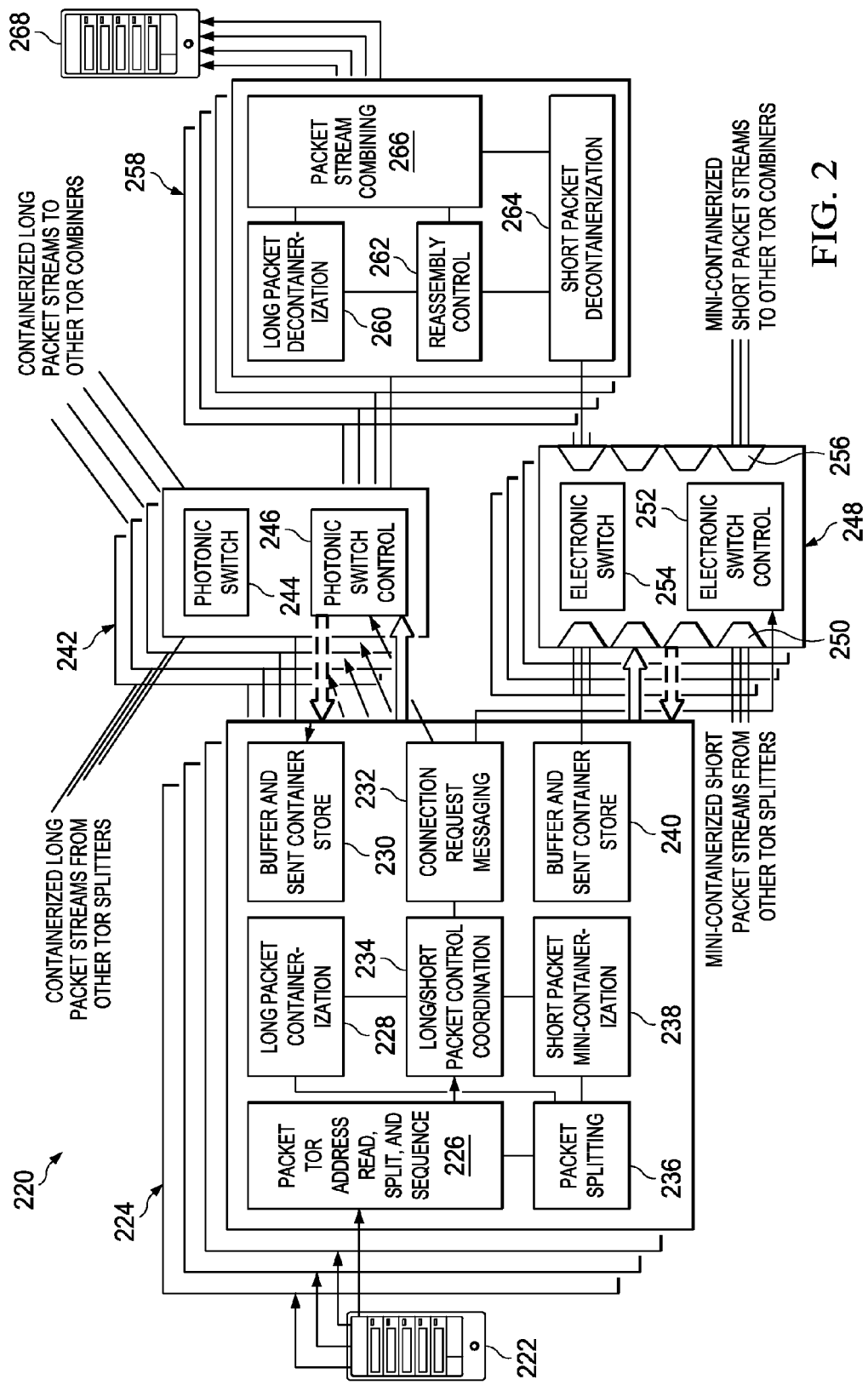
FIG. 2 illustrates another embodiment hybrid photonic electronic switching system.

FIG. 2 shows an embodiment system 220 for hybrid photonic/electronic switching. The switching system includes packet splitters 224, long packet photonic switches 242, electronic switches 248, ultra-fast short container-granular electronic switches with direct addressing, and packet combiners 258. The performance of the system 220 is improved by using compatible switching approaches with individual packet-level containers being switched in fast synchronous switches with source flow control and buffering based on feedback from the switch. The advanced timed connection requests on both paths, combined with a send and store a copy before acknowledgment message (ACK)/negative acknowledgment (NACK) reception approach, facilitates low consistent delay and relatively similar switching times on both paths.

The packet splitters and packet combiners are shown as stand-alone entities, but they may be integrated into the source TORs and destination TORs, respectively. The packet splitter receives the traffic output from the source TOR, which contains packets for all appropriate destination TORs. Then, the packet splitter splits the packet stream into sub-streams based on destination address, allocates sequential sequence numbers to each packet in each sub-stream, and splits each sub-stream into two further sub-streams, based on packet length in address module 226 and packet splitting block 236. One sub-stream contains packets longer than a pre-set or dynamic threshold length, which are packaged into individual long packet containers at a rate of one packet per container, and the other sub-stream contains packets shorter than the threshold, which are packaged into short packet containers or sets of containers at a rate of one short packet per container or one per set of containers. The short packet containers may be sized to approximately match the length of the majority of the short packets, which tend to be at the short end of the overall short packet length range. The containers may be extended or concatenated to carry the longer short packets which may have a length just below the long/short packet threshold.

While the packets are being containerized, an advanced request is sent by the packet splitter connection request module 232 to photonic switch control 246 (for a long packet), or to electronic switch control 252 (for a short packet). By the time the container is ready to be transmitted to the switch fabric, the appropriate switch control has had sufficient time to process the request and establish a connection when available, but not necessarily sufficient time to signal back across the intervening cabling to the packet splitter with an ACK when the connection is available or a NACK when the connection is not available, for example due to output contention, where two or more source TORs simultaneously attempt to connect to the same destination TOR. The packet splitter stores a copy of outgoing packet containers in its sent container stores 230 and 240, retransmits the copy when a NACK is received, or deletes the copy when an ACK is received. Both the electronic and photonic switches are fast synchronous framed circuit switches, which may support a new set of connections every frame, with the types separately matched to the port bit rates and container granularities. Because the electronic short packet streams are fed via serial links to the electronic switch, but the electronic switch switches in a massively parallel very wide bus, the links are converted from serial to massively parallel in orthogonal multiplexers (OM).

After switching, the two sub-streams from the short packet container electronic switch and the long packet container photonic switch are received at the packet combiner 258, where the packets are recovered, and the packet streams are re-integrated using a combination of the packet sequence number and the packet source address, yielding individual correctly packet-sequenced streams for outputting to the destination TOR.

A header and common advanced signaling approach is used, which reflects the duality of an example approach. There is packet-like processing in the packet splitter and packet combiner, with differences in the switching in the two paths. In long packet block 228, the long packets are accelerated and padded out to fixed length payloads, for example 1500 bytes. Also, a container header is formed, which is not a photonic switch header, and contains the source address, destination address, flow sequence number, padding level, cyclic redundancy check (CRC), and other information used at the destination peripheral.

Short packets are carried in shorter payloads, for example between about 70 bytes and about 120 bytes. In short packet block 238, the individual short packets may mapped into concatenated fixed length basic payload container blocks (BPCs).

Signaling requests are streamed to the fast circuit switch controls, for example between about 2 μs and about 5 μs in advance of transmitting the packet, for both packet streams. Parallel pipelined control with orthogonal hardware message mappers forms frame-by-frame flow of connection maps. ACKs and NACKs are returned to the packet splitter. The container is transmitted at a fixed frame time after the connection requests have been transmitted but before the ACK/NACK is received. If an ACK is received, the packet splitter deletes the stored container from the sent container store. If a NACK is received, retransmission of the stored container is initiated at a later time.

The long containers, which may be larger than the packet length threshold and up to the maximum length used by the system (for example 1500 bytes or more), are space switched in photonic switch 244, a non-blocking dilated photonic Clos or other switching fabric with fast pipelined control. Also, short containers are time-space switched in electronic switch 254, a non-blocking directly addressable space-time switch fabric.

In long packet block 260 in the packet combiner, the container header is recovered, the CRC is checked, and the destination is validated. In short packet module 264, the container header is recovered, BPCs are reintegrated, the CRC is checked, and the destination is validated. The sequence number and source address provide a unique identifier (ID) for packet sequence integrity for both the long and short packets. The long and short packets are restored to the correct sequence.

Figure 3:
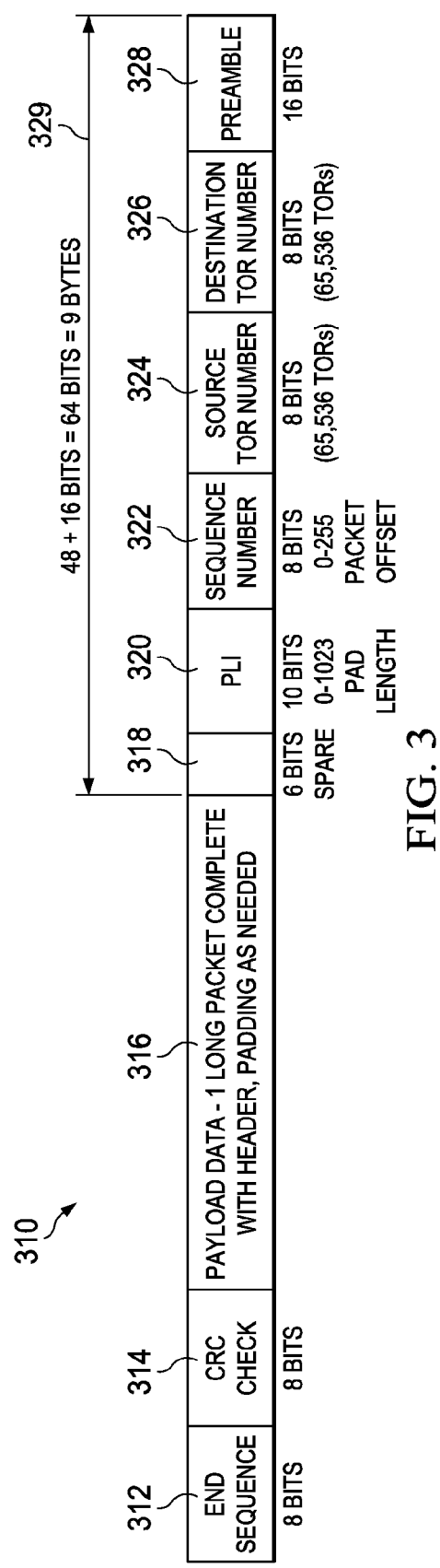
FIG. 3 illustrates an embodiment long packet container.

FIG. 3 illustrates an example long packet container 310 with a header, payload data, and trailer. Payload data 316 contains one long packet, including the packet header, along with padding. The payload data may be slightly over 1500 bytes. The long packet has a length longer than the long packet threshold, which may be between about 400 bytes and about 1000 bytes, and up to the maximum long packet length, which may be 1500 bytes. Long packets which are shorter than the maximum long packet length are padded out to a predetermined length, which may correspond to the maximum long packet length. When the long packet has a length equal to the maximum packet length, additional padding might not be added. The packet clock is accelerated to facilitate the handling of small bursts of packets shorter than the full packet length, which may arrive at the switch more frequently. The header includes preamble 328, destination TOR address 326, source TOR address 324, sequence number 322, PLI 320, and spare bits 318. Preamble 328 may be two bytes of a distinctive sequence. In other examples, a different length preamble, or no preamble, may be used.

Long packet container 310 includes destination TOR address 326 and source TOR address 324, which may each be 16 bits, for addressing up to 65,536 source TORs and 65,536 destination TORs. In one example, the destination TOR address includes 8-12 bits for the destination TOR group number and 4-8 bits for the individual destination TOR number, and the source TOR address includes 8-12 bits for the source TOR group number and 4-8 bits for the individual source TOR number. The complete source TOR address may be used for reconstituting the sequencing integrity when recombining the long and short packet flows. Also, the complete source TOR address may be used in rapid formatting of addresses for return messages.

Sequence number 322, which may be 8 bits for a packet offset between 0 and 255, or may be more bits when a larger range of recoverable offsets is used, in conjunction with the complete source TOR address, restores the order for the source streams at the destination. The sequence number facilitates the flows being reassembled in the correct sequence when the short packet stream is combined with the long packet stream. The sequence numbers are applied according to the destination TOR address, where the sequence number applies to containerized packets destined for the same destination TOR. When reassembling the flow sequence, both the sequence number and the complete source address of the flows are used.

Padding length indicator (PLI) 320 can be 10 bits to support a padding length of 0 to 1023, measured in bytes. The PLI marks the demarcation point between the payload and the padding. The PLI provides a direct figure of the padding length to be removed by the packet combiner at the destination TOR. A padding size range of 0 to 1023 accommodates a range of 0 bytes to 1023 bytes for padding, for a long packet size ranging from 477 bytes to 1500 bytes. Using 10 bits would support any padding length from 0 bytes to 1500 byes.

Six spare bits 318 lead to a long packet container heading 329 with 56 bits, or seven bytes.

The trailer includes end sequence 312 and CRC check 314. An eight bit CRC check 314 may be placed across the container. Alternatively, another length of CRC check, or another method of integrity validation, may be used.

End sequence 312 may be eight bits. Alternatively, another end sequence, for example a two byte distinctive pattern, or no end sequence, may be used. The total overhead is 11 bytes. In other examples, other overhead amounts are used. This container has a total container overhead of 72-80 bits or 9-10 bytes.

In one example, the individual containerization of unmodified packets is used with the short packets to form short packet containers. The short packet container is shorter than the long packet container, and the container header occupies a larger percentage of the bandwidth. The short packet containers may be a fixed length, harmonically related lengths, concatenated fixed lengths, or variable length.

The longest packets, for example 500 byte packets, may arrive at a particular maximum rate. For a 100 Gb/s port, the maximum rate is around 120 ns for a 1500 byte packet. These packets are mapped into containers at a rate of one packet per container. Containers may be supplied at around a 120 ns per container rate, which sets the frame rate for the synchronous photonic switch. However, there is some probability that packets shorter than the maximum length, down to just above the long/short packet length threshold, occur. When adjacent shorter long packets or groups of shorter long packets occur, they may arrive at a rate faster than the arrival rate of the longest packets. For example, at 100 Gb/s with a 1000 byte packet, the arrival rate may be one packet every 80 ns. When the frame rate for the switch is set to 80 ns to accommodate these shorter packets, which arrive very infrequently, and even less frequently arrive as large bursts, the switch would be very inefficient for switching the vast majority of packets, which are close to or at the maximum length. When the shortest packets above the long/short threshold are common, to accommodate the potential maximum arrival rate, 1500 byte compatible containers would be switched every 80 ns instead of every 120 ns for a long/short threshold of 1000 bytes, or every 60 ns instead of every 120 ns for a long/short threshold of 750 bytes. However, the probability of a packet being a short long packet is relatively low, so the probability of a long sequence of such packets is also low. Short bursts of shorter than longest packets may be smoothed to a lower rate in a multi-stage first-in first-out buffer of moderate length for an average clock rate and frame length increase and decrease, respectively, which is much less than the peak rates during the burst of shorter long packets. This relationship depends on the shortest length of packet to be encountered, which is just above the short/long threshold value, the length of the smoothing buffers in packets/containers, and the probability of packet overflow in the buffer, which triggers a packet retransmission. The relationship between these and the resultant clock rate acceleration/padding efficiency is shown in FIGS. 4 and 5 for two different levels of probability of packet overflow.

Figure 4:
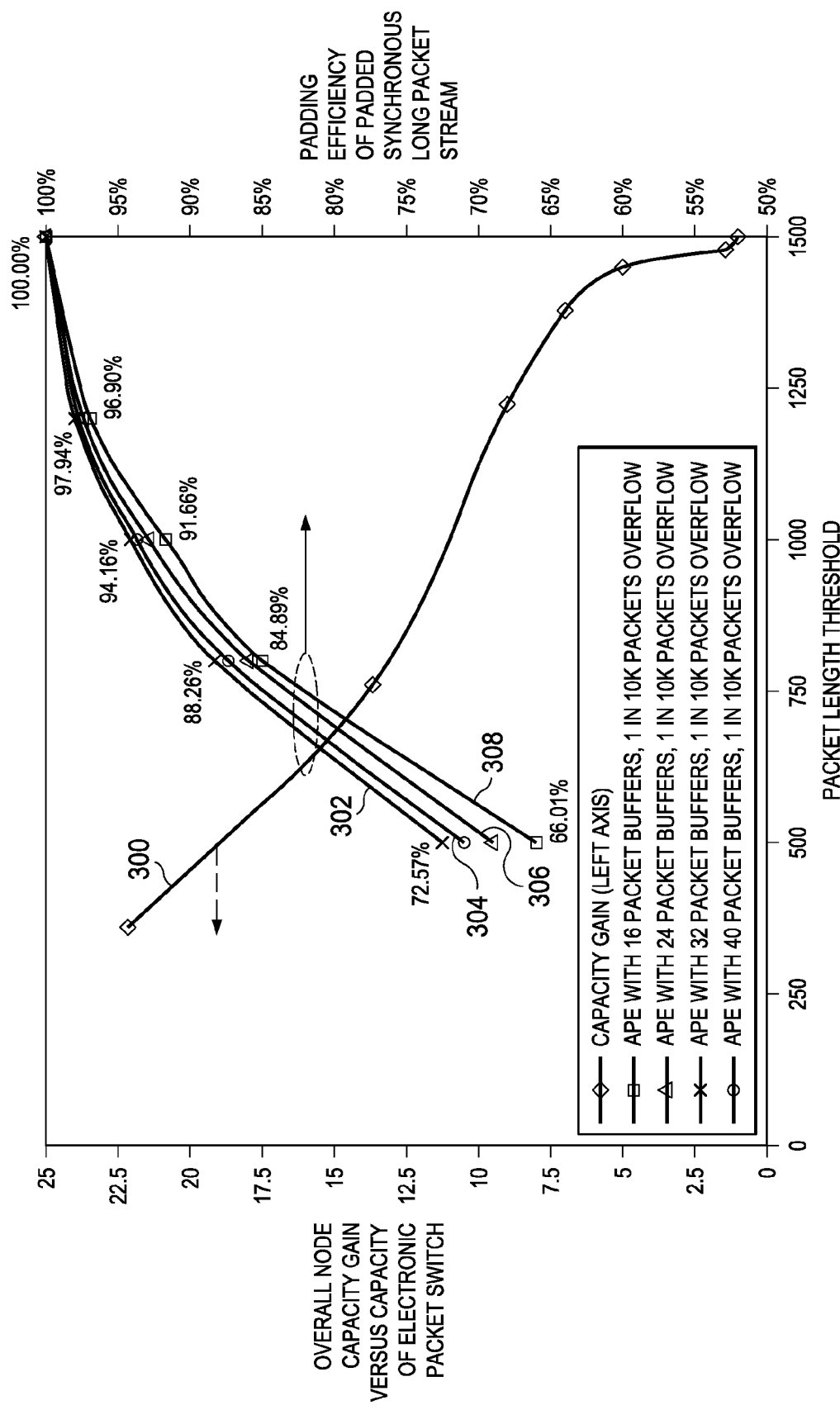
FIG. 4 illustrates another graph of overall node capacity gain versus capacity.

FIG. 4 shows the overall node capacity gain relative to the traffic level of the electronic short packet container fabric and the synchronous circuit switching packet padding efficiency versus packet length threshold for a 0.01% probability of buffer overflow. Curve 300 shows the capacity gain as a function of the packet length threshold. Curve 302 shows the aggregate padding efficiency (APE) with 40 packet buffers, curve 304 shows the padding efficiency with 32 packet buffers, curve 306 shows the padding efficiency with 24 packet buffers, and curve 308 shows the padding efficiency with 16 packet buffers. Longer buffers better improve APE at the expense of delay. There is a trade-off between the delay and the APE, and hence clock rate acceleration. In one example, this delay is set to just below the processing delay of the centralized processing block, resulting in that block setting the overall processing delay.

Figure 5:
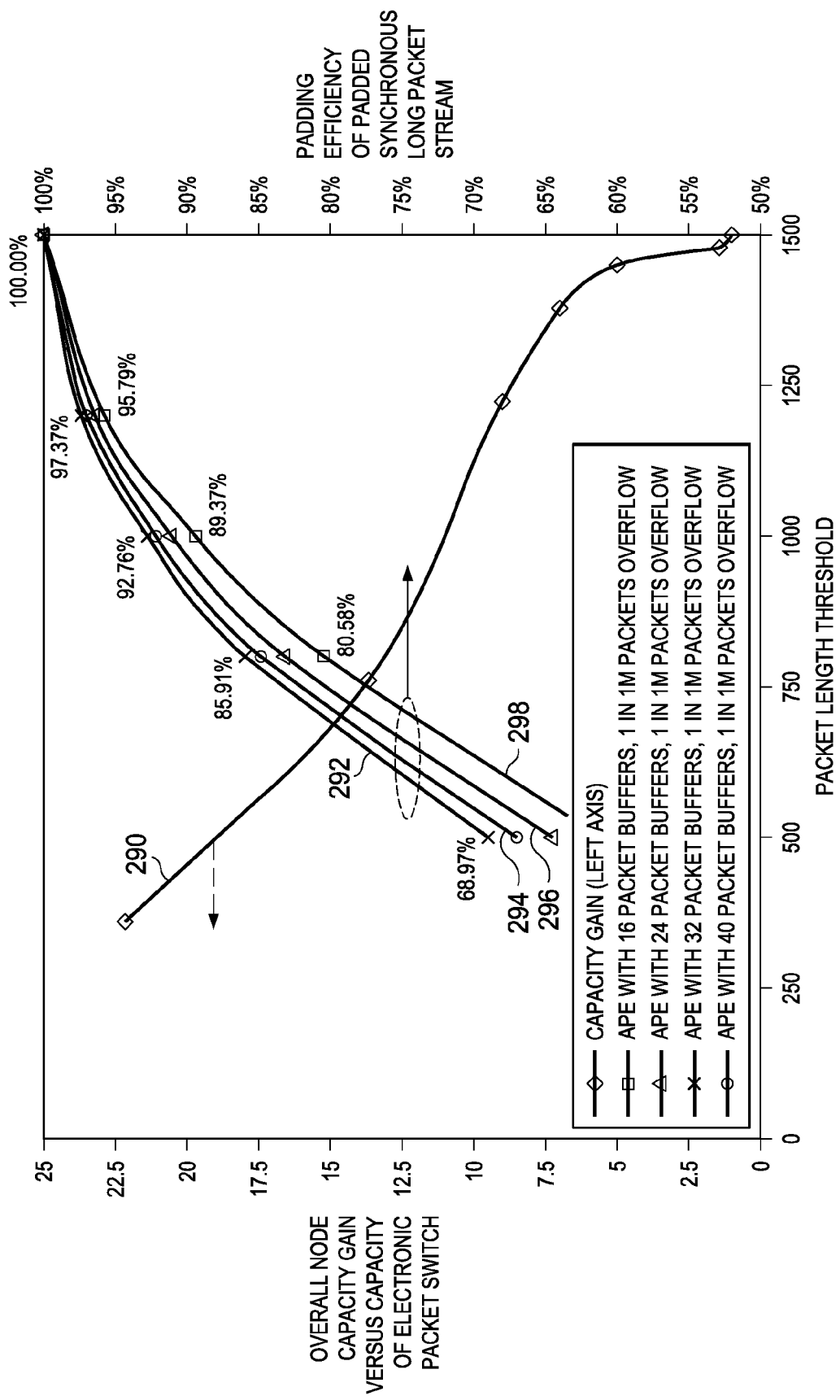
FIG. 5 illustrates an additional graph of overall node capacity gain versus capacity.

FIG. 5 shows the overall node capacity gain relative to the traffic level of the electronic short packet container fabric and the synchronous circuit switching packet padding efficiency versus packet length threshold for a one in 1,000,000 probability of buffer overflow. The padding efficiency is equal to the reciprocal of the clock rate increase. A padding efficiency of 80% has a clock rate acceleration of 125%, and a padding efficiency of 90% has a clock rate acceleration of 111%. Curve 290 shows the capacity gain as a function of the packet length threshold. Curve 292 shows the padding efficiency with 40 packet buffers, curve 294 shows the padding efficiency with 32 packet buffers, curve 296 shows the padding efficiency with 24 packet buffers, and curve 298 shows the padding efficiency with 16 packet buffers.

For short packets, the fixed length container structure supports packet lengths of just under the packet length threshold, for example 499 bytes for a 500 byte threshold or 1199 bytes for a 1200 byte threshold. However, the majority of the short packets are in the 50 to 120 byte range. The short packet traffic includes queries, acknowledgements, security permissions, grants, maintenance messages, etc., which are usually a single short packet transaction. Also, information flows are usually multiple long packets, because the data flows are much larger than the maximum packet size, and are often many orders of magnitude larger than a maximum packet size. Packets in the mid-range include occasional short data flows, remnant packets at the end of long flows, and long queries and instructions. For example, a 1 Megabyte jpg image file would be 667 longest packets, only one of which would be a remnant packet, carrying the tail-end balance of the transfer and the only packet likely to be shorter than a longest packet.

FIG. 6 illustrates graph 200 of a cumulative density function (CDF) of packets being smaller than the packet size, in bytes, for the size of observed packets, measured in a data center. The maximum packet size illustrated in graph 200 is 1500 bytes. Some data centers use larger packets, such as 9,000 byte jumbo packets with a similar bimodal size distribution. There is a bimodal distribution within a concentration of small packets and a concentration of large packets. In graph 200, 45% of the packets have fewer than 500 bytes, 5% of the packets have between 500 bytes and 1400 bytes, and 50% of the packets have over 1400 bytes. Many of the short packets are extremely short, and consist of acknowledgement packets, messages, control, requests, and leftover data. For a packet size of 500 bytes, there is a CDF of 0.42 and for a packet size of 1000 bytes, there is a CDF of 0.48. Thus, only 6% of packets are between 500 bytes and 1000 bytes. In fact, 35% of packets are less than 200 bytes, 50% of packets are greater than 1400 bytes, and only 15% of packets are between 200 and 1400 bytes, which is 80% of the packet size range.

FIG. 7 illustrates graph 210, which is derived from graph 200 by plotting the cumulative percentage of the traffic bandwidth of the percentage of traffic packets for packet size. The percentage of bandwidth that is carried by the short packet path is a function of the long/short packet length threshold. Because the larger packets contain more traffic per packet, most of the traffic bandwidth is in the form of large packets, although there are a significant number of small packets. Graph 210 has the same packet distribution as graph 200. In graph 210, 1.04% of traffic is from packets that are 50 bytes or shorter, 2.99% of the traffic is from packets that are 220 bytes or shorter, 4.49% of the traffic is from packets that are 360 bytes or shorter, 7.28% of the traffic is from packets that are 760 bytes or shorter, 14.40% of the traffic is from packets that are 1380 bytes or shorter, 20.20% of the traffic is from packets that are 1460 bytes or shorter, 74.05% of the traffic is from packets that are 1480 bytes or shorter, and 100.00% of the traffic is from packets that are 1500 bytes or shorter.

In one example, short packets are placed in a fixed length container which accommodates the longest short packet. When the average short packet length is around 100 bytes, the bandwidth expansion from padding out to a container length of 499 and 1199 byte packets is 5:1 and 12:1, respectively.

In another example, a fixed length container is used which is capable of carrying a single longest short packet or multiple short packets. Such a container is delayed until it is full, or sent partially full after a delay, which causes bandwidth expansion, but at a lower level. The delay may be between about 1.2 μs and about 20 μs, where a longer delay slows packets through the switch but produces less bandwidth expansion.

The maximum wait time may occur frequently, adding to the switch delay, because only short packets from a particular source TOR to a particular destination TOR are included in a container. The rate of packet flows from one TOR to another particular TOR is low. While a TOR may output several 100 Gb/s data streams, about 85% to about 95% of the bandwidth is in long packets, with about 5% to about 15% of the traffic being short packets. This traffic is about 30% loaded on average to avoid excessive peak blocking. Also, this traffic may be spread over numerous destination TORs due to traffic address fragmentation, short flows, slow flows, and even single packet flows. When a container to a specific destination carries more than one packet, it has to wait while additional packets to that destination arrive, or it is sent partially filled, causing bandwidth expansion, because the part-filled container occupies the same throughput capacity as a full container.

In a data center, the aggregated sever-server flows at the TOR may create a significant amount of bandwidth addressing fragmentation with short flows, slow flows, and a large numbers of addresses being accessed simultaneously. A photonic switch switches the aggregated TOR-TOR traffic at a destination TOR level of granularity, which may include multiple server-server activities, or a single server-server activity, in which some transactions may be as short as a single packet. TOR-to-core switch traffic is the sum of the server-server traffic to servers not on the same TOR. Server activities may interact with multiple servers, and some individual activities may interact with multiple servers. The server communications are equal to the sum of the resources of constituent activities.

In a data center, several activities may be going on simultaneously in each server. For example, server 1 of TOR k has activities A, B, Y, Z. Activity A may involve server 1 of TOR k interworking with server M of TOR 1, and the traffic is routed through the core packet switch. In another example, server 1 of TOR k interacts with server M of TOR k, where the link is at the local TOR and does not pass through the core switch. At the same time, activity B on Server 1 of TOR k may be interacting with server M on TOR k. Each of these involves separate data flows across the core switch. When the number of processes running on each of the servers that subtend each of the TORs considered, the number of server-to-server flows may be very large. Some of these may be aggregated together for core switching when they are occurring at the same time and share both source and destination TORs. Thus, the traffic addressing at the TOR-TOR level may be very fragmented, depending on each TORs community of interest, the group of TORs it tends to communicate with. This may be a small subset of the total number of TORs, or it may be a large number of other TORs.

Some flows are very long but many of them are short, including single packet flows. The flow sizes may be millions of bytes or more, but most of the flows (but not most of the bandwidth) are relatively short. A significant number of flows may be short ACK, NACK, or simple instruction/request transactions. These server-to-server flows are combined at the TOR into source TOR to destination TOR data flows, depending on the geographic relationship between the servers within the data center. This produces a flow inter-arrival time characteristic for the traffic exiting the TOR towards the switch. These individual flows are sometimes combined into a smaller number of larger TOR-to-TOR flows when multiple server-to-server flows occur between source servers on one TOR and destination servers on another specific TOR. The nature of the traffic from the TOR output port to the other TOR input ports is likely to be highly fragmented, with multiple server and TOR destinations present at once, and with a significant subset of the flows being short or very short.

The presence of many small flows may be problematic for long containers, unless a long wait time is used, because TOR-TOR flow inter-arrival times or packet inter-arrival times within a flow may be long. A significant number of flows may be single packet containers. Flow lengths may have a long duration, but moderate capacity, suggesting that adjacent packets of the same flow may be well spaced out. There is a wide range in the number of concurrent flows that may exist at any one time on any TOR port in a data center.

Multiple concurrent destinations per flow group or TOR port indicates that multiple containers are built concurrently, leading to a long fill time.

In container based switches or burst mode switches, a container to a specific destination is initiated upon arrival of a packet to that destination, and has to wait while other packets to that destination arrive and may be packed into that container to fill it. Under conditions of high address fragmentation, the multi-packet containers wait a long time increasing delay or are transmitted part-filled or almost empty after a pre-set time-out. Containers which are intended to only contain one packet and are sized for that packet do not suffer from the effects of address fragmentation, because they are created, assembled, processed, and transmitted without waiting for additional packets to be received at the container payload. For long packets, a container with a payload capacity of the length of the longest packet may be transmitted, which is compatible with the 100-120 ns frame times for a fast photonic space switch.

On the other hand, the short packet situation is more problematic. To achieve a high payload packing efficiency and avoid high address fragmentation, very short containers with a low payload capacity may be used, so 50-120 byte packets, which dominate the short packet volumes, adequately individually fill those containers. The few short packets which are close to the long/short threshold and cannot fit into a single container sized to match the high volume 50-120 byte packets may be handled by several methods, including concatenating containers together so that a longest short packet is carried in 2, 3, 4, or more containers, each container having a small payload size compatible with efficient transport of 50-120 byte packets.

A 120 ns duration packet container at 100 Gb/s and a 2 µs duration packet container at 100 Gb/s have payload capacities of about 1500 bytes and 25,000 bytes, respectively. This may involve a container delay of at least ten times to a hundred times their length, or more, because the source TOR stream may be carrying traffic to 10-100 destination TORs or more. To just fill containers at the time-out point, the ratio of time-out length to container length approximately equals the address fragmentation. This leads to a range in timeout delay of from about 1.2 µs to about 12 µs or more for a 120 ns container and from about 20 µs to about 200 µs or more for a 2 µs container for an address fragmentation of 10 to 100 or more addresses.

Table 1 illustrates results of container fill for an average packet arrival time of 5333 µs and 13.3 µs, representing the approximate average inter-arrival periods for short packets in a 100 Gb/s TOR stream to about 1024 destinations. Table 1 shows the number of 100 byte packets to fill the payload, the actual average number of 100 byte packets inserted when the timeout starts from the time of arrival of the first packet and the resultant average fill, and the average bandwidth multiplication from poor filling. The number of packets is always 1 or greater, because the container is not initiated until the first packet for a destination is received at the packet splitter. The best filling and smallest bandwidth growth occurs with the shortest containers and the longest delays.

TABLE 1

|  | # of 100 Byte Packets To Fill Payload | Low Short Packet arrival Rate (5333 µs between packets) | | | High Short Packet Arrival Rate (13.3 µs between packets) | | |
| --- | --- | --- | --- | --- | --- | --- | --- |
|  |  | Average Fill in packets | % fill | Bandwidth Expansion (N:1) | Average Fill in packets | % fill | Bandwidth Expansion (N:1) |
| Short Delay (×10) | 8 | 1.00013 | 12.50% | 8 | 1.053 | 13.16% | 7.599 |
| Long Delay (×100) | 8 | 1.0013 | 12.52% | 7.987 | 1.538 | 19.23% | 5.200 |
| Short Delay (×10) | 15 | 1.00023 | 6.668% | 14.997 | 1.090 | 7.268% | 13.759 |
| Long Delay (×100) | 15 | 1.0023 | 6.682% | 14.965 | 1.902 | 12.68% | 7.886 |
| Short Delay (×10) | 250 | 1.0038 | 0.0402% | 248.76 | 2.504 | 1.002% | 99.800 |
| Long Delay (×100) | 250 | 1.038 | 0.0415% | 240.96 | 16.04 | 6.42% | 15.576 |

Because containers which are not filled experience the maximum delay, and because the fill numbers are very low, the vast majority of the short packet multi-packet containers are delayed by the full timeout period and, and the containers are largely empty. Because of the delay, it is desirable for the time-out to be short, with short containers, to maximize the time-out ratio at a low delay. In addition, there may be deployment of techniques to change the traffic statistics. Otherwise, there may be wasted bandwidth consumption in the ratio of the fixed container capacity to the actual average payload capacity. Also, when the short packets are acknowledgment (ACK) packets or query packets, the next packet in a flow is not sent until the previous packet has been received and another data transaction has taken place in the reverse direction, which does not occur while the first ACK packet is being stored awaiting the arrival of a second packet for the same destination, which will not be sent until the first is received and a transaction has occurred. In this case, the timeout delay occurs in both direction of each transaction involving short packets in a flow, slowing that flow, where the effect is proportional to the timeout duration. Thus, mapping multiple packets into one container affects the data flow.

When there is a single flow to a particular destination, the bandwidth expansion may be significant. For example, at a 100 Gb/s rate, a solitary 50 byte packet occupies 4 ns, but the container with that solitary packet may be 64 ns for an 800 byte payload or 2 µs for a 25,000 byte payload. This is 16:1 and 500:1 bandwidth expansion, respectively.

The bandwidth actually occupied by ultra-short packets, which are likely to be solitary packets, is around 1% for packet lengths of about 50-120 bytes. For 50 byte packets in a 2 µs burst mode switch, this leads to a 500:1 bandwidth expansion (from 4 ns to 2 µs for each 50 byte packet once it is containerized) for an attempted 500% occupancy of the bus by containerized packets, which is problematic. With a shorter 120 ns container, which matches the long packet container length, the solitary 50 byte packets at 1% of the raw packet bandwidth occupy about 30% of the bus bandwidth, leading to significant loss of traffic carrying capacity, unless the short packet containers are handled separately in an over-provisioned second switch fabric. However, not all short packets are solitary.

A hybrid photonic-electronic switch may use time-division switching in the electronic domain, and the electronic switch frame time may be faster than the photonic long packet container switch and/or the frame time can be shared over multiple time-slots, allowing smaller containers to be switched.

There are several approaches for better container structures for single packet payload operation in an electronic switch while maintaining relatively good bandwidth efficiency across the short packet length spectrum—i.e. from the shortest possible packets up to just below the long/short threshold. Three categories of container structure for handling the distribution of short packet lengths where the probability density of short packet lengths is highest at or near the shortest overall packets are harmonically related container sizes, cumulatively stacked container sizes, and fixed length containers. Harmonically related container sizes are based on a basic container with sufficient payload capacity to contain the high probability density portion of the short packet sizes (e.g. up to 70, 1200 or 120 bytes) and container lengths of 2, 4, . . . $2^N$ times this size, where N is an integer, for longer packet payloads. Cumulatively stacked container sizes are based on the same size of basic container as in harmonically related container sizes, but with an ability to join or stack multiple containers together to create containers of 1, 2, 3, 4, . . . , N times the length. Alternatively, a fixed length container has a fixed size about the size of the base container of a basic container, which is able to carry the high probability density portion of the short packet sizes (i.e. up to 70, 100 or 120 bytes) and an ability to link multiple containers and their payloads in a concatenated relationship when carrying longer packets, so parts of the packet are carried in each of multiple containers (i.e. packet sizes from 71, 101 or 121 bytes up to the maximum based on the long/short packet threshold). This approach is similar to the concatenation techniques used in asynchronous transfer mode (ATM) to pack payloads into cells.

The containers may be of harmonically related sizes or cumulatively stacked and still be switched by a synchronous structure. In one example, a container size is harmonically related. For example containers of 64 bytes, 128 bytes, 256 bytes, 512 bytes, and 1024 bytes are used for packet transport capacity plus container overhead. With a 10 byte overhead, this provides containers for 1-54 byte packets, 55-118 byte packets, 119-246 byte packets, 147-502 bytes, 503-1014 byte packets, covering a wide range of long/short packet thresholds. The container size is harmonically related with a multiplier of 2:1. Table 2 shows harmonically related container sizing for a single container for the ranges of packet sizes where each container has a different harmonically related size. The size 1 containers are the most prevalent, being 22% of all packets and about 45% of short packets when using a 1000 byte long/short threshold, followed by size 3 packets, which are 10% of all packets. Sizes 2, 4, and 5 are in the 5-6% range, for a blended efficiency of around 75%, including a 10 byte overhead. There is an average bandwidth expansion of a factor of 1.33, or 33%. Depending on the bandwidth threshold, the capacity gain is from about 5:1 to about 15:1. This hierarchical approach is compatible with a layered fast circuit switch implemented as a synchronous series of space switches or a harmonically framed series of time switches.

TABLE 2

| Container Size | Container Length (bytes) | Container overhead (bytes) | Container Payload min (bytes) | Container Payload max (bytes) | Container efficiency at min payload | Container efficiency at max payload | Average Container Payload For Size | Average Container efficiency for Size |
|---|---|---|---|---|---|---|---|---|
| Size = 1 | 64 | 10 | 1 | 54 | 1.56% | 84.4% | 51 bytes | 79.7% |
| Size = 2 | 128 | 10 | 55 | 118 | 42.9% | 92.2% | 88 bytes | 68.8% |
| Size = 3 | 256 | 10 | 119 | 246 | 46.5% | 96.1% | 183 bytes | 71.5% |
| Size = 4 | 512 | 10 | 247 | 502 | 48.2% | 98.0% | 373 bytes | 72.9% |
| Size = 5 | 1024 | 10 | 503 | 1014 | 49.1% | 99.0% | 769 bytes | 75.1% |

In another example, the overall effective container size is cumulative, by combining payloads together to create longer containers as with cumulatively stacked container sizes or concatenating fixed size building blocks of BPCs. For a 64 byte building block and up to 16 stacked container blocks, the resultant container sizes are 64, 128, 192, 256, 320, 384, 448, 512, 576, 640, 704, 768, 832, 896, 960, and 1024 bytes, with containers for 1-54, 55-118, 119-182, 183-246, 247-310, 311-374, 375-438, 439-502, 503-566, 567-630, 631-694, 695-758, 759-822, 823-886, 887-950, and 951-1014 byte packets, with 10 byte overheads. The level of payload may be slightly reduced from adding in overhead for container sequence integrity. Cumulative stacking into monolithic longer containers or concatenation of BPCs which remain separate but associated containers introduces a container of size compatible with the smallest packet size range to be switched, for example 64 bytes, where larger packets are in concatenated trains of containers, each with a header and multiple basic container blocks. A container size is used which handles the high traffic of the shortest packets reasonably efficiently. Concatenation has less wasted bandwidth than harmonically sized containers, because the average wasted length is only one half of a BPC, rather than one quarter of an entire harmonically related length container. However, concatenation introduces partitioning of packets into multiple containers and stitching containers together. This may add about two bytes to the header of the first container basic block. A byte or two of information may permit the use of a sequence number for confirming that the train has correctly arrived in the correct order, and may be added into each container block.

Table 3 shows container concatenation efficiencies with two bytes per container of additional overhead. The overall packet count is 22% for C=1, 3.5% for C=2, 5% for C=3, 4.5% for C=4, 2% for C=5, 1.5% for C=6, 0.9% for C=7, 0.75% for C=8, 0.6% for C=9, 0.5% for C=10, 0.45% for C=11, 0.45% for C=12, 0.35% for C=13, 0.35% for C=14, 0.35% for C=15, and 0.3% for C=16, with a total of 46% short packets. The average bandwidth efficiency is about 82.9%, including 10+2n byte container overhead. The efficiency falls as overhead increases. There is an average bandwidth expansion of around 1.21, or 21%. Depending on the bandwidth threshold, this leads to a capacity gain of from about 5.5:1 to about 16.5:1. The concatenation approach may be used with a single layer fast circuit switch implemented as a synchronous series of space switches or a framed series time switch.

TABLE 3

| Container Concat-enation | Container Length (bytes) | Container overhead (bytes) | Container Payload min (bytes) | Container Payload max (bytes) | Container efficiency at min payload | Container efficiency at max payload | Average Container Payload For Size | Average Container efficiency for Size |
|---|---|---|---|---|---|---|---|---|
| 1 | 64 | 10 + 1 × 2 = 12 | 1 | 52 | 62.5% | 81.3% | 50 bytes | 78.1% |
| 2 | 128 | 10 + 2 × 2 = 14 | 53 | 114 | 41.4% | 89.1% | 84 bytes | 65.6% |
| 3 | 192 | 10 + 3 × 2 = 16 | 115 | 176 | 59.9% | 91.7% | 146 bytes | 76.0% |
| 4 | 256 | 10 + 4 × 2 = 18 | 177 | 238 | 69.2% | 92.9% | 210 bytes | 82.0% |
| 5 | 320 | 10 + 5 × 2 = 20 | 239 | 300 | 74.7% | 93.8% | 270 bytes | 84.4% |
| 6 | 384 | 10 + 6 × 2 = 22 | 301 | 362 | 78.4% | 94.3% | 332 bytes | 86.5% |
| 7 | 448 | 10 + 7 × 2 = 24 | 363 | 424 | 81.0% | 94.6% | 394 bytes | 87.9% |
| 8 | 512 | 10 + 8 × 2 = 26 | 425 | 486 | 83.0% | 94.9% | 456 bytes | 89.1% |
| 9 | 576 | 10 + 9 × 2 = 28 | 487 | 548 | 84.5% | 95.1% | 518 bytes | 89.9% |
| 10 | 640 | 10 + 10 × 2 = 30 | 549 | 610 | 85.8% | 95.3% | 580 bytes | 90.6% |
| 11 | 704 | 10 + 11 × 2 = 32 | 611 | 672 | 86.8% | 95.5% | 642 bytes | 91.2% |
| 12 | 768 | 10 + 12 × 2 = 34 | 673 | 734 | 87.6% | 95.6% | 704 bytes | 91.7% |
| 13 | 832 | 10 + 13 × 2 = 36 | 735 | 796 | 88.3% | 95.7% | 766 bytes | 92.1% |
| 14 | 896 | 10 + 14 × 2 = 38 | 797 | 858 | 89.0% | 95.8% | 828 bytes | 92.4% |
| 15 | 960 | 10 + 15 × 2 = 40 | 859 | 920 | 89.5% | 95.8% | 890 bytes | 92.7% |
| 16 | 1024 | 10 + 16 × 2 = 42 | 921 | 982 | 89.9% | 95.9% | 952 bytes | 93.0% |

Another container type, a truly variable length container approach, exists. This allows the container to carry any length of packet below the maximum set by the packet length threshold with high efficiency. When the granularity of the variability in length of the container matches the granularity of the packets, which may be, for example, one, where packet length is P, and the header length is H, the bandwidth efficiency is given by:

$$100\left(\frac{P}{P+H}\right).$$

Table 4 shows the bandwidth efficiency for variable length containers with 12 byte headers. The average bandwidth efficiency over the traffic distribution is around 92%. This leads to an average bandwidth expansion of around 1.087 or 8.7%. Depending on the bandwidth threshold, the capacity gain is from about 6.1:1 to about 18.4:1. However, variable length containers are not amenable to being switched by fast framed circuit switches or fixed length cell switches, for example non-blocking directly addressable circuit switches, and may be switched by packet switching techniques, which may introduce different delay characteristics depending on the nature of the distributed buffering inside the packet switch. Fixed length BPC concatenated containers are compatible with ATM style switching or non-blocking constant delay (i.e., double buffered) fast time division switches.

TABLE 4

| Container Length (bytes) | Container overhead - example only (bytes) | Container Payload (bytes) | Container efficiency at payload |
|---|---|---|---|
| 64 | 12 | 52 | 81.3% |
| 128 | 12 | 116 | 90.6% |
| 192 | 12 | 180 | 93.8% |
| 256 | 12 | 244 | 95.3% |
| 320 | 12 | 308 | 96.3% |
| 384 | 12 | 372 | 96.9% |
| 448 | 12 | 436 | 97.3% |
| 512 | 12 | 500 | 97.7% |
| 576 | 12 | 564 | 97.9% |
| 640 | 12 | 628 | 98.1% |
| 704 | 12 | 692 | 98.3% |
| 768 | 12 | 756 | 98.4% |
| 832 | 12 | 820 | 98.6% |
| 896 | 12 | 884 | 98.7% |
| 960 | 12 | 948 | 98.8% |
| 1024 | 12 | 1012 | 98.9% |

Table 5 shows a comparison between fixed length containers, harmonically related length containers, and concatenated containers.

TABLE 5

| | Fixed Length Containers | Harmonically Related Length Containers | Concatenated Minimum Length Containers | Variable Length Containers |
|---|---|---|---|---|
| Overall Bandwidth efficiency | 5.5-14.3% depending on short/long threshold | 75% | 83% | 92% |
| Bandwidth growth during container-ization | 7:1 to 18:1 | 1.33:1 | 1.21:1 | 1.087:1 |
| Conducive to Simple Time switch | Yes | Inefficiently | No | No |
| Conducive to Layered simple time switches | Yes | Yes | No | No |
| Conducive to Constant delay (time slot sequence maintaining) time switches | Yes | Yes | Yes | No |
| Conducive to Packet switch | Yes | Yes | Yes | Yes |

While variable length containers have good overall bandwidth efficiency, they use a complex packet fabric, with the potential for internal delay. The concatenated minimum length container approach has a good overall bandwidth efficiency which may be switched in a simple constant delay time switch (or a simple synchronous space switch), where each container may be separately switched as a fixed bandwidth block, but the containers may be flexibly linked together or concatenated, as in ATM.

Figure 8:
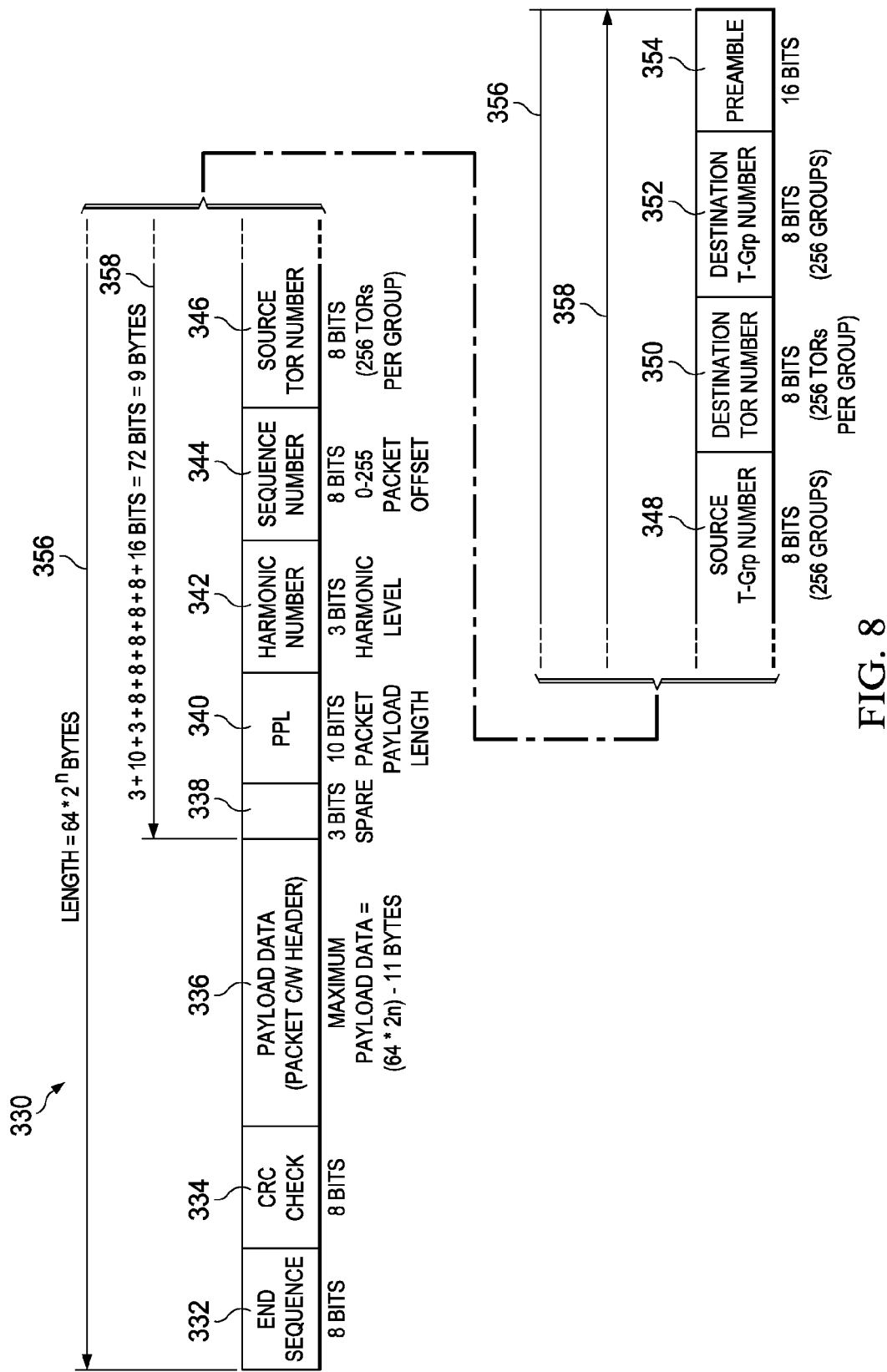
FIG. 8 illustrates an embodiment harmonic length short packet container.

FIG. 8 illustrates a harmonically related size container 330. Container 330 contains a header, payload data packet, and trailer. The container header includes preamble 354, destination TOR group number 352, individual destination TOR number 350, source TOR group number 348, individual source TOR number 346, sequence number 344, harmonic level 342, packet payload length (PPL) 340, and spare bits 338.

The container is transmitted in sequence from right to left, with the preamble first, followed by the destination TOR group number and individual destination TOR number. Preamble 354, which may be 16 bits or two bytes, is a distinctive pattern. In other examples, other sized preambles, or no preamble, may be used.

Destination TOR group number 352 and individual destination TOR number 350 identify the destination TOR. Destination TOR group number 352 can be 8-12 bits to identify up to 256-4096 TOR groups. Individual destination TOR number 350, which can be 4-8 bits to identify up to 16-256 TORs per group, identifies the particular destination TOR within the destination TOR group, for a total of 16 bytes per address. The destination TOR group number and individual destination TOR number within the group may be read together to indicate a specific destination TOR address.

Following the individual destination TOR number are the source TOR group number and individual source TOR number, which identify the source of the container, and are used in sequence reintegration at the destination. Source TOR group number 348 and individual source TOR number 346 identify the source TOR. Source TOR group number 348 can be 8-12 bits to identify up to 256-4096 source TOR groups. Individual source TOR number 346 can be 4-8 bits to identify up to 16-256 particular TORs per group, for a total of 16 bytes per address.

In another example, a single 16 bit destination TOR address and a single 16 bit source TOR address are used to identify the destination TOR and source TOR.

After the address is a sequence number. Sequence number 344 is used to reconstruct the packet sequence at the destination. Sequence number 344 has 8 bits for a packet offset of 0 to 255. The sequence numbers are rotated among the 256 values. When the source TOR packet splitter splits the packet streams into individual containerized streams of long and short packets, it provides the packet containers with a sequence number specific to the packet flow. Because the flows are from one particular source TOR to one particular destination TOR, the container sequence integrity, and thus the packet sequence integrity, for the flows may be established by assembling containers with the same source address in the same order using the sequence numbers. For example, the sequence numbers may be in an ascending, rotating sequence from 0 to 255. Table 6 shows example traffic from three TORs with sequence numbers and destinations. Three TORs, TOR 1, TOR 2, and TOR 3, communicate with three other TORs, TORs A, B, and C, over separate long packet and short packet paths. In Table 6, "A," "B," and "C" indicate destination TOR, "L" or "S" indicate whether the packet is a long packet or a short packet, and roman numerals indicate the sequence numbers. Table 7 illustrates the three TORs receiving containers and identifying incorrectly sequenced containers.

TABLE 6

| | | | | | TOR 1 generates | | | | | |
| --- | --- | --- | --- | --- | --- | --- | --- | --- | --- | --- |
| Container Destination ID., Seq # | 1-1 $A\,S_i$ | 1-2 $B\,L_i$ | 1-3 $B\,L_{ii}$ | 1-4 $B\,S_{iii}$ | 1-5 $C\,L_i$ | 1-6 $A\,S_{ii}$ | 1-7 $B\,S_{iv}$ | 1-8 $C\,S_{ii}$ | 1-9 $C\,L_{iii}$ | 1-10 $A\,L_{iii}$ |
| | | | | | TOR 2 generates | | | | | |
| Container Destination ID., Seq # | 2-1 $B\,L_i$ | 2-2 $C\,L_i$ | 2-3 $A\,L_i$ | 2-4 $C\,S_{ii}$ | 2-5 $B\,L_{ii}$ | 2-6 $B\,S_{iii}$ | 2-7 $A\,L_{ii}$ | 2-8 $A\,S_{iii}$ | 2-9 $B\,L_{iv}$ | 2-10 $C\,S_{iii}$ |
| | | | | | TOR 3 generates | | | | | |
| Container Destination ID., Seq # | 3-1 $C\,S_i$ | 3-2 $A\,L_i$ | 3-3 $C\,L_{ii}$ | 3-4 $A\,S_{ii}$ | 3-5 $A\,L_{iii}$ | 3-6 $C\,L_{iii}$ | 3-7 $C\,S_{iv}$ | 3-8 $B\,L_i$ | 3-9 $A\,S_{iv}$ | 3-10 $B\,L_{ii}$ |
| Container | 3-1 | 3-2 | 3-3 | 3-4 | 3-5 | 3-6 | 3-7 | 3-8 | 3-9 | 3-10 |

TABLE 7

| | | | TOR A receives | | | | | | |
| --- | --- | --- | --- | --- | --- | --- | --- | --- | --- |
| Container received in this order | 3-2 | 1-1 | 2-3 | 3-5 | 3-4 | 2-7 | 1-6 | 2-8 | 1-10 | 3-9 |
| Source ID, Length, Seq # | $3\,L_i$ | $1\,S_i$ | $2\,L_i$ | $3\,L_{iii}$ | $3\,S_{ii}$ | $2\,L_{ii}$ | $1\,S_{ii}$ | $2\,S_{iii}$ | $1\,L_{iii}$ | $3\,S_{iv}$ |
| Individual received flows before sequence check | $1\,S_i$ $2\,L_i$ $3\,L_i$ | $1\,S_{ii}$ $2\,L\,ii$ $3\,L_{iii}$ | $1\,L\,iii$ $2\,S_{iii}$ $3\,L_{ii}$ | $3\,L_{iv}$ | Incorrect sequencing detected - reverse order of $3\,L_{iii}$, $3\,L_{ii}$ | | | | | |

TABLE 7-continued

| | | | | TOR B Receives | | | | | |
|---|---|---|---|---|---|---|---|---|---|
| Container received in this order | 2-1 | 1-2 | 2-5 | 1-4 | 2-6 | 3-8 | 1-7 | 1-3R | 2-9 | 3-10 |
| Source ID, Length, Seq # | 2 $L_i$ | 1 $L_i$ | 2 $L_{ii}$ | 1 $S_{iii}$ | 2 $S_{iii}$ | | 3 $L_i$ | 1 $S_{iv}$ | 1 $L_{ii}$ | 2 $L_{iii}$ | 3 $L_{ii}$ |
| Individual received flows before sequence check | 1 $L_i$ 2 $L_i$ 3 $L_i$ | 1 $S_{iii}$ 2 $L_{ii}$ 3 $L_{ii}$ | 1 $S_{iv}$ 2 $S_{iii}$ | 1 $L_{ii}$ 2 $L_{iv}$ | Incorrect sequencing detected - hold 1 $S_{iii, iv}$ until 1 $L_{ii}$ arrives | | | | | |

| | | | | TOR C Receives | | | | | |
|---|---|---|---|---|---|---|---|---|---|
| Source ID, Seq # | 2 $L_i$ | 3 $S_i$ | 3 $L_{ii}$ | 2 $S_{ii}$ | 1 $L_i$ | 3 $L_{iii}$ | 3 $S_{iv}$ | 1 $L_{iii}$ | 1 $S_{ii}$ | 2 $S_{iii}$ |
| Container received in this order | 2-2 | 3-1 | 3-3 | 2-4 | 1-5 | 3-6 | 3-7 | 1-9 | 1-8 | 2-10 |
| Source ID, Length, Seq # | 2 $L_i$ | 3 $S_i$ | 3 $L_{ii}$ | 2 $S_{ii}$ | 1 $L_i$ | 3 $L_{iii}$ | 3 $S_{iv}$ | 1 $L_{iii}$ | 1 $S_{ii}$ | 2 $S_{iii}$ |
| Individual received flows before sequence check | 1 $L_i$ 2 $L_i$ 3 $S_i$ | 1 $L_{iii}$ 2 $S_{ii}$ 3 $L_{ii}$ | 1 $L_{ii}$ 2 $S_{iii}$ 3 $L_{iii}$ | 3 $S_{iv}$ | Incorrect sequencing detected - reverse order of 1 $L_{iii}$, 1 $L_{ii}$ | | | | | |

After the sequence number is the harmonic level, which identifies the harmonic multiplier. Harmonic level 342 provides the container length. In this example, the harmonic level number is three bits, determining the power of two multipliers applied to the container length. The harmonic number, also referred to as n, determines the length of the container. Harmonic numbers between 0 and 7, which may be identified by a three bit word, cover harmonic container lengths from $2^0 \times 64$ bytes to $2^7 \times 64$ bytes which equals 64 bytes to 8192 bytes. Other base building block sizes besides 64 bytes (e.g. 50, 100, 120 bytes) may be used. Alternatively, a smaller range of harmonic numbers such as a two bit word with container lengths from $64 \times 2^0$ to $64 \times 2^3 = 64$ to 512 bytes may be used, and the short/long threshold is set below about 500 bytes, or 750 bytes with a 96 byte building block.

Because the harmonic containers have specific lengths, e.g., 64 bytes, 128 bytes, 256 bytes, 512 bytes, and 1024 bytes, the payload sections also have specific lengths based on the overall container length minus the overhead lengths. The packets placed in the containers may be of any length, but will usually be over half of the payload. Thus, the packet end does not necessarily coincide with the end of the payload area. PPL 340 points to the end of the packet payload. There is padding beyond the end of the packet payload. PPL 340 is 10 bits, which indicates padding of 0 bits to 1023 bits. A PPL of 13 bits would identify padding from 0 to 8191 bits.

With three spare bits 338, header size 358 is nine bytes.

Payload 336 contains the payload data. The payload data includes the packet along with its header. The payload may be padded to the maximum payload size. The maximum payload size is (64*2n)−11 bytes, where n is the harmonic level. The payload area includes two areas, where the first sub-area is transmitted first, and contains the complete packet as a payload. The second sub-area, which is transmitted second, includes the padding pattern. The PPL is used to indicate the demarcation between the packet and the padding.

The trailer includes end sequence 332 and CRC check 334. An eight bit CRC check 334 may be placed across the container. Alternatively, another method of integrity validation may be used.

End sequence 332 may be eight bits. Alternatively, another end sequence, for example a two byte distinctive pattern, or no end sequence, may be used.

The total packet length 356 is $64*2^n$ bytes. Table 8 shows the container length for various n values. A value of n=4 will cover a range of long/short packet threshold values up to 1012 bytes.

TABLE 8

| n | 0 | 1 | 2 | 3 | 4 | 5 | 6 | 7 |
|---|---|---|---|---|---|---|---|---|
| Container Length | 64 | 128 | 256 | 512 | 1024 | 2048 | 4096 | 8192 |

Figure 9:
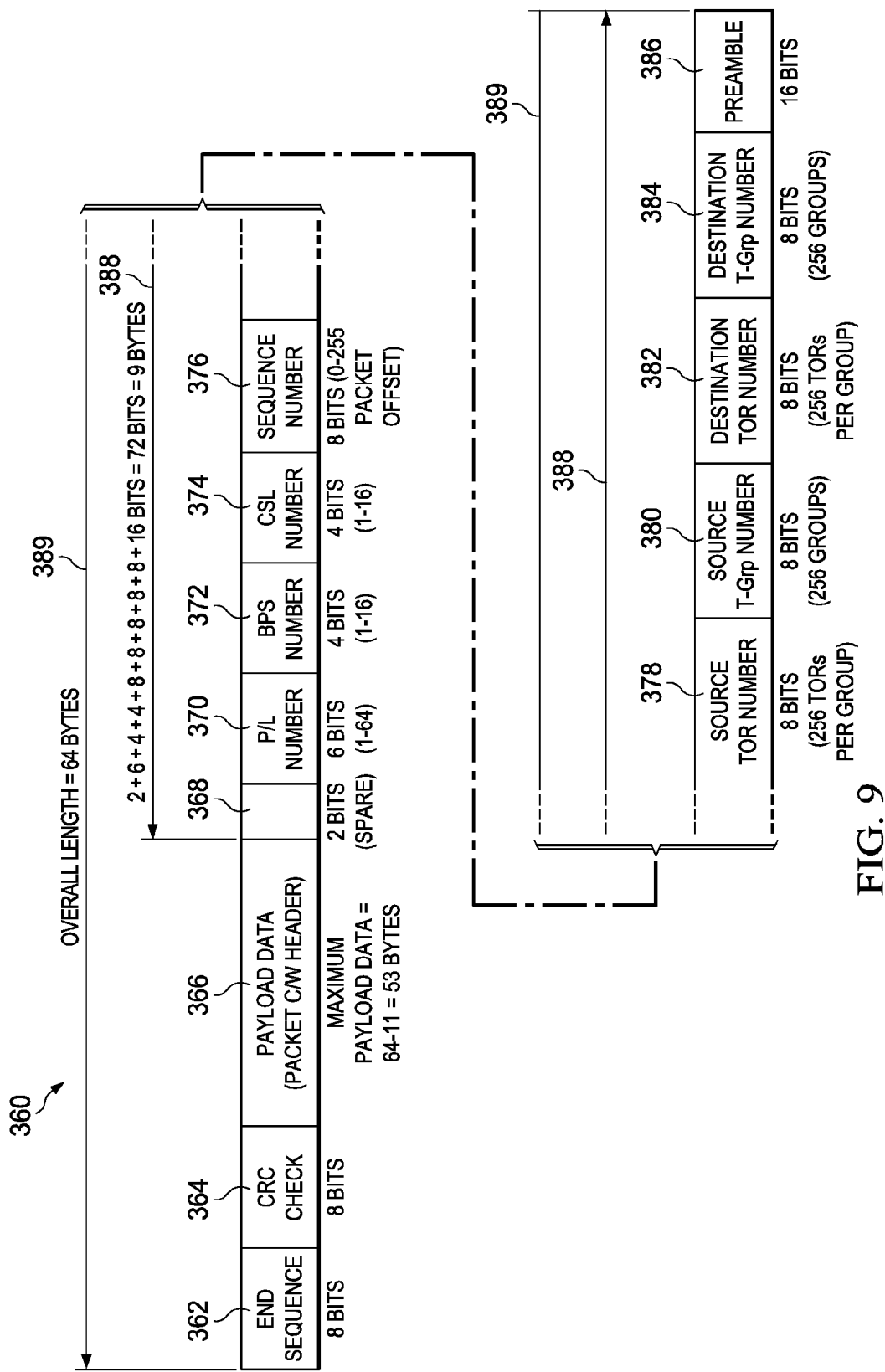
FIG. 9 illustrates an embodiment concatenated short packet container.

FIG. 9 illustrates container 360, a concatenation-compatible BPC format. The container header includes preamble 386, destination TOR group number 384, individual destination TOR number 382, source TOR group number 380, individual source TOR number 378, sequence number 376, concatenation sequence length (CSL) number 374, BPC position in sequence (BPS) number 372, payload length (P/L) number 370, and spare bits 368. Preamble 386, which is 16 bits or two bytes, is a distinctive pattern. In other examples, other sized preambles, or no preamble, may be used.

Destination TOR group number 384 and individual destination TOR number 382 identify the destination TOR. Destination TOR group number 384 can be 8-12 bits to identify up to 256-4096 TOR groups. Individual destination TOR number 382 can be 4-8 bits to identify up to 16-256 TORs within the destination TOR group.

Similarly, source TOR group number 380 and individual source TOR number 378 identify the source TOR. Source TOR group number 380 can be 8-12 bits to identify up to 256-4096 source TOR groups. Individual source TOR number 378 can be 4-8 bits to identify up to 16-256 TORs within the source TOR group.

In another example, a single 16 bit destination TOR address and a single 16 bit source TOR address are used to identify the destination TOR and source TOR for addressing up to 65,536 TORs.

Sequence number 376 is used to reconstruct the packet sequence at the destination. Sequence number 376 has 8 bits for a packet offset of 0 to 255.

CSL number 374 provides the number of PBCs in this sequence. It may be four bits, for 1-16 BPCs. The CSL field defines the number of concatenated BPCs used in a particular packet's transport.

BPS number 372 provides the BPC position in the sequence number, where this BPC fits in relative to the other BPCs in the concatenation sequence. The BPS number is four bits for positions of 1-16, for up to 16 concatenated containers. The BPS number indicates which position in the sequence of BPCs this BPC occurs. For the shortest packets, the BPS number is 1, which may be represented by a binary zero, because a zero length container does not exist. Table 3 shows the concatenation levels based on packet length with a BPC length of 64 bytes. Other BPC lengths, such as 50, 100, or 120 bytes, may be used. Changing the BPC length modifies the packing efficiency and changes the maximum number of concatenated BPCs. The level (minus 1) is the number used as the BPS number. The BPS number identifies the number of segments used to reconstitute a longer short packet.

P/L number 370 gives the payload length. There are 6 bits, for a payload data length ranging from 1 to 64. This indicates the length of the payload padding. There may only be padding in the last container to improve efficiency. Six bytes may address 0 to 63 bytes of padding.

With two spare bits 368, header size 388 is nine bytes.

Payload 366 contains the payload data. The payload data includes the packet along with its header. The maximum payload data size in this example is 64 bytes–11 bytes=53 bytes. This provides a maximum bandwidth efficiency of 82.8%.

The trailer includes end sequence 362 and CRC check 364. An eight bit CRC check 364 may be placed across the container. Alternatively, another CRC check length, or another method of integrity validation may be used.

End sequence 362 may be eight bits. Alternatively, another end sequence, for example a two byte distinctive pattern, or no end sequence, may be used. The total packet length 389 is 64 bytes.

When 8 bits are used for TOR group number, for 256 TOR groups, and 8 bits are used for individual TOR number, for 256 TORs/group, up to 65,356 TORs may be addressed. Another example uses 8 bits per TOR group and 4 bits for individual TOR number, for 16 TORs/group, to address up to 4096 TORs. In another example, 12 bit addresses are used for TOR groups, for 4096 groups and 4 bits for TOR addresses, with 16 TORs per group and 65,536 TORs in total. 65,536 TORs at 4×100 Gb/s represents a capacity of 26.2144 Pb/s or 26,214.4 Tb/s.

Figure 10:
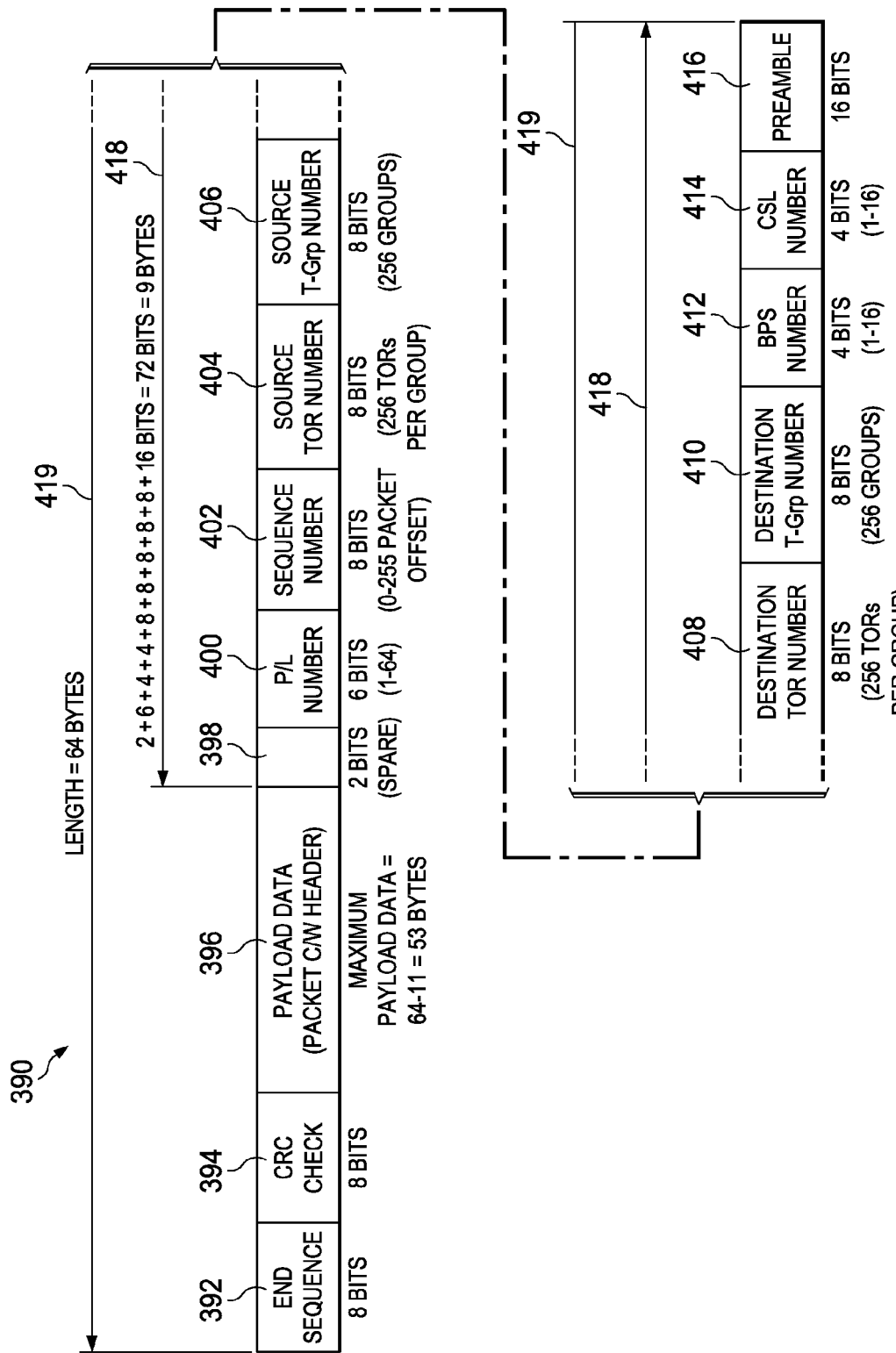
FIG. 10 illustrates an embodiment beginning concatenated short packet container.

FIGS. 10-12 illustrate a container structure where different containers are used for the initial BPC, intermediate BPCs, and last BPC. FIG. 10 illustrates container 390, an initial BPC. The container header includes preamble 416, CSL number 414, BPS number 412, destination TOR group number 410, individual destination TOR number 408, source TOR group number 406, individual source TOR number 404, sequence number 402, P/L number 400, and spare bits 398. Preamble 416, which is 16 bits or two bytes, is a distinctive pattern. In other examples, other sized preambles, or no preamble, may be used.

CSL number 414 provides the number of BPCs in this sequence. It may be four bits, for up to 16 BPCs.

BPS number 412 provides the BPC position in the sequence, where this BPC fits in relative to the other BPCs in the concatenation sequence. The BPS number is four bits for the positions of up to 16 concatenated BPCs.

Destination TOR group number 410 and individual destination TOR number 408 identify the destination TOR. Destination TOR group number 410 can be 8-12 bits to identify up to 256-4096 TOR groups. Individual destination TOR number 408 can be 4-8 bits to identify up to 16-256 TORs within the destination TOR group.

Similarly, source TOR group number 406 and individual source TOR number 404 identify the source TOR. Source TOR group number 406 can be 8-12 bits to identify up to 256-4096 source TOR groups. Individual source TOR number 404 can be 4-8 bits to identify up to 16-256 TORs within the source TOR group.

In another example, a single 16 bit destination TOR address and a single 16 bit source TOR address are used to identify the destination TOR and source TOR.

Sequence number 402 is used to reconstruct the packet sequence at the destination. Sequence number 402 has 8 bits for a packet offset of 0 to 255.

P/L number 400 gives the payload length. There are 6 bits, for a payload data length ranging from 1 to 64.

With two spare bits 398, header size 418 is nine bytes.

Payload 396 contains the payload data. The payload data includes the packet along with its header. The maximum payload data size is 64 bytes–11 bytes=53 bytes.

The trailer includes end sequence 392 and CRC check 394. An eight bit CRC check 394 may be placed across the container. Alternatively, another method of integrity validation may be used.

End sequence 392 may be eight bits. Alternatively, another end sequence, for example a two byte distinctive pattern, or no end sequence, may be used. The total packet length 419 is 64 bytes.

In some examples, container 390 is used as the only container, when a single BPC is used for a packet. In other examples, container 390 is the first of multiple containers used for a particular packet. In this case, the trailer may not be used in container 390, and might only be included in the final container to reduce overhead.

FIG. 11 illustrates container 190, an intermediate BPC for multiple concatenated BPCs per packet formats, with a concatenation level greater than two. Container 190 includes a header with preamble 198, CSL number 196, and BPS number 194, and payload data 192. Preamble 198, which is 16 bits or two bytes, is a distinctive pattern. In other examples, other sized preambles, or no preamble, may be used.

CSL number 196 provides the number of BPCs in this sequence. It may be four bits, for 1-16 BPCs.

BPS number 194 provides the BPC position in the sequence number, which is where this BPC fits in relative to the other BPCs in the concatenation sequence. The BPS number is four bits for positions of 1-16.

Payload data 192 includes the packet including its header. The maximum payload size is 64 bytes−3 bytes=61 bytes, with three bytes of overhead, and a total container size of 64 bytes. Thus, intermediate containers have a low overhead of three bytes and carry 61 bytes of payload instead of 53 bytes, for an improvement of 15%.

FIG. 12 illustrates container 450, a last BPC for multiple BPC per packet formats, with a concatenation level greater than one. Container 450 includes a header with preamble 462, CSL number 460, and BPS number 458, payload data 456, and a trailer with CRC check 454 and end sequence 452. Preamble 462, which is 16 bits or two bytes, is a distinctive pattern. In other examples, other sized preambles, or no preamble, may be used.

CSL number 460 provides the number of BPCs in this sequence. It may be four bits, for 1-16 BPCs.

BPS number 458 provides the BPC position in the sequence number, where this BPC fits in relative to the other BPCs in the concatenation sequence. The BPS number is four bits for positions of 1-16.

Payload data 456 includes the packet including its header. The maximum payload size is 64 bytes−5 bytes=59 bytes, with five bytes of overhead, and a total container size of 64 bytes, the 59 byte payload representing an 11% improvement over the 53 byte payload of the base BPC.

The trailer includes end sequence 452 and CRC check 454. An eight bit CRC check 454 may be placed across the container. Alternatively, another method of integrity validation may be used.

End sequence 452 may be eight bits. Alternatively, another end sequence, for example a two byte distinctive pattern, or no end sequence, may be used. The total packet length 419 is 64 bytes.

The trailer sequence is only present on the last container carrying the packet. When a concatenation level of 1 is used, the end sequence is on the initial container, which is also the last container. When a concatenation level of two is used, there is an initial container and a last container, with a trailer, and no intermediate containers. When the concatenation level is three or greater, there is an initial container, a last container, and one or more intermediate containers. Also, only the initial container carries the addresses and the sequence number. In one example, the switch connection is set based on the initial container, and held for the subsequent containers. In another example, the CSL with the container address is sent to the centralized connection processor, which determines a connection from the connection information, and sets a number of frames for the connection to stay in place based on the CSL number. All of the containers carry a CSL number and a BPS number. The payload space is larger for the last container than for the initial container, and even larger for the intermediate containers.

Table 9 compares the efficiencies for the single BPC format and a multiple BPC format with different container formats for initial BPCs, intermediate BPCs, and ending BPCs. The multiple BPC format has higher efficiencies, especially at higher concatenation levels. However, the amount of traffic at high concatenation levels is low, and over 77% of short packets have a concatenation level of 4 or less.

TABLE 9

| Concatenation Level | Peak Efficiency Single BPC Format | Peak Efficiency Multiple BPC format |
|---|---|---|
| 1 | 82.8% | 82.8% |
| 2 | 82.8% | 87.5% |
| 3 | 82.8% | 90.1% |
| 4 | 82.8% | 91.4% |
| 5 | 82.8% | 92.1% |
| 6 | 82.8% | 92.7% |
| 7 | 82.8% | 93.1% |
| 8 | 82.8% | 93.4% |
| 9 | 82.8% | 93.6% |
| 10 | 82.8% | 93.8% |
| 11 | 82.8% | 93.9% |
| 12 | 82.8% | 94.0% |
| 13 | 82.8% | 94.1% |
| 14 | 82.8% | 94.2% |
| 15 | 82.8% | 94.3% |
| 16 | 82.8% | 94.3% |

Figure 13:
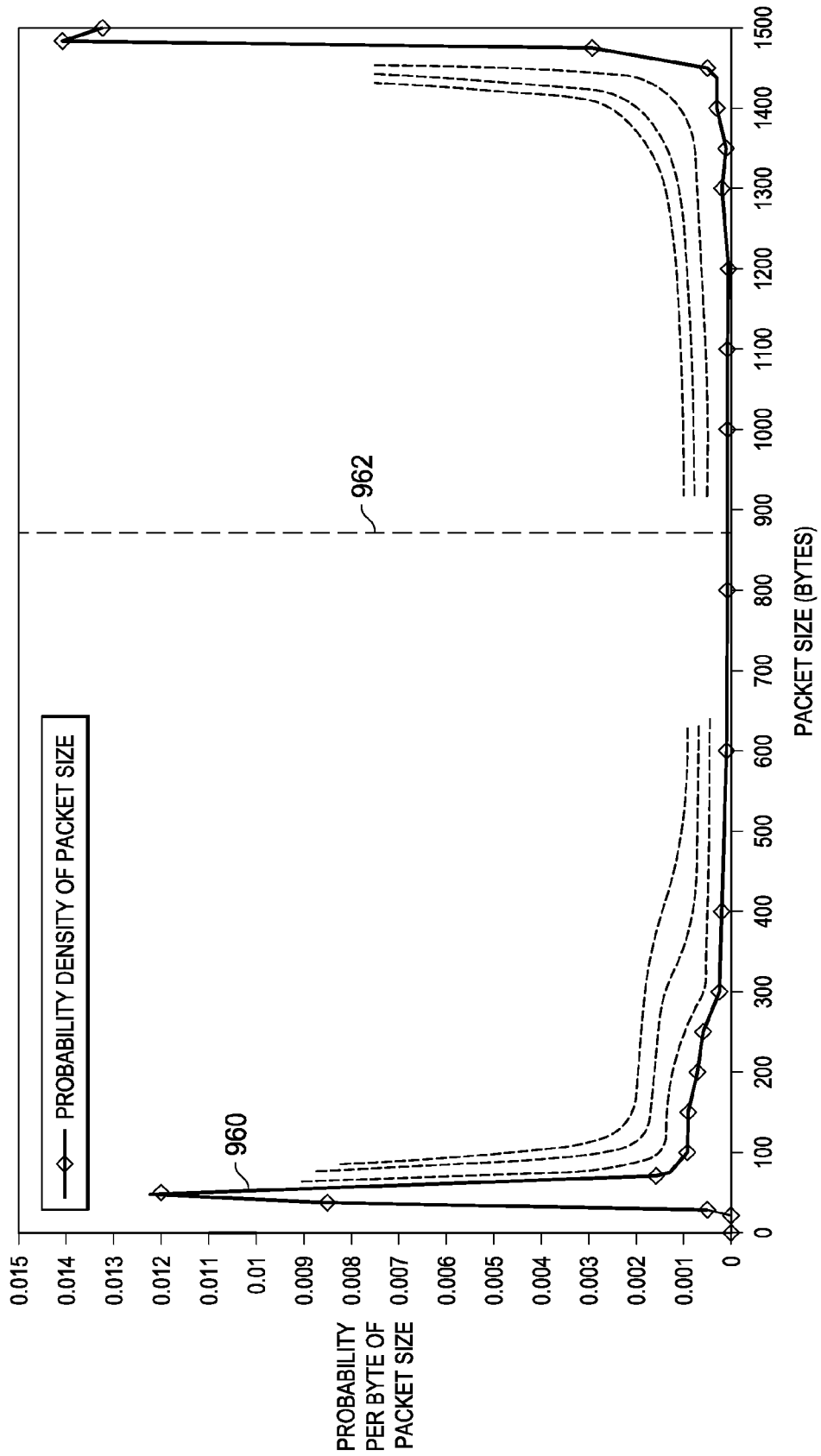
FIG. 13 illustrates a graph of probability density of packet size in a data center.

FIG. 13 is based on the same data as FIG. 6, but is plotted as a probability density of packet occurrence as a function of packet length. There is a peak in packet probability density at 50-120 bytes and at >1400-1450 bytes. The probability density of intermediate length packets is very low. Curves 960, 962, 964, and 966 represent various probability densities.

The packet length spectrum may be divided by a long/short threshold which may be set over a wide range of values, and the two groups of packet lengths may be treated separately and in different manners, because one group of lengths is dominated by maximum length packets and the other group of lengths is dominated by packets close to the minimum length.

FIG. 13 illustrates a graph of the bimodal distribution of traffic in a data center. Curve 960 shows the distribution of data, and curve 962 shows the threshold between long packets and short packets. The threshold may be varied from system to system or dynamically based on traffic. Packets may be separated by size for different treatment of long packets and short packets. The packets above the threshold are individually padded out to the length of a maximum length packet and encapsulated in a fixed length container, with one packet per container. The long packets are switched as individual packets, for example by a large port count photonic space switch operating at 100 Gb/s per port, with a frame time of around 100 ns to around 120 ns, or a 40 Gb/s per port rate with a frame time of around 250 ns to around 300 ns. The packets above the threshold make up about 85% to about 95% of the total bandwidth (although a smaller percentage of the number of packets) depending on the setting of the threshold value, where 85% corresponds to a threshold of around 1400 bytes and 95% corresponds to a threshold of around 450 bytes. Threshold values of 600, 800, and 1000 bytes correspond to splits of about 94%:6%, 92.5%:7.5%, and 91%: 9%, respectively. The short packet containers only carry about 5% to about 15% of the bandwidth (although a larger percentage of the number of packets). For packets above the threshold, the packet is padded out to 1500 bytes, and is switched in a fixed length container switch, for example a 100 ns to 120 ns framed fast synchronous photonic space switch. The packets below the threshold are mapped into various smaller payload granularity containers for electronic switching. Variable length containers may be used for short packets, leading to an asynchronous packet switch like structure. In another example, a harmonically related set of container sizes is used, leading to a layered time switch structure. In an additional example, a short container with a small payload size, which may be concatenated to handle larger packets, is used for an approach analogous to cell switching with concatenated cells as per ATM.

Several electronic switching approaches may be used to handle the short packets. Electronic switching is different from photonic switching, both because it employs electrons instead of photons, and because an electronic switch may readily store, process, buffer, and re-time the information. Electronic time switches and space switches may be used, and flows may be delayed and re-sequenced.

When the short packets are containerized in harmonically related size containers or a series of concatenated same size basic payload container blocks, a switching method other than pure packet switching may be used. The concatenated same size containers may be switched in a large cell switch, in a similar manner to ATM but with a different cell structure and size which involves each concatenated BPC having its own header, which increases bandwidth somewhat. The harmonically related containers may be switched in a layered space or time switch which has harmonically related frame lengths or port capacities. Additionally, the concatenated containers may be switched in a single layer switch, such as a time switch or space switch, where the switch is able to switch the concatenated containers sequentially through the same path. The frame-to-frame interaction between connection maps may introduce addressing complexity. The connection processing in three stage switches, such as Clos networks, involves the production of an extremely fast series of connection maps, which is problematic due to the interactions between paths in such switches.

While only between about 5% and about 15% of the overall bandwidth flows through the electronic path, the number of packets switched per second is comparable to that of the long packet switch, because the shorter packets individually occupy much less bandwidth. The split of aggregate packet rate into short and long packets is a function of packet length threshold, as illustrated in Table 10.

TABLE 10

| Packet Length Threshold (Bytes) | Percentage Traffic packets → Short Packet Processing | Percentage Traffic packets → Long Packet Processing | Ratio Of Packets Processed In Long/Short packet Paths |
|---|---|---|---|
| 500 | 42 | 58 | 1.38:1 |
| 600 | 44 | 56 | 1.27:1 |
| 800 | 45 | 55 | 1.22:1 |
| 1000 | 46 | 54 | 1.17:1 |
| 1200 | 47 | 53 | 1.13:1 |

When a common control approach is used to control switching of the containerized short packets, the control system produces connection information at a rate between about 72% and about 88% of the long packet control system.

Parallel operating massive electronic time switches running at a one GHz to a few (2-3) GHz clock rate may be used. Also, specific time switches may be used, which are both non-blocking and directly addressable, which have no stage-to-stage blocking, and only exhibit output contention when two inputs target the same output.

In a directly addressable switch, there is no free path search, because the paths do not interact. However, more than one source TOR may attempt to access any given output. Two or more inputs attempting to address the same output are detected, and all but one are rejected by returning a NACK to the packet splitter, so only at most one input connects to each output at a time. All of the connections may be independently written.

Figure 14:
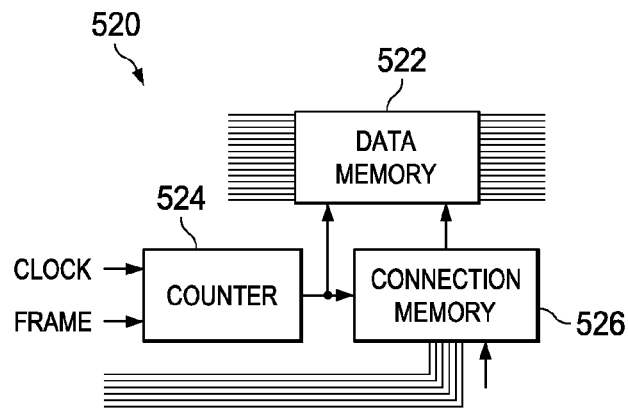
FIG. 14 illustrates an embodiment time division multiplexing (TDM) switch.
Figure 15:
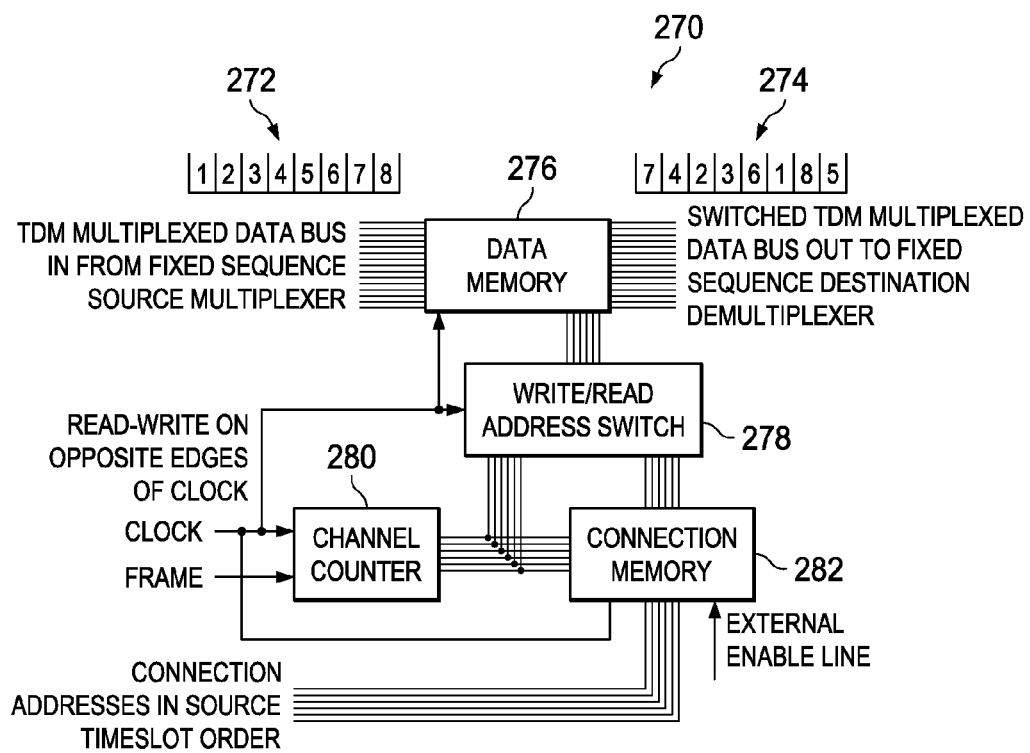
FIG. 15 illustrates another embodiment TDM switch.
Figure 16:
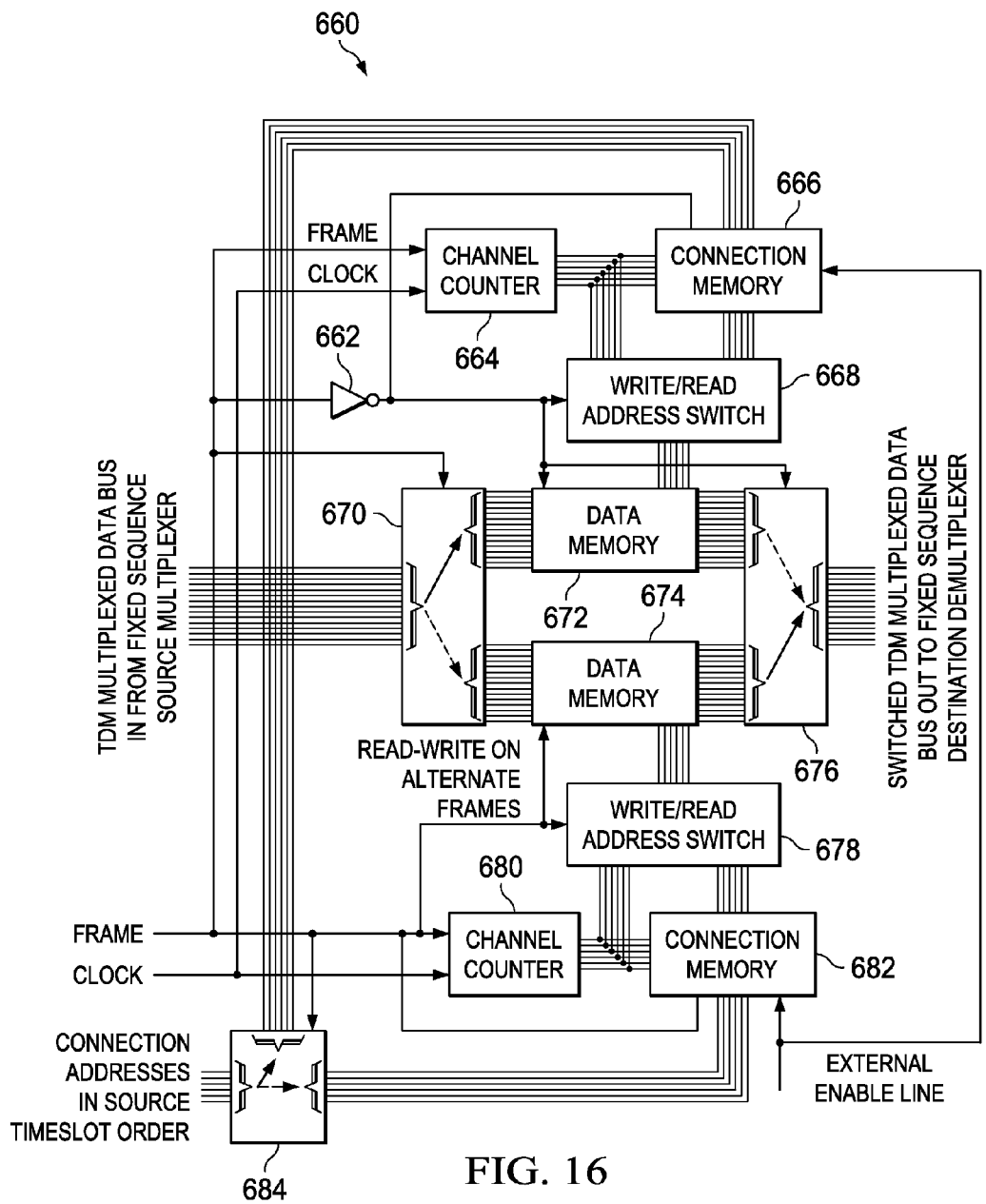
FIG. 16 illustrates an embodiment double buffered TDM switch.

Matrixed and commutated time switches are non-blocking and directly addressable. Additionally, commutated matrixed time switches, which are compound structures of both approaches, are also both non-blocking and directly addressable. FIGS. 14-16 show the structure of a time division multiplexed switch. The data to be switched between multiple sources and multiple destinations is assembled by time division multiplexing in a time division multiplexer on the input bus into the switch. The tributary sources and destinations each have a specific timeslot location, so that the source outputs data on the bus and the destination reads data off of the bus in the assigned timeslot. The sources have pre-set timeslots in which they can, in sequence, enter their output data, and the destinations have pre-set timeslots in which they extract their data. The bus has a bus width, corresponding to the number of bits in a timeslot, of Z. These timeslots create a multiplexed sequence in a round robin scanning or a collection of timeslot payloads from all of the input sources, before repeating the process. The duration of this process, which is the duration for the inputs contributing one timeslot of data, is the switching frame period. These timeslots proceed to the destination demultiplexer, and are demultiplexed to create individual feeds to individual destinations. Because both the multiplexer and demultiplexer mapping sequences are fixed, only one mapping has occurred, and switching has not occurred.

Data sources 1, 2, 3, and 4, each inject a timeslot in sequence into a four timeslot frame. The data from these is sequenced as Payload 1 (P1), Payload 2 (P2), Payload 3 (P3), and Payload 4 (P4). The framed data is sent to a demultiplexer which parcels out the timeslots in a fixed manner to respective destinations A, B, C, and D. A time switch changes the order of the timeslots on the bus feed into the demultiplexer, so it delivers the information to the correct destination.

To have data source 1 connect to destination C, the payload contents of the input timeslot 1 are moved to be in the third timeslot on the frame. In FIG. 14, with time division multiplexing (TDM) time switch 520, this may be done by writing timeslots into sequential locations in data memory (DM) 522, and reading them out in a revised sequence, where the output timeslot for the DM contents corresponds to the destination location. This re-sequencing information is stored in connection memory (CM) 526. The output of CM 526 drives the DM location, which is read out to re-sequence the time division multiplexed streams. Counter 524 coordinates the timing for writing and reading timeslots. The incoming traffic timeslots are written into sequential locations in the DM on one half of the clock cycle, and are read out from the appropriate DM locations controlled by the CM on the other half of the clock cycle. This creates a time-switched action, and the timeslots are moved, but they can be moved across frame boundaries. A timeslot which is written earlier in a frame than it is read out is read out in the same frame as it was written. However, a timeslot which is read out from the frame earlier than it is written leads to the previous frame's contents being read out in this timeslot, not the current frame's contents, and the newly written data is read out in the next timeslot.

FIG. 15 illustrates TDM switch 270. TDM data is received in a bus from a fixed sequence source multiplexer. The data is received in timeslots 272, which are written into data memory 276. Data memory 276 has the same number of timeslots as the number of timeslots per bus times the bus width. The clock is used for writing the data into the data memory.

The clock and frame number are input to channel counter 280, which counts the timeslots and controls the write location within the DM.

The channel counter and connection addresses in source timeslot order to be used in the DM read-out sequence are sent to connection memory 282. Also, an external enable line may be used for multi-switch implementations.

The connection memory output, channel counter output, and clock are input to write/read address switch 278, which controls the timeslots read out from data memory 276. Timeslots 274 contain the switched TDM multiplexed data bus output to a fixed sequence destination demultiplexer.

FIG. 16 illustrates double-buffered TDM switch 660. In a double-buffered time switch, there are two DMs and two CMs. One DM and one CM are written by the input bus and connection information source, while the other CM drives the other DM to deliver the previous frame's data. Then, the two DMs and two CMs switch roles. As a result, all of the data written into the switch on one frame period exits the switch as switched data on the next frame period. There is no ambiguity about which inputs emerge as outputs in which frames. The double-buffered switch is not twice as complex for the same throughput, because the clock cycle is no longer the period for a read and write, but for a read or a write, so the clock rate is doubled, for twice the number of timeslots on the bus, and double the throughput capacity.

In double-buffered TDM switch 660, TDM multiplexed data is received on a bus from a fixed sequence source multiplexer. The data is switched to either data memory 672 or data memory 674 based on switch 670, a 1×2 switch. Alternate frames are written to alternate data memories. Also, the connection address in source order is sent to either connection memory 666 or connection memory 682 by switch 684, a 1×2 switch. The connection address is written to the connection memory corresponding to the data memory. Channel counter 680 counts the channel and controls the reading and writing of the address from data memory 674 via write/read address switch 678 based on the frame and clock. Similarly, based on the negative of the frame from not gate 662, channel counter 664 counts the channel and controls the reading and writing of the address from data memory 672 via write/read address switch 668. The outputs from data memory 672 and data memory 674 are combined by switch 676, a 2×1 switch, which outputs the switched TDM multiplexed data bus to a fixed sequence destination multiplexer.

Either a simple TDM switch or double buffered TDM switch may be used to build up a larger matrix.

In a TDM switch clocked at rate K with an input bus width B, the total input capacity of the bus, and the switch and output bus capacity, is K×B. When there are S sources, the average bandwidth per source is (K×B)/S. When each source takes one timeslot, there are S timeslots on the bus, and the frame length is S timeslots, and the frame period is S/K=F, and each timeslot contains B bits. For example, in a switch with a clock rate of 2 GHz, 64 sources, and a 32 bit bus, the overall throughput bandwidth of the switch is 64 Gb/s. When each source is associated with one timeslot, there are 64 timeslots, and a frame period of 32 ns. Then, each source has an input port capacity of 1 Gb/s in the form of 32 bit timeslots every 32 ns. Such a switch may switch continuous streams of data at a capacity of 1 Gb/s per path by continuously using the same connection map, may switch 32 bit words of data to different locations once per 32 ns per port when the connection map is changed every frame, or an intermediate modularity or capacity may be switched by different treatments of the connection mapping. For more agile applications, with rapid changes to the connection mapping, simple connection control processing is used, for example directly applying the input requests to set up the switch with no additional processing.

To increase the capacity of a time switch, the clock rate and/or input and output bus width may be increased. Increasing the number of tributaries may be done by increasing the number of timeslots per frame, either by increasing the frame duration or increasing the clock speed. A variety of more complex structures may be made out of time switches, including Clos switches, matrixed switches, and commutated switches.

Figure 17:
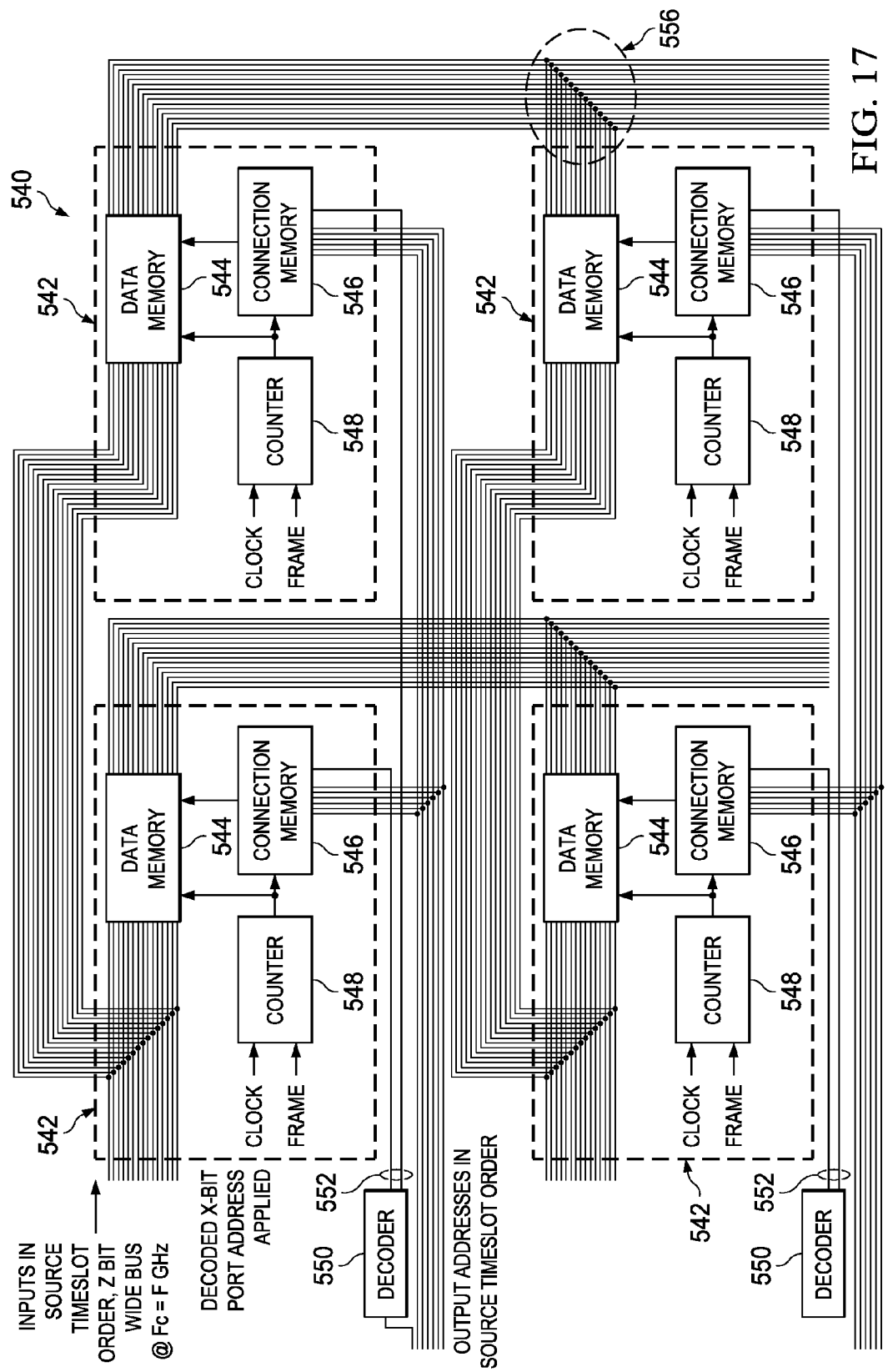
FIG. 17 illustrates an embodiment matrixed time switch.

FIG. 17 illustrates matrixed switch 540, a 2×2 matrix of time switches. Matrixed switch 540 includes four switches 542, which may be simple TDM time switches or double buffered TDM time switches. Each switch 542 contains DM 544, CM 546, and counter 548. The rows are coupled to a common set of inputs. Decoders 550 produce decoded X bit port addresses 552 which are applied to enable CM writing, DM writing, and output enabling in the CM. The inputs are received in source timeslot order, and the output addresses are received in source timeslot order. The columns are connected to a common set of outputs in a wire OR configuration with wire OR function 556. In another example, logic gates or selector switches are used instead of wire ORs. The matrixing increases the input and output capacities of the switch by a factor equal to the number of input rows or output columns. Switch 540 has double the throughput of the original building block.

Figure 18A:
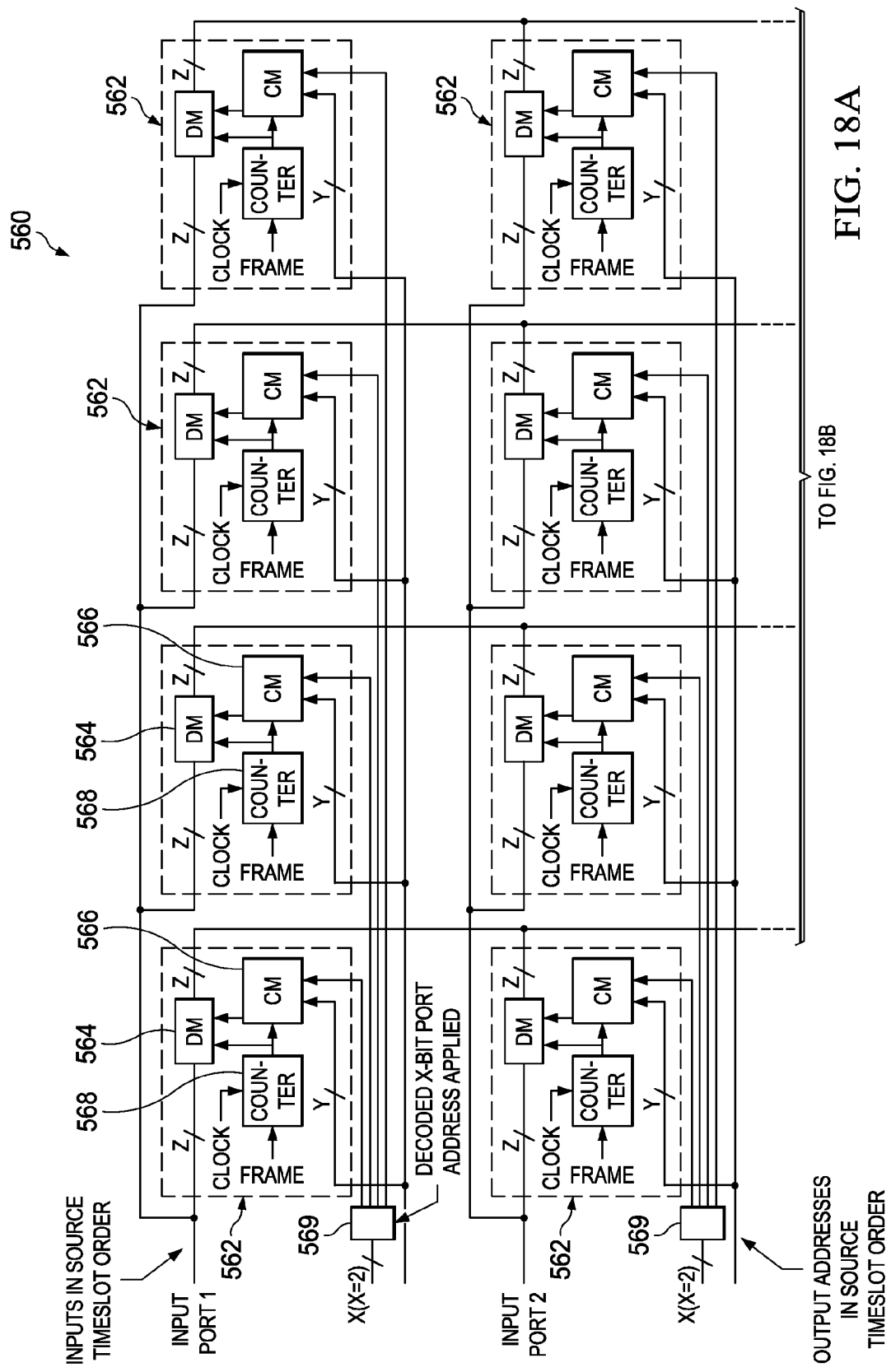
FIGS. 18A-B illustrate another embodiment matrixed time switch.
Figure 18B:
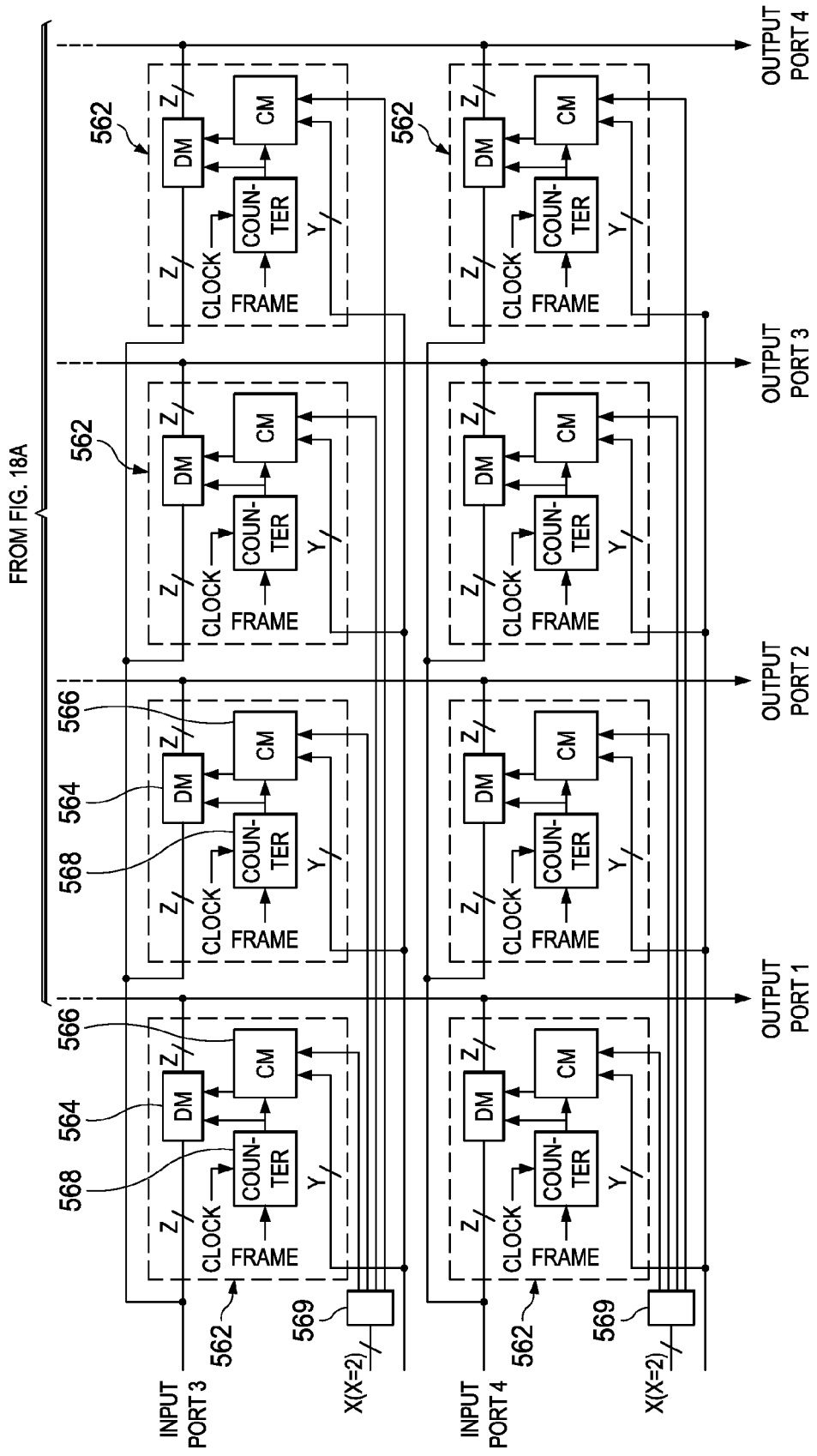

FIGS. 18A-B illustrates matrixed switch 560, a four by four matrix of switches 562, which each contain DM 564, CM 566, and counter 568. The rows are coupled to a common set of inputs, and decoders 569 produce decoded addresses. The inputs are received in source timeslot order, and the output addresses are received in source timeslot order. The columns are connected to a common set of outputs with an OR function. Matrixed switch 560 has four times the capacity of a building block, and uses 16 building blocks. Thus, the throughput grows by the number of input busses (I), and the number of building blocks grows as $I^2$.

A matrixed time switch may be non-blocking without dilation. Also, in a matrixed time switch, the links between inputs and outputs are achieved by a single switching operation, allowing simpler control. Additionally, the matrixed switch is directly addressable. The connection request destination addresses used in the BPCs may also be sent directly to the switch control as an advanced timed message ahead of the container, and the switch may rapidly set up connections based on that information without any further computation of connection paths, because the switch has a deterministic connection map. A deterministic connection map is a connection map where the same known path is taken through the switch for any connection from a specific input to a specific output, independent of any or all other connections. When each path's deterministic connection map contents is directly taken from the output address number of the output port, the switch is directly addressable. However, a deterministic connection switch with direct addressing cannot output two inputs through the same output simultaneously, so, in the event of more than one independent source TOR requesting the same destination TOR at the same time, all but one of the contending requests must be rejected.

In one example, a BPC has a length of 64 bytes or 512 bits. With an actual or virtual 512 bit wide bus, one BPC may be written into every timeslot. With a TOR output of 100 Gb/s, the short packet output may handle a peak of from about 5 Gb/s to about 15 Gb/s. The peak BPC occurrence rate is around 13.3 M/sec per TOR to around 40 M/sec per TOR. The peak average rate is about 30% of this, so buffering and smoothing of the small packet containers allows the peak average delivery rate of BPCs into the switch to be from about 4 M to about 12 M for a frame time from around 83.3 ns to about 250 ns. In one example, a 100 ns frame period is used. With a double buffer in the matrix building blocks, the inputs and outputs are clocked at 2.56 GHz, and a frame duration of 100 ns corresponds to 256 timeslots per frame, which, at one time slot per TOR per frame corresponds to 256 TORs. Such a switch, with a bus width of 512 bits, has a throughput of 1.31 Tb/s, and provides 5.12 Gb/s of interconnect to and from each connected TOR port. A 2048 TOR data center may use an 8×8 array of 64 basic time switches in a matrixed configuration. A 1024 TOR data center may use a 4×4 array with 16 building block switches. Alternatively, a shorter frame time, such as 50 ns, is used which, with a 2.56 GHz clock, corresponds to 128 time-slots per frame. Such a switch, with a bus width of 512 bits, has a throughput of 1.31 Tb/s but provides 10.24 Gb/s of interconnect to each of 128 TOR ports. A 2048 TOR data center may use a 16×16 array of switches, while a 1024 TOR data center may use an 8×8 array of switches. A 16×16 array of such time switches has a throughput of 20.97 Tb/s, adequate to support up to a total switch node capacity of 250 Tb/s with a long/short split of 92%:8%, corresponding to a long/short split point of 850 bytes per packet, or lower. Thus, a quadranted architecture data center core reaches 1 Pb/s with pure per packet switching without address fragmentation issues.

The switch may be broken down into physical entities, where the switch is cut into slices, with each slice incorporating many matrix building blocks which are narrower than 512 bits. For example, eight or sixteen sets of modules are in parallel, each with 64 bit wide or 32 bit wide Input Output (I/O). The CMs are replicated.

A commutated switch is also a non-blocking directly addressable switch with a high throughput proportional to the number of input or output buses. In a commutated switch, the number of DM-CM building blocks grows linearly with port count, but individual DM and CM sizes increase in proportion to port count. Commutating and matrixing may be combined to form a matrixed commutated switch.

Figure 19:
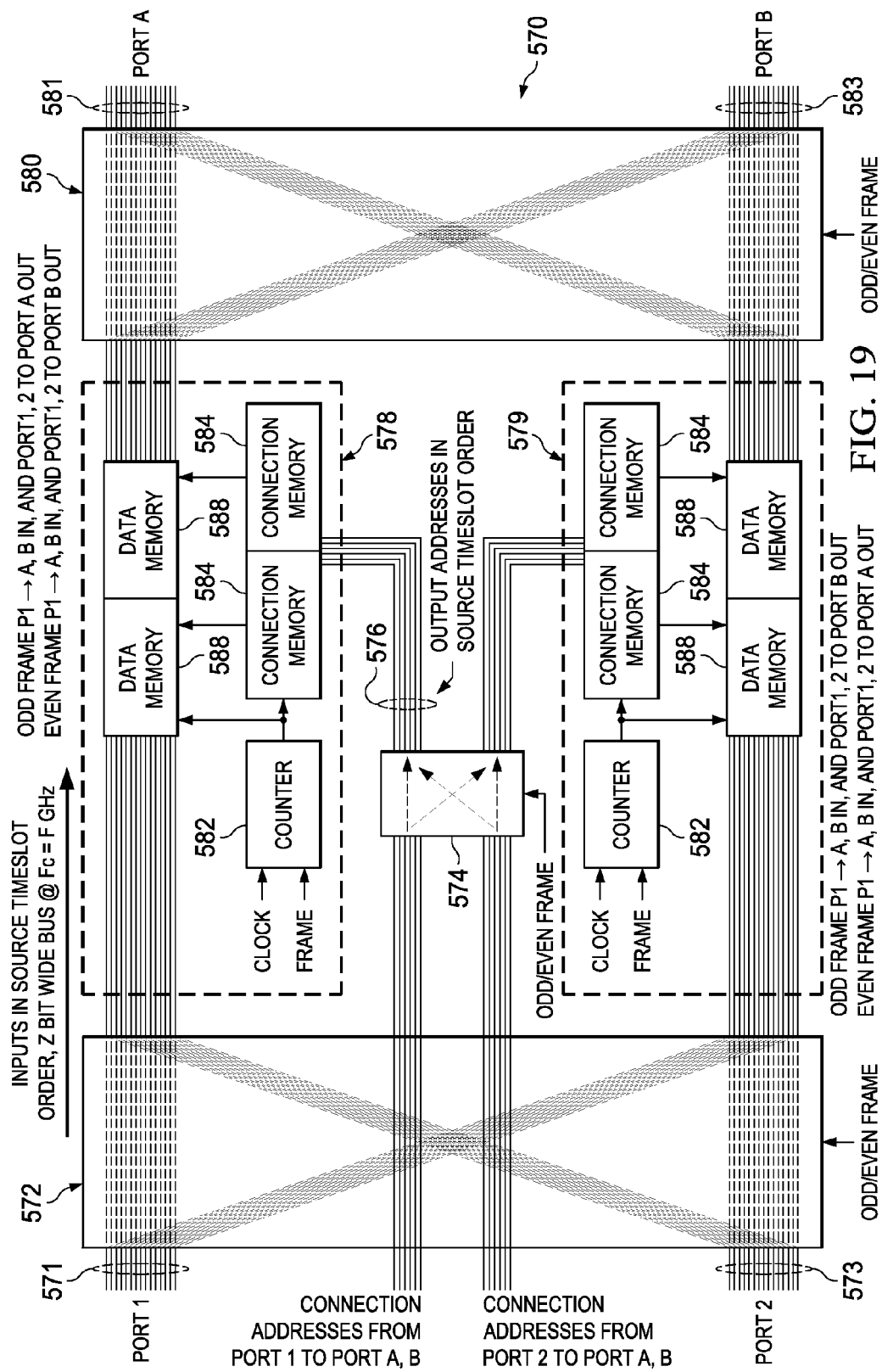
FIG. 19 illustrates an embodiment commutated time switch.

FIG. 19 illustrates a two way commutated time switch 570. Switches 578 contain DMs 588, CMs 584, and counters 582. Two time domain multiplexed data streams are input at a specific frame repetition rate. At each frame boundary, input commutating switch 572 reverses connections between connecting input port 571 to switch 578 and input port 573 in switch 579, and connecting input port 571 to switch 579 and input port 573 to switch 578. Likewise, output commutating switch 580 alternates connecting switch 578 to output port 581 and switch 579 to output port 583, and connecting switch 578 to output port 583 and switch 579 to output port 581. The individual switches contain DM 588, which is sufficiently deep to store the inputs from input port 571 and from input port 573. The DMs are alternately connected to output port 581 and output port 583 by output commutating switch 580. On an odd frame, input port 571 is connected to switch 578, which enters its data in a frame destined for both output port 581 and output port 583. Switch 578 is connected to output port 581, so it can write out stored data traffic for output port 581 originating from both input port 571 and input port 573. When the frame ends, the input port connections and output port connections are reversed, so that switch 578 receives inputs from input port 573 and switch 579 receives inputs from input port 571. Also, switch 578 provides connectivity from input port 571 half the time and from input port 573 half the time, and switch 578 provides output connections to output port 581 half of the time and to output port 583 half of the time. Additionally, address switch 574 directs the addressing to the appropriate switch with output addresses 576 in source timeslot order.

Figure 20:
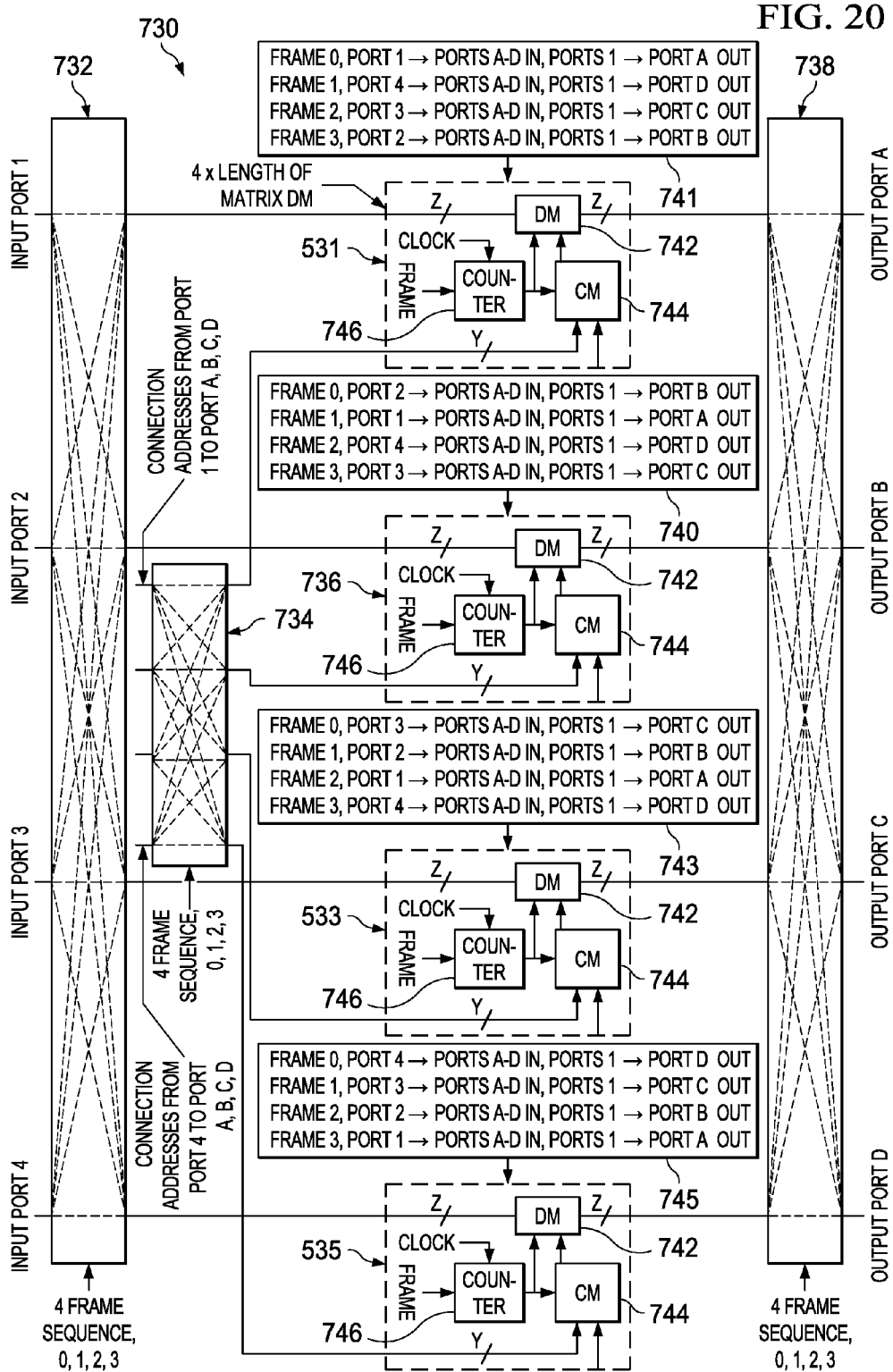
FIG. 20 illustrates another embodiment commutated time switch.

FIG. 20 illustrates a four way commutated time switch 730. Commutated time switch includes input commutator switch 732, output commutator switch 738, address switch 734 and switches 531, 736, 533, and 535, which contain DMs 742, CMs 744, and counters 746. Switch 531 uses mapping 741, switch 736 uses mapping 740, switch 533 uses mapping 743, and switch 535 uses mapping 745. There is a capacity gain of 4:1, with four DMs providing connectivity to and from specific ports for one quarter of the time each.

An embodiment data center has a capacity of 1 Pb/s with a four plane quadranted architecture, where each TOR has four inputs and four outputs connected in a load sharing manner to four parallel switch planes. One plane has a switch capacity of 250 Tb/s, where about 5% to about 15% of the traffic flows through the electronic switch. There may be one electronic switch per photonic switch, although a different ratio of electronic switches to photonic switches may be used.

In one example, 8% of the payload capacity flows through the electronic switch, which corresponds to a packet length threshold of around 850 bytes. In this example, the electronic switch in each quadrant handles 20 Tb/s. In another example with a 100 Tb/s switch quadrant based datacenter, the electronic switch in each quadrant handles 2 Tb/s.

The granularity of the switch may match the basic payload container building block. For a concatenated container structure, there is a granularity of about 64 bytes, and for a harmonically related container structure, $64 \cdot 2^n$ bytes in a layered fabric structure. The payload granularity may be delivered within a single frame of the switch by concatenating timeslots, or over multiple frames by repeated use of a specific time-slot in each of several frames.

In an example with a 2.56 GHz clock rate for the electronic time switches and a parallel structure which is 512 bits wide partitioned into eight parallel slices, each slice has 64 parallel tracks, and the per-port capacity of each slice of the switch is 163.84 Gb/s, resulting in an aggregate capacity per 512-wide bus of 1.31072 Tb/s. A 16 port slice provides a capacity of 163.84 Gb/s×16=2621.44 Gb/s per switch slice, which provides a total capacity of 20.97152 Tb/s over 8 parallel slices. There is a one word per frame granularity of 64 bits, which is one eighth of the BPC. A BPC may be spread out over eight slices of the switching operation, or eight concatenated timeslots may be used on one slice.

Thus, an embodiment electronic switch for use as a slice of the overall electronic switch in parallel with an array of identical slices is a 64 wide 16×16 port 2.56 GHz clocked directly addressable, non-blocking switch which may be matrixed, commutated, or both matrixed and commutated. The switch slice has a throughput of 2.56×64×16 Gb/s=2.62144 Tb/s, with 8 such slices in parallel providing a 20.97152 Tb/s switch. Alternatively, 32×32 or 64×64 port 64 bit wide switch slices at 2.56 GHz may be used, for a capacity of 5.24288 Tb/s and 10.48576 Tb/s per slice, respectively, but with 1024 or 4096 switch nodes per slice, respectively. Multiple nodes may be accommodated in a single application specific integrated circuit (ASIC). When a 64 bit wide slice of a 512 bit wide structure is used, the result is an eight module switching core for an 80 Tb/s BPC switch. Table 11 shows the DM count, CM count, commutation level, matrixing level, and delay in an example electronic switch for 64×64, 32×32, and 16×16 implementations.

TABLE 11

| Matrixing Level | Commutation Level | Number Of Data Memories | DM Length Relative To Commutation Level of 1 | Delay Through Switch (Frames) |
|---|---|---|---|---|
| 64 × 64 | | | | |
| 64 | 1 | 4096 | 1 | 1 |
| 32 | 2 | 2048 | 2 | Up to 2 |
| 16 | 4 | 1024 | 4 | Up to 4 |
| 8 | 8 | 512 | 8 | Up to 8 |
| 4 | 16 | 256 | 16 | Up to 16 |
| 2 | 32 | 128 | 32 | Up to 32 |
| 1 | 64 | 64 | 64 | Up to 64 |
| 32 × 32 | | | | |
| 32 | 1 | 1024 | 1 | 1 |
| 16 | 2 | 512 | 2 | Up to 2 |
| 8 | 4 | 256 | 4 | Up to 4 |
| 4 | 8 | 128 | 8 | Up to 8 |

TABLE 11-continued

| Matrixing Level | Commutation Level | Number Of Data Memories | DM Length Relative To Commutation Level of 1 | Delay Through Switch (Frames) |
|---|---|---|---|---|
| 2 | 16 | 64 | 16 | Up to 16 |
| 1 | 32 | 32 | 32 | Up to 32 |
| 16 × 16 | | | | |
| 16 | 1 | 256 | 1 | 1 |
| 8 | 2 | 128 | 2 | Up to 2 |
| 4 | 4 | 64 | 4 | Up to 4 |
| 2 | 8 | 32 | 8 | Up to 8 |
| 1 | 16 | 16 | 16 | Up to 16 |

When the frame duration is F and the clock rate is K, each 64 wide port handles 64KF bits, which are written into the DM. This process continues for C frames, where C is the commutation level, so the size of each DM is 64KFC bits, which may be organized as a memory of KFC words*64 bits per word, for a granularity of 64 bits. In this example, the frame length is 100 ns, although other frame lengths have different capacities per TOR and different numbers of TORs in a group on a switch bus. Table 12 illustrates the numerical relationships between these values and the resultant memory sizes. For highly matrixed switches, while the delay is low, the fragmentation into individual DM blocks is very high. For example, 4096 DMs are used with a 1:64 fan-out and fan-in. For 64 way commutation, the fan-in and fan-out of each DM is reduced to one, and the number of locations is reduced to 64, but the delay increases to 6.4 μs. A commutation level of C=16 provides a maximum delay of 1.6 μs with a 100 ns frame, but would be 800 ns with a 50 ns frame. These numbers double when double buffering is used.

TABLE 12

| Matrixing Level | Commutating Level | Number of DMs | DM Length | DM Size (Bytes) | Number of CMs | CM Length | CM width | CM Size | Max. Delay (ns) |
|---|---|---|---|---|---|---|---|---|---|
| 64 × 64 64 wide slice | | | | | | | | | |
| 64 | 1 | 4096 | 256 | 2k | 4096 | 256 | 8 | 256 | 100 |
| 32 | 2 | 2048 | 512 | 4k | 2048 | 512 | 9 | 576 | 200 |
| 16 | 4 | 1024 | 1024 | 8k | 1024 | 1024 | 10 | 1280 | 400 |
| 8 | 8 | 512 | 2048 | 16k | 512 | 2048 | 11 | 2816 | 800 |
| 4 | 16 | 256 | 4096 | 32k | 256 | 4096 | 12 | 6144 | 1600 |
| 2 | 32 | 128 | 8192 | 64k | 128 | 8192 | 13 | 13312 | 3200 |
| 1 | 64 | 64 | 16384 | 128k | 64 | 16384 | 14 | 28672 | 6400 |
| 32 × 32 64 wide slice | | | | | | | | | |
| 32 | 1 | 1024 | 256 | 2k | 1024 | 256 | 8 | 256 | 100 |
| 16 | 2 | 512 | 512 | 4k | 512 | 512 | 9 | 576 | 200 |
| 8 | 4 | 256 | 1024 | 8k | 256 | 1024 | 10 | 1280 | 400 |
| 4 | 8 | 128 | 2048 | 16k | 128 | 2048 | 11 | 2816 | 800 |
| 2 | 16 | 64 | 4096 | 32k | 64 | 4096 | 12 | 6144 | 1600 |
| 1 | 32 | 32 | 8192 | 64k | 32 | 8192 | 13 | 13312 | 3200 |
| 16 × 16 64 wide slice | | | | | | | | | |
| 16 | 1 | 256 | 256 | 2k | 256 | 256 | 8 | 256 | 100 |
| 8 | 2 | 128 | 512 | 4k | 128 | 512 | 9 | 576 | 200 |
| 4 | 4 | 64 | 1024 | 8k | 64 | 1024 | 10 | 1280 | 400 |
| 2 | 8 | 32 | 2048 | 16k | 32 | 2048 | 11 | 2816 | 800 |
| 1 | 16 | 16 | 4096 | 32k | 16 | 4096 | 12 | 6144 | 1600 |

For a 64×64 slice and for C=16, there are 256 DMs and 256 CMs, each DM is 256 kbits, and each CM is 6.144 kbits. The delay is between about 100 ns for the best case connections and 1.6 μs for the worst case connections. The average delay is about half the maximum delay. Multiple DMs and CMs may be combined into a single ASIC. When all pins are driven with a single input or output signal, the minimum pin-out, besides power and ground, is the DM input bus width plus the output bus width plus the CM input bus width, plus approximately a dozen more pins for each switch node. Table 13 shows some example pin configurations for separated switch nodes inside a module, where each packaged ASIC is part of the matrix column. A 4096 DM purely matrixed switch slice may use an array of 512 switch ASICs per slice, and a 1024 DM purely matrixed array may use 128 ASICs per slice.

TABLE 13

| Number of Nodes/ASIC | DM Input pin-out | DM Output Pin-out | CM Pin-out | Overhead/ misc. signal pin-out | Total pin-out of H/s signals |
|---|---|---|---|---|---|
| 1 | 64 | 64 | 12 | 12 | 152 |
| 2 | 128 | 128 | 24 | 12 | 292 |
| 4 | 256 | 256 | 48 | 12 | 572 |
| 8 | 512 | 512 | 96 | 12 | 1132 |
| 16 | 1024 | 1024 | 192 | 12 | 2152 |

Table 14 shows the outputs with output sharing, where each packaged ASIC is part of the matrix column, so the bus wire-OR or combinational logic is included in the chip. When a 1292 pin packaging is manageable, a 4096 DM purely matrixed array may use 256 ASICs per slice, and a 1024 DM purely matrixed array may use 64 ASICs per slice.

TABLE 14

| Number of Nodes/ ASIC | DM Input pin-out | DM Output Pin-out | CM Pin-out | Overhead/ misc. signal pin-out | Total pin-out of H/s signals | Pin-count reduction |
|---|---|---|---|---|---|---|
| 1 | 64 | 64 | 12 | 12 | 152 | |
| 2 | 128 | 64 | 24 | 12 | 228 | 4 |
| 4 | 256 | 64 | 48 | 12 | 380 | 92 |
| 8 | 512 | 64 | 96 | 12 | 684 | 48 |
| 16 | 1024 | 64 | 192 | 12 | 1292 | 60 |

In an embodiment, the connection path is identified and reserved for a fixed size container or a train of fixed size containers to be passed through the switch with the container output contention being resolved in advance. The paths through the switch are identified, and each stage connection is calculated before the containerized packet is sent. Thus, the routing or connection information is sent in advance of the packets. Matrixed time switches, matrixed space switches, and commutated time switches may be non-blocking and directly addressable. There is a unique path from each input to each output, irrespective of the other connections, except connections attempting to use the same output. Thus, connection processing may be fast.

FIG. 2 illustrates system 220 for photonically switching long packets and electronically switching short packets. The four main building blocks of the hybrid photonic electronic packet switch are a packet splitter, a photonic switching fabric, an electronic switching fabric, and a packet combiner. The packet splitters and packet combiners may be stand-alone devices, or may be integrated into the source and destination TORs, respectively.

Packets are transmitted by source TOR switches 222.

The destination TOR address of a packet and the packet length are determined in address module 226 of packet splitters 224. There may be one packet splitter per source TOR. In one example, the destination TOR address and packet length are determined based on the packet. In another example, the packet splitter is integrated in the source TOR and the destination TOR address and packet length are known. The packet length, address, and packet are sent to splitting block 236.

The packets are separated into a long packet stream and a short packet stream by splitting block 236, where the packet length is compared to a threshold. Packets with a length above a threshold are classified as long packets, while packets with a length less than or equal to the threshold are classified as short packets. A sequence number is assigned to the packet, so that packets can be processed in their original order at the destination TOR. Short packets are directed to short packet block 238, while long packets are directed to long packet block 228.

In long packet block 228, long packets are containerized, with one packet placed in the payload, which is padded out to have the maximum packet length. In long packet block 228, long packets are buffered and padded out to a maximum length before becoming associated with a container. The container has the TOR-to-TOR addressing information, including the source TOR address and destination TOR address, the actual packet length, which is used for removing the padding in the packet combiner, a CRC over the container, and a sequence number, which is used for sequencing in the packet combiner. Also, the packets are accelerated to accommodate sequences of shorter than maximum length packets and to provide an increased IPG or ICG for switch set up time. Thus, the container clock rate may be higher than the input clock rate. The ICG or IPG may be increased to facilitate time for the switch to be physically reconfigured between the end of one container and the start of the next container, and to reduce the impacts of skew. There may be skew between the packet splitter and the photonic switch and in the photonic switch between switch stages. The destination address is passed to connection request module 232 to set up the long packet switch connection.

Connection requests are transmitted by connection request module 232 to photonic switch controller 246, in photonic switch 242, which sets up the switch connections in photonic switch 242.

After sufficient time for the connection to be set up, but not necessarily sufficient time for an ACK or NACK to be received via the cabling back at the packet splitter, the long packet container is transmitted to photonic switch 244 for switching to the destination, after rate smoothing from buffer and sent container store 230 with an output gating function, which may temporarily halt the container flow, causing the buffers to fill, or to cause a dummy container in the flow to be overwritten. Photonic switch 242 may be a three stage highly dilated Clos photonic switch or a matrixed photonic switch. The long packet container is also written to the buffer and sent container store 230. If an ACK is received, the container is deleted from the sent container store. If a NACK is received, the packet is marked for retransmission.

Some of the containers in the container flow are not valid traffic containers. When packet splitter 224 does not have any long packet arriving and waiting for the containerization process, the packet splitter inserts a dummy packet or dummy container into the flow. The dummy container is passed to photonic switch 244 as part of the normal flow. The switch may discard the dummy container. When a dummy container is generated, it is noted by the controller of the output gating. The gate controller also tracks whether the sent container store is holding a container ready for retransmission. When the dummy container is initiated, a connection request for a new connection for a container in the sent container store is initiated. When there is not a container ready for retransmission, the dummy container may be routed to a destination TOR, for example to the destination TOR which has not been communicated with for the longest.

Short packets are mapped into payloads in short packet block 238. The containers may be individual packet fixed length containers, multi-packet containers, concatenated fixed length containers, harmonically related length containers, or variable size containers. When a fixed length single packet container is used, the containerization process may be similar for short packets and long packets, with the container concatenation process of short packets.

Harmonically related length containers may be formed. The single packet is placed in a container, where the size is chosen to be the shortest of a set of harmonically length related packets which can hold the entire container.

Concatenated BPC containers may be formed. A fixed length container size is used, where the packet may be larger than the container. When the packet is larger than the payload available on a single container, the packet is divided up into multiple concatenated containers, which may be switched together.

When a container is formed, a request for a destination connection in a future frame is sent to electronic switch controller 252 in electronic switches 248 from connection request module 232 to set up a connection in electronic switch 254 for the container.

After rate smoothing from buffer and sent container store 240, the container is transmitted to electronic switch 254 for switching to the destination. A copy of the sent short packet container is saved in buffer and sent container store 240. If an ACK is received, the container copy is discarded, because this indicates that the original sent container was successfully allocated a through path. If a NACK is received, the container copy is marked for retransmission.

Packet control module 234 coordinates the long and short packet transmissions and generates the data for the container headers, and instructs the connection request blocks to request a new short or long packet container connection.

The two packet streams are switched by photonic switch 244 and electronic switch 254. In electronic switch 254, the electronic packets are multiplexed by multiplexers 250, switched by electronic switch 254, and demultiplexed by demultiplexers 256.

The long packet stream and short packet stream are combined in packet combiners 258. Long packet containers are received by long packet block 260. The long packet container is deconstructed, and the padding is removed using the padding length indicator. The packet destination address is read to confirm that the container has been delivered to the correct TOR, and the packet source address and sequence number are read from the container overhead.

Short packets are received by short packet module 264. The short packets are de-containerized. The transport container source and destination addresses are read and the destination address is used to validate that the container has been correctly delivered. When concatenated packets are used, the packet is reconstructed from multiple concatenated containers.

The packets and their associated sequence number are routed to a software defined buffer associated with that source address. The software definition permits creating buffers within zones of large shared memory. In combining module 266, the long packet stream and short packet stream are combined based on the sequence numbers. This is controlled by reassembly controller 262. The sequences from the source TORs are adaptively interleaved based on the sequence numbers and source addresses to recreate the original packet stream. The buffers are then read out in strict packet sequence number order by sequentially reading out packets from each buffer without gaps in the sequence numbers. The buffers may be accessed in an order determined by a variety of methods, including round robin, or other approaches more responsive to the fill level. The output flow is assembled from all of the specific source related buffers. Because the individual buffers were read in strict packet sequence order without gapping in the sequence, the individual flows are packed in the same order as they had when they entered the packet splitter. Thus, packet sequence integrity is maintained in each data flow from each source TOR to each specific destination TOR.

Finally, the combined packet streams are directed to destination TORs 268.

There are four types of signals from the packets splitters to the switch fabrics. Long packet containers are transmitted in photonic form as traffic for the photonic switch fabric. Also, advanced timing connection requests for each long packet container are transmitted to the photonic switch fabric, so the photonic switching controller sets up connections for a future timeslot in the photonic switch. The short packet container stream is transmitted in optical form to the electronic switch. Additionally, the advanced timing connection requests are transmitted to the electronic switching controller in advance of the traffic.

Also, there are four types of transmissions from the switching fabric to the packet combiners. Connection ACKs and NACKs are received from the photonic switching fabric, indicating whether a connection was able to be made in the photonic switch in the requested timeslot. Similarly, connection ACKs and NACKs are received from the electronic switching fabric, indicating whether a connection was able to be made in the electronic switch in the requested timeslot. A timing control feedback signal from the photonic switch is received, to maintain the output timing and framing so the containers arrive at the photonic switch with aligned ICGs. Also, a timing control feedback signal from the electronic switching fabric is received to maintain the output timing so the containers arrive at the clock rate of the electronic switch and to coordinate frame numbering.

There may be four fibers per TOR to connect to the switching fabric. However, in one example with wavelength division multiplexing (WDM), two fibers are used. The first fiber carries long packet traffic to the core switch as 4×25 Gb/s in the 1300 nm wavelength. The short packet traffic to the core switch has 1 or 4×25 Gb/s in the 1550 nm waveband. Connection requests to both the short packet switch and the long packet switch are also transmitted in one 25 Gb/s signal in the 1550 nm wavelength. The second fiber carries long packet traffic from the core switch at 4×25 Gb/s in the 1300 nm waveband and short packet traffic from the core switch at 1 or 4×25 Gb/s in the 1550 nm waveband. Additionally, the second fiber contains ACKs/NACKs and timing feedback from both the long packet switch and the short packet switch, each at 1×25 Gb/s in the 1550 nm waveband.

Harmonically related length containers may be switched with hierarchically framed time switching. Concatenated basic containers may be switched by non-hierarchical time switching. Variable length containers may be switched by electronic packet switching.

The header and trailer in harmonically related length containers and concatenated basic containers are small and tailored to the TOR-to-TOR application in a data center. The header information may be used in the statistical multiplexing of BPCs or other forms of short containers en route to the electronic switch, the reconstruction of the overall packet stream at the destination, and for validation on the correct routing. The header may also be used for reverse path addressing within the overall splitter-switches-combiner assembly by reversing the location of the source and destination TOR, for example to generate ACK and NACK packets.

Table 15 shows statistics on short packet concatenation for BPCs of about 64 bytes payload capacity (top half) and 128 bytes payload capacity (bottom half) as a function of the setting of the long/short threshold. Around half of the packets are switched as a single BPC. Concatenating up to four BPCs covers about 81% to about 88% of all short containerized packets, depending on the long/short packet threshold and the length of the BPC. A larger BPC or a lower long/short threshold reduces both the number of concatenated transactions and the maximum level of concatenation. A larger BPC reduces bandwidth efficiency. A constant delay may be used.

TABLE 15

| Concatenation | Occurrence | Percentage of Containers with a Threshold of: | | | |
|---|---|---|---|---|---|
| | | 497 bytes | 625 bytes | 817 bytes | 1009 bytes |
| ~64 byte payload | | | | | |
| 1 | 1.000 | 51.58 | 50.29 | 48.89 | 47.83 |
| 2 | 0.273 | 14.07 | 13.71 | 13.33 | 13.04 |
| 3 | 0.227 | 11.72 | 11.43 | 11.11 | 10.87 |
| 4 | 0.205 | 10.55 | 10.29 | 10.00 | 9.78 |
| 5 | 0.091 | 4.69 | 4.57 | 4.44 | 4.35 |
| 6 | 0.068 | 3.52 | 3.43 | 3.33 | 3.26 |
| 7 | 0.041 | 2.11 | 2.06 | 2.00 | 1.96 |
| 8 | 0.034 | 1.76 | 1.71 | 1.67 | 1.63 |
| 9 | 0.027 | | 1.37 | 1.33 | 1.30 |
| 10 | 0.023 | | 1.14 | 1.11 | 1.09 |
| 11 | 0.020 | | | 1.00 | 0.98 |
| 12 | 0.020 | | | 1.00 | 0.98 |
| 13 | 0.016 | | | 0.78 | 0.76 |
| 14 | 0.016 | | | | 0.76 |
| 15 | 0.016 | | | | 0.76 |
| 16 | 0.014 | | | | 0.65 |
| Total | | 100 | 100 | 100 | 100 |
| Percentage of short packets with Container Concatenation of 1-4 | | 87.93 | 85.71 | 83.33 | 81.52 |
| ~128 byte payload | | | | | |
| 1 | 1.000 | 65.61 | 63.71 | 62.22 | 60.87 |
| 2 | 0.273 | 22.27 | 21.62 | 21.11 | 20.65 |
| 3 | 0.227 | 8.21 | 8.00 | 7.77 | 7.61 |
| 4 | 0.205 | 3.87 | 3.87 | 3.67 | 3.59 |
| 5 | 0.091 | | 2.51 | 2.44 | 2.39 |
| 6 | 0.068 | | | 2.00 | 1.96 |
| 7 | 0.041 | | | 0.78 | 1.52 |
| 8 | 0.034 | | | | 1.41 |
| Total | | 100 | 100 | 100 | 100 |
| Percentage of short packets with Container Concatenation of 1-4 | | 100 | 97.49 | 94.78 | 92.72 |

An embodiment hybrid long packet photonic switch/short packet electronic switch contains four entities: a packet splitter, a photonic long packet switch fabric, an electronic short packet switch, and a packet combiner, as shown in FIG. 2.

Figure 21A:
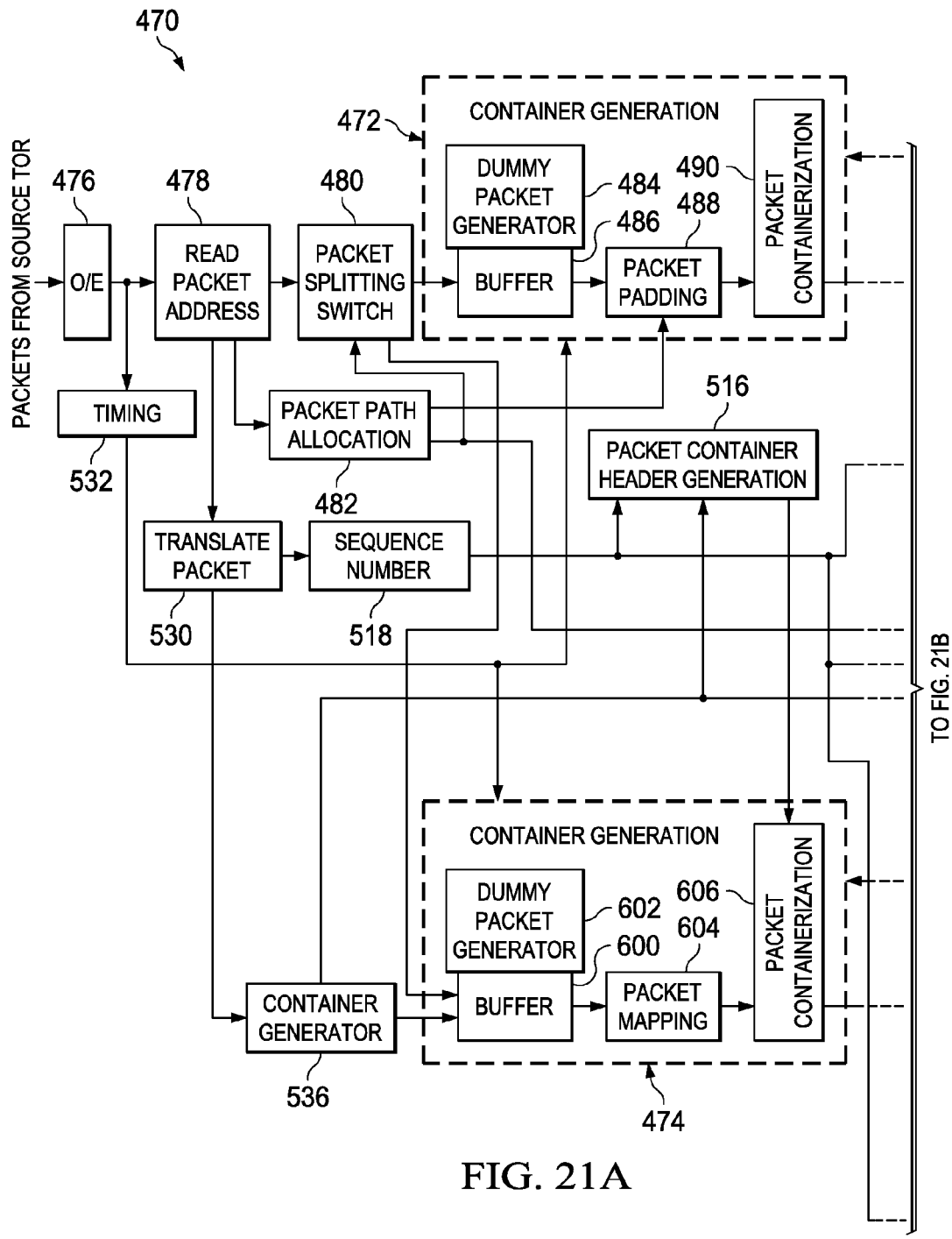
FIGS. 21A-B illustrate an embodiment packet splitter.
Figure 21B:
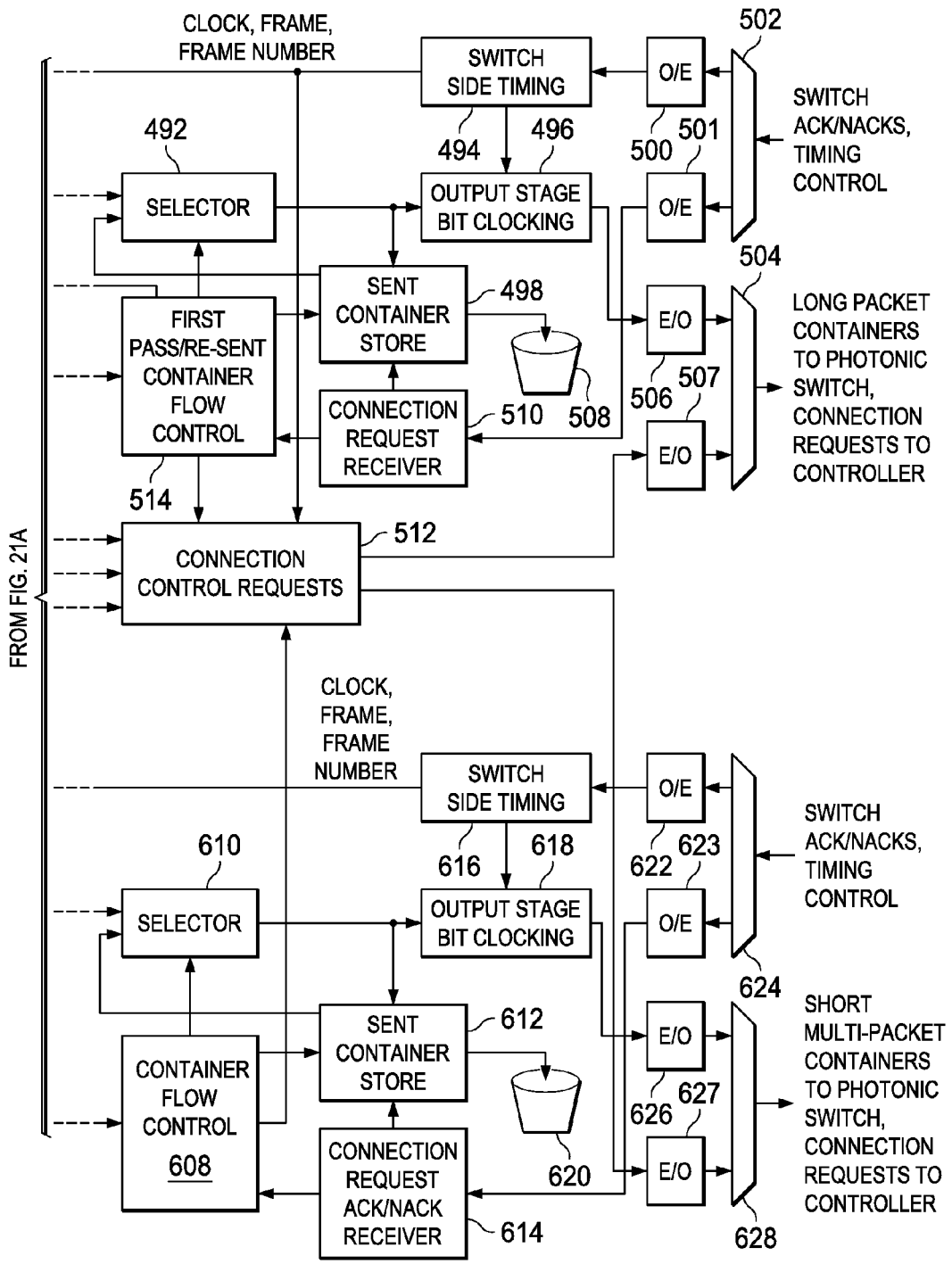

FIGS. 21A-B illustrate packet splitter 470. Packet splitter 470 is depicted as a stand-alone device, but it may be integrated into a TOR. A 100 Gb/s data stream of packets to be switched enters the packet splitter from the source TOR. This packet stream is converted from an optical stream to an electrical stream by optical to electrical (OLE) converter 476. This may be done using a byte wide or wider structure to match the clock speeds.

The packet addresses and packet lengths are read in packet address module 478. The packet addresses, which may be specific server/server flow granular addresses, may translate into individual destination TOR and destination TOR group addresses. In one example, this is generated by a process of mapping the destination server/server flow address to the destination TOR address, which is the TOR address for that server. This may be done by a pre-loaded look-up table, or may be a part of the overall server or server flow address. Alternatively, when the packet address is integrated in a TOR, the individual destination TOR and TOR group addresses may be directly available. The length of the packet may be read from the packet header, for example from bits 16-31 of the packet header, or by directly measuring the packet length as it enters the address reader.

The packet length information is passed to packet path allocator 482, which compares the packet length to a packet length threshold. In one example, the packet length threshold is fixed. Alternatively, the packet length threshold can be adjusted dynamically, for example on a data center wide basis or a TOR specific basis, so the splitting process dynamically adapts to the traffic. When the packet length is greater than or equal to the packet length threshold, the packet is determined to be a long packet. When the packet length is less than the packet length threshold, the packet is determined to be a short packet. Packet path allocator 482 passes the decision to packet splitting switch 480. Also, the packet path allocator provides the decision to container generator 536 and connection control request block 512.

Packet splitting switch 480 diverts the individual packets of the streams into long packet processing or short packet processing based on the packet threshold decision from packet path allocator 482.

The long packet stream is fed to container generation block 472, which conditions the long packets. The packet is containerized, synchronized, and timed for transmission to the photonic switch. Container generation block 472 contains buffer 486 with dummy packet generator 484, packet padding module 488, and packet containerization module 490. There may be separate input and output buffers. As pictured, buffer 486 provides both delay and acceleration based on timing information from timing block 532, framing, and frame timing of the photonic switch. Thus, the photonic switch side of the long packet container generator is synchronously locked to the photonic switch timing, for the containers from the packet splitters and combiners to arrive aligned and at the same rate at the photonic switch.

The packet stream exits the buffer at the photonic switch clock rate, which is faster than the input clock rate. The buffer fill is constantly being depleted. When a packet is read out of the buffer, the buffer output halts while the packet is padded with a padding sequence in packet padding module 488. The padding leads to the packet have a fixed payload length. For example, the packets may be padded to a standard length, such as 1500 bytes. A variable amount of padding may be added based on the actual packet length, which may be between the full packet length down to the packet length threshold, which may be in the range of 500 bytes to 1200 bytes. For this range of long/short thresholds, padding of up to 300 to 1000 bytes for the shortest long packet may be added, increasing its size substantially.

The padding might be problematic if most packets were smaller long packets. However, most long packets are close to or at the maximum packet length, and the low probability of occurrence of significantly shorter than maximum length packets only introduces a modest bandwidth increase. However, it does introduce a large transient increase in the clock rate during the shorter long packets, especially when a sequence of short long packets occurs. However, these tend to be limited in length. The buffer length, and/or placing some of the buffering at the output of the container generator, leads to the clock rate increase being contained and converted into a small static clock rate increase.

While the container generation is occurring for one packet, the next packet is read out of the buffer in the same process. The output clock rate may be a higher multiple above the input clock rate than the average increase in size of the switched entity from the packet padding and containerization process, so the buffer tends towards underflow. Underflow may be avoided by adding dummy traffic by dummy packet generator 484. Dummy packets may be used to maintain signals during periods of low packet traffic, for maintenance or test purposes, and/or with very low priority packet s or containers which may be preempted, for example for contending traffic containers to be retransmitted.

Packet container header information is generated in packet container header generator 516 based on the sequence numbers from sequence number block 518 which are applied consecutively to each long and short packet of each destination-specific data stream in the order they arrived at the packet splitter. The sequence number permits the flows being reassembled in the correct sequence when the short packet stream is combined with the long packet stream. The sequence numbers are applied according to the flow granularity, i.e. the TOR address being use with the destination TOR routing based on the de-containerized packets, and the sequence number applies to containerized packets destined for the same destination TOR. When reassembling the flow sequence, both the sequence number and the source address of the flows are used.

Packet containerization module 490 adds the header and trailer to the padded long packet to produce a long packet container. While this is occurring, the buffer begins to fill again. Buffer output gapping may also be used. Alternatively, a buffer is placed at the output of the container generation block to increase the ICG to relax the switch set-up time between switching frames. The packet containerization module also performs a CRC calculation over the assembled containerized padded packet and writes the computed CRC checksum data in the container. The container then exits container generation block 472 for selector block 492.

Selector block 492 may interrupt the flow of containers out of container generation block 472, for example for transmission or retransmission of a container which has not been delivered. The selector is controlled by a control algorithm, which may, for example, transmit valid new traffic first. In this example, the selector facilitates the newly formatted containers from the container generation module to flow through to the output stage bit clocking block 496 for a steady stream of new traffic, minimizing delay on new traffic. However, this may result in significant delay for traffic containers to be retransmitted, which may build up a backlog in heavy traffic. This may lead to incorrect sequencing of the containers in the output flow or saturating the sent container store 498. Incorrect sequencing may be prevented by using packet-associated sequential per-packet stream number sequences, which enable the detection of incorrect sequencing at the packet combiner, and correcting the sequence before the streams exit the packet combiner. However, other retransmission methods may be used, including retransmitting the packets first, which minimizes the delay of retransmitted containers, but results in a short hold time for the incoming traffic while the container is inserted. This does not disrupt the relationship between connection requests and transmitting new containers when the retransmission is at least one container signaling delay ahead of the decision by the packet splitter to retransmit a stored container. In an additional example, instead of receiving a NACK, the packet splitter receives a frame number reserved for retransmission of the rejected payload. Then, the frame numbers for the new containers already signaled but not yet transmitted may be shifted one frame under coordination between the switch controller and the packet splitter.

Packets passed to output stage bit clocking block 496 are also written into sent container store 498, where they are stored until an ACK or a NACK is received from the long packet photonic switch. The ACK or NACK may arrive before or after the container is written to the sent container store. The ACK or NACK may arrive about twice the propagation time to the long packet photonic switch from the time of flight of the optical signal over the fiber cabling runs between the packet splitter and the core switch, which may be 500 meters or more in a large data center and hence can introduce significant delay. If an ACK is received, the container is deleted from the sent container store in trash 508. If a NACK is received, the container is marked for retransmission.

ACKs, NACKs, and timing control information are received in wavelength division demultiplexer 502 from the long packet container switch. The ACKs/NACKs are on one wavelength, and the timing control information is on another wavelength.

The ACKs/NACKs are routed to O/E converter 501, to be converted from optical signals to electrical signals.

The electrical signals are routed to connection request receiver 510. Connection request receiver 510 requests that sent container store 498 deletes a container when an ACK is received, and requests a retransmission in container flow module 514 when a NACK is received.

When the sent container store has a container for retransmission and a dummy packet has been created in the initial buffer, the packet container slot is usurped by selector block 492 when the dummy packet emerges. In the meantime, connection control request block 512 requests a connection for the container to be retransmitted from the long packet photonic switch. When the dummy packet container reaches the selector switch, it is discarded, and the selector connects the sent container store to output stage bit clocking block 496 to retransmit the container.

The sent container store 498 may store 100 Gb/s packets for up to about 5 µs to about 10 µs, at which time an ACK or NACK may be received. For a 500 m connection, the time of flight is around 2.5 µs, or 5 µs for round trip. This may lead to a storage capacity of the sent container store of about 500 kbits or 64 kB.

Output stage bit clocking block 496 provides fine tuning of the data timing into electro-optic conversion so the arrival time of the start of the container is precisely aligned in time with the start of the switch frame at the input to the long packet switch. Additional details on the timing are included in U.S. patent application Ser. No. 14/508,676.

The containers are transmitted to electrical-to-optical (E/O) converters 506 to convert the optical signals from the electrical domain to the optical domain. The connection request is multiplexed with the connection request by WDM 504, for transmission of the long packet containers to the long packet container photonic switch.

Read packet address module 478 passes the packet address to translate packet block 530, where the packet address is converted into a destination TOR address, which is passed to connection control request block 512 via sequence number block 518.

Connection control request block 512 associates the address with a particular frame number indicating the timeslot for which a connection will be requested, for either the long or short packet, depending on the packet size. The address is then mapped into a messaging format for propagation to E/O converter 507 for a long packet container, where it is converted from an electrical signal to an optical signal. It is then wavelength division multiplexed by WDM 504 with the long packet traffic. The use of WDM facilitates the use of a single fiber for the long packet container path, reducing the number of optical fibers and facilitating a similar delay in time of flight. Connection control request block 512 also transmit retransmission requests for packets from sent container store 498.

Timing control information is converted from an optical signal to an electrical signal in O/E converter 500.

Then, switch side timing module 494 adjusts the timing based on this received signal.

Short packets are routed by packet splitting switch 480 into the short packet path, where the short packet stream is fed into the short container generator 474. Short container generation block contains buffer 600 coupled to dummy packet generator 602, packet mapping module 604, and packet containerization module 606.

Container generator 536 feeds a delineation marker to define the start and end of a new container payload. Container generator 536 generates container information for the short packet container. For example, for harmonically length related containers, the harmonic level and packet payload length are generated. In another example, with concatenated BPCs, the CSL number and packet length number are generated.

When the packet passes through short container generator 474, the container(s) are ready for transmission to the electronic switch fabric.

Buffer 600 accumulates short packets, and is loaded with dummy packets from dummy packet generator 602 when there are no short packets. Buffer 600 provides a controlled delay for timing the containers. Rate conversion from the clock rate extracted from the input data by timing block 532 to the clock rate, framing, and frame timing/numbering for the electronic switch is made during the buffer, for example by inserting dummy containers from dummy packet generator 602. Switch reference timing information is provided from the electronic switch, so the container timing is adjusted to arrive at the correct time at the short packet container switch at the far end of the cabling to that switch. Alternatively, because the switch is electronic, it may include a variable delay or alignment block in its input circuits to align the incoming data. Thus, the short packet container side of the splitter is synchronously locked to the electronic switch timing so containers arrive aligned and at the same clock rate as the electronic switch and at the correct phase. The packet stream exiting the buffer in the form of concatenated containers is at the photonic switch clock rate, which is faster than the input clock rate. Thus, the buffer fill is constantly being depleted. Because the buffer output clock rate is greater than the input clock rate, the buffer tends towards underflow. Dummy packets are inserted as needed to prevent underflow to keep the signals alive during periods of low packet traffic, for maintenance and/or testing, and/or as low priority packets/containers.

The packets are mapped to containers in packet mapping module 604. For harmonically length related containers or variable length containers, the packet is mapped to a single container. For concatenated BPCs, when the BPC level is 1, the packet is mapped to one container, and the BPS level is set to one. When the BPC level is greater than one, the packet is mapped to more than one container. A BPS number is generated for each container.

The container header and trailer are added to the short packet container by packet containerization module 606. In one example, with harmonically related containers, the header includes a preamble, destination TOR address, source TOR address, sequence number, harmonic level, and packet payload length, and the trailer includes a CRC check and end sequence. In another example with concatenated containers, the header includes a preamble, destination TOR address, source TOR address, sequence number, CSL, BPS number and P/L. The trailer may include a CRC check and end sequence. In one example, each container contains the full header and trailer. In another example, the initial container, intermediate containers, and ending containers have different header and trailer information. For example, the initial container may have a full header, and no trailer. On the other hand, the ending container may have a full trailer, and a header which only has a preamble, CSL number, and BPS number. In another example, the ending container may also have the destination TOR address and/or the source TOR address. An intermediate container may only have a preamble, CSL number, and BPS number, and no trailer. The intermediate container may additionally have the source TOR address and destination TOR address. The source TOR address and destination TOR address may be 16 bit addresses, or two sets of 8 bit addresses indicating a TOR group number and an individual TOR number. Some of this information is received from packet container header generator 516, which uses the sequence number from sequence number block 518 and container information from container generator 536.

Also, container generator 536 passes a connection request to connection control request block 512 to request a connection for the new container.

Containers exiting short container generator 474 are containerized, synchronized, and approximately timed to arrive at the electronic switch. After sufficient time for the transmission of the connection request message to the switch connection control, but not necessarily sufficient time for an ACK or NACK to be received, the container is read out from the buffer and propagated to the switch. The sent container is also copied into the sent container store.

Figure 22:
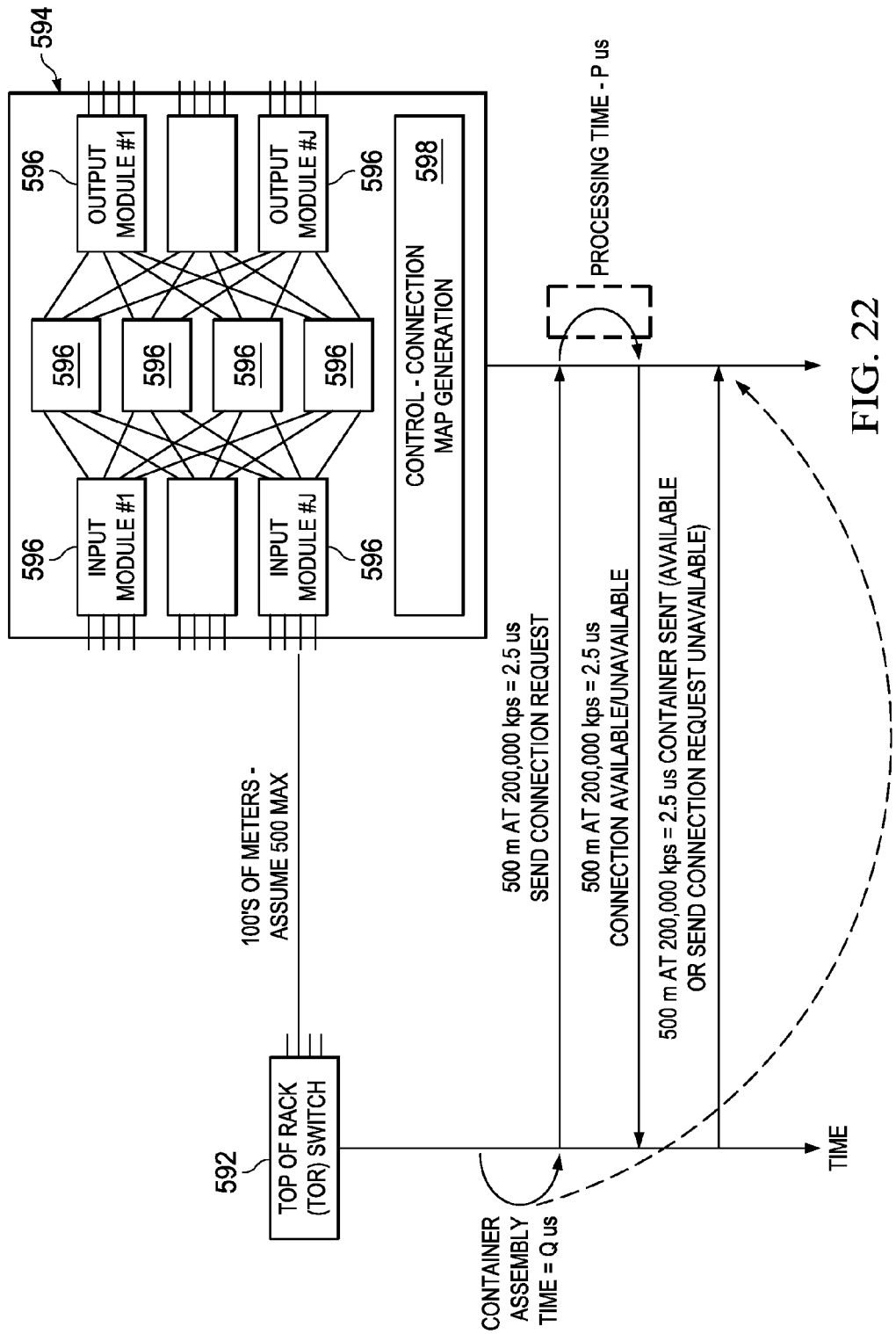
FIG. 22 illustrates an embodiment connection request system.

FIG. 22 shows an approach where the packet splitter is located at the TOR 592 and is 500 meters in cabling distance away from the core switch 594. Core switch 594 contains modules 596 and control connection map generation module 598. A container is assembled in Q µs, and a request is transmitted to the switch. This request takes about 2.5 µs to propagate to the switch controller, which then takes P µs to complete the processing of the connection request and initiate an ACK message when successful. This ACK message then takes 2.5 µs to propagate to the packet splitter at the TOR, which may then release the container with the knowledge that it will be switched to the packet splitter, and a copy is not retained. This leads to a delay between starting to build the container and receiving the completed container at the switch of $Q+2.5+P+2.5+2.5=7.5+P+Q$ µs, where Q may be about 2-4 µs and P may be about 2-5 µs for a total of 11.5-16.5 µs.

Figure 23:
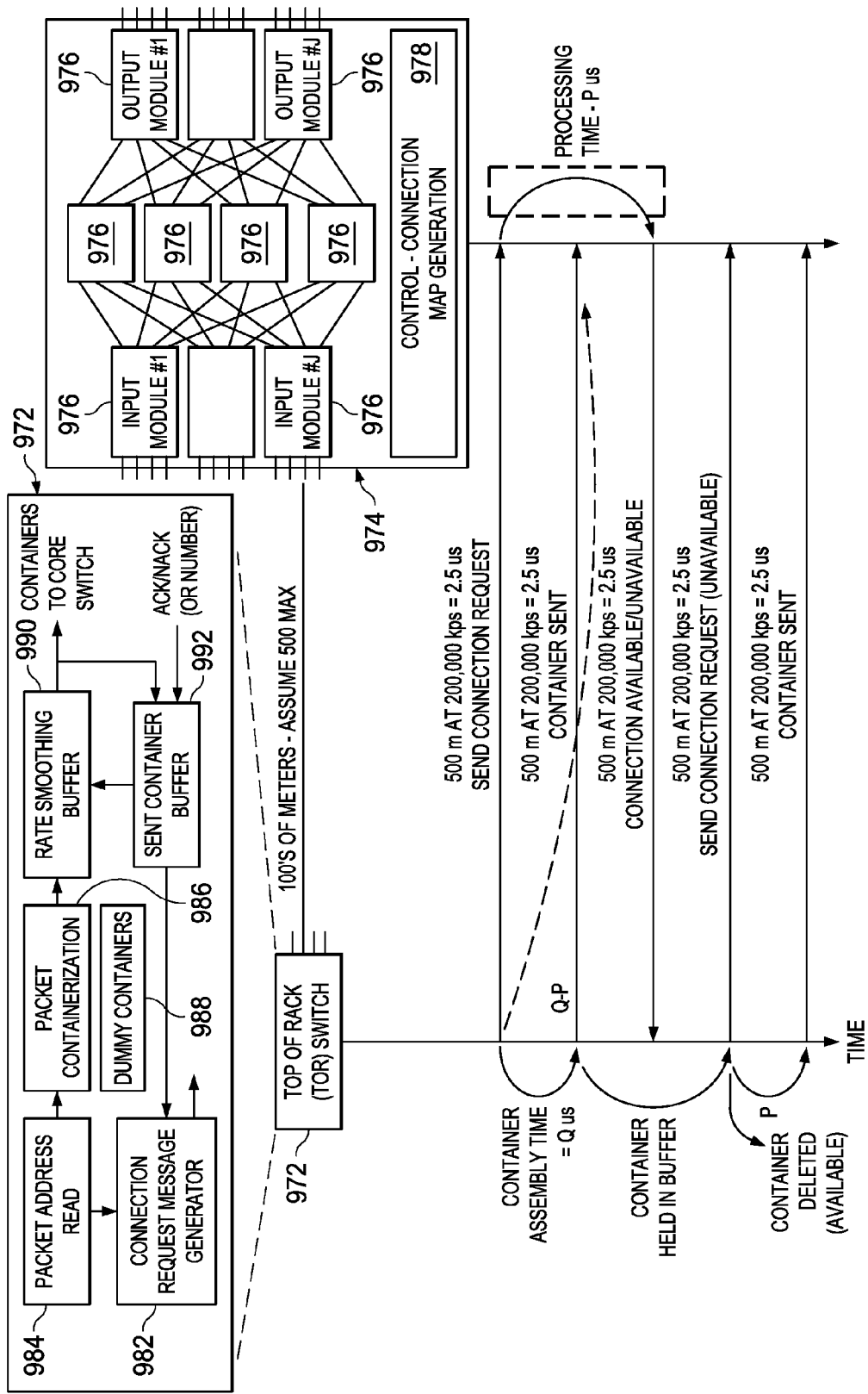
FIG. 23 illustrates another embodiment connection request system.

FIG. 23 shows another approach, which is used in the packet splitter of FIG. 21 where, as soon as the need for a container is established, a request is sent to the switch connection controller 978 in core switch 974 from TOR 972, so switch connection controller 978 may start determining the connection in modules 976, while the container is being assembled in TOR 972, where the assembly takes Q µs. TOR 972 contains packet address read module 984, connection request message generator 982, packet containerization 986 with dummy containers 988, rate smoothing buffer 990, and sent container buffer 992. The container assembly time, Q, and the switch connection processing time, P, are parallel instead of in series. The container connection request is received at the switch connection control after 2.5 µs of flight time, which initiates a P µs connection computation in the switch connection controller. At the end of this processing cycle, the controller initiates an ACK (or NACK) back to the packet splitter. Meanwhile, the packet splitter completes the packet to container conversion after Q µs, and, if P<Q, immediately transmits the container without checking whether an ACK has been received. When Q<P, the packet splitter waits an incremental P-Q µs after completing the container assembly, and then also transmits the container to the switch, whether or not the ACK has yet been received.

Either the container reaches the switch for switching at Q+2.5 µs after the container initiation (for Q>P) or P+2.5 µs (for P>Q). For values of P and Q of about 2-4 µs and about 2-5 µs, respectively, the container reaches the switch about 4.5-7.5 µs after container initiation, halving the delay from the distant TOR. For a TOR at a shorter distance the benefit is less but is always in favor of the method of FIG. 23. When either approach receives a NACK and retransmits the container, the approach illustrated in FIG. 23 has the second attempt completed by delivering the container to the switch about 11.5-17.5 µs after initiating the original container compared to after 18.5-26.5 µs after initiating the original container in the approach illustrated in FIG. 22. These advantages occur when the send before ACK approach is used for both the short and long packet container switching paths, so the delays through both paths are controlled by and matched, because they are along the same fiber.

Selector 610 may interrupt the flow of containers from short container generator 474, for example for retransmission of a container which has not been successfully delivered. The selector is controlled by a control algorithm. For example, newly formatted containers from short container generator 474 may have priority over retransmitted containers for a steady stream of new traffic to output stage bit timing block 618, and to reduce the delay for new traffic. However, this may significantly delay containers for retransmission, leading to a backlog of containers in heavy traffic conditions, which may lead to problems in container sequencing or the saturation of sent container store 612. Sequencing problems may be corrected for by using a packet-associated sequential per-packet stream numbering sequence for detection and correction of sequence problems at the packet combiner. In other examples, retransmitted containers may be prioritized over new containers. In an additional example, the switch processing module transmits a frame number which it has reserved for retransmitting the rejected container, and the frame number for the new containers which have been signals but not yet transmitted are shifted one frame, coordinated by the switch controller and the packet splitter.

In addition, it is possible to collect occurrences of NACKs from connection attempts to specific destination TORs on the long packet container path, short packet container path, or both paths within each packet splitter. This may be used to detect when a switch output port associated with a specific destination TOR is receiving too much traffic, implying that the TOR is overloaded, and to generate a back-pressure message to the source TOR indicating the situation.

Packets passed to output stage bit timing block 618 are stored in sent container store 612, where they are stored until receiving an ACK or a NACK. If an ACK is received, the container is discarded in trash 620. The packets are marked for retransmission if a NACK is received. The ACK or NACK may arrive before or after the container is initially transmitted.

ACKs, NACKs, and timing control are received by wavelength division demultiplexer 624, which separates the ACKs/NACKs from the timing control information. Timing control information is converted from an optical signal to an electrical signal by O/E converter 622. Then, switch side timing block 616 adjusts the timing in output stage bit timing block 618 based on the timing control information.

The ACKs and NACKs are also converted to electrical signals by O/E converter 623. Then, they are received by connection request ACK/NACK receiver 614. If an ACK is received, connection request ACK/NACK receiver 614 causes the container to be discarded from sent container store 612. If a NACK is received, connection request ACK/NACK receiver notifies container flow control module 608, which retransmits the container based on the selection algorithm.

When sent container store 612 has a container marked for retransmission, and a dummy packet is being created in buffer 600, the packet container slot is usurped by selector 610. In the meantime, connection control request block 512 requests a connection for the container to be retransmitted. When the dummy packet container reaches the selector, it is discarded, and the selector connects sent container store 612 to output stage bit timing block 618 for retransmission.

In one example, when neither an ACK nor a NACK is received after a certain period of time, the container is retransmitted, and interrupts new non-dummy traffic by holding the new traffic in an output buffer of short container generator 474.

The sent container store may have capacity to store containers for about 5 µs to about 10 µs, which may be approximately the round trip time to the short packet photonic switch. This may require about 64 kB of storage.

Output stage bit timing block 618 provides final fine tuning of the data timing so the container arrives at the electronic switch precisely aligned to the start of the switch frame.

After retiming, the containers are passed to E/O converter 626 to be converted from the electrical domain to the optical domain.

The optical signals are multiplexed by WDM 628 for transmission to the electronic switch. The containers are WDM multiplexed with the connection request optical carrier.

Connection control request block 512 associates a requested container destination address with a particular future frame number for either a long packet container or a short packet container, depending on whether the container is to be switched by the long packet photonic switch or the short packet photonic switch. For short packets, the length of the connection request is also signaled. The length of the connection may indicate a number of concatenated packets or a size of a harmonically related container or a variable length container. The address is mapped into a messaging format for propagation to the photonic switch or electronic switch control system. For a short packet, the request is converted to an optical signal by E/O converter 627, and multiplexed by WDM 628 with the short packet traffic to the electronic switch fabric. Similarly, for a long packet, the request is converted to an optical signal by E/O converter 507 and multiplexed by WDM 504 to the photonic switch fabric. This permits the use of one optical fiber between the packet splitter and the photonic switch fabric and one optical fiber between the packet splitter and the electronic switch fabric. Also, the time of flight is similar between the traffic and the connection requests.

Figure 24:
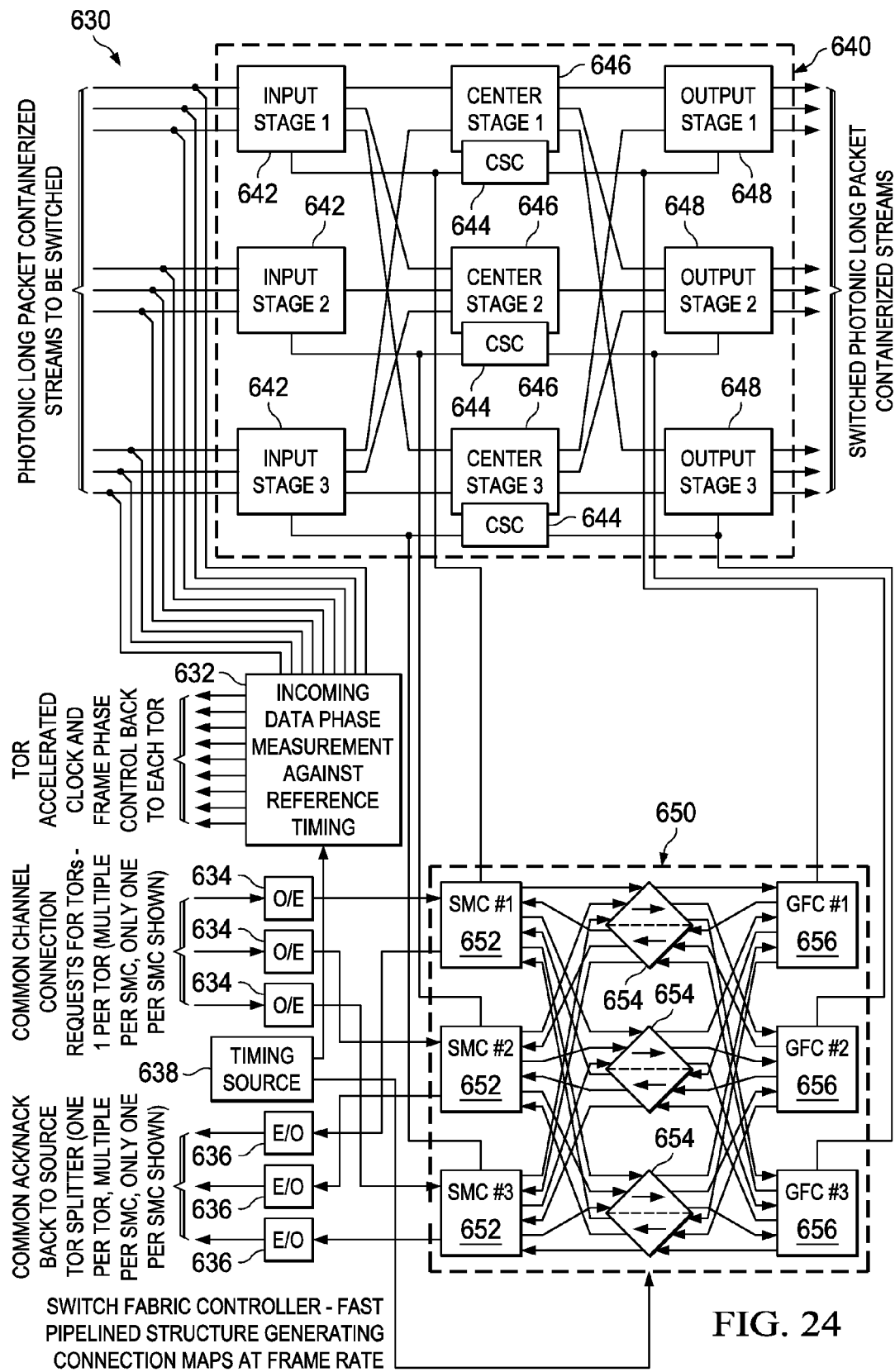
FIG. 24 illustrates an embodiment photonic switch fabric.
Figure 25A:
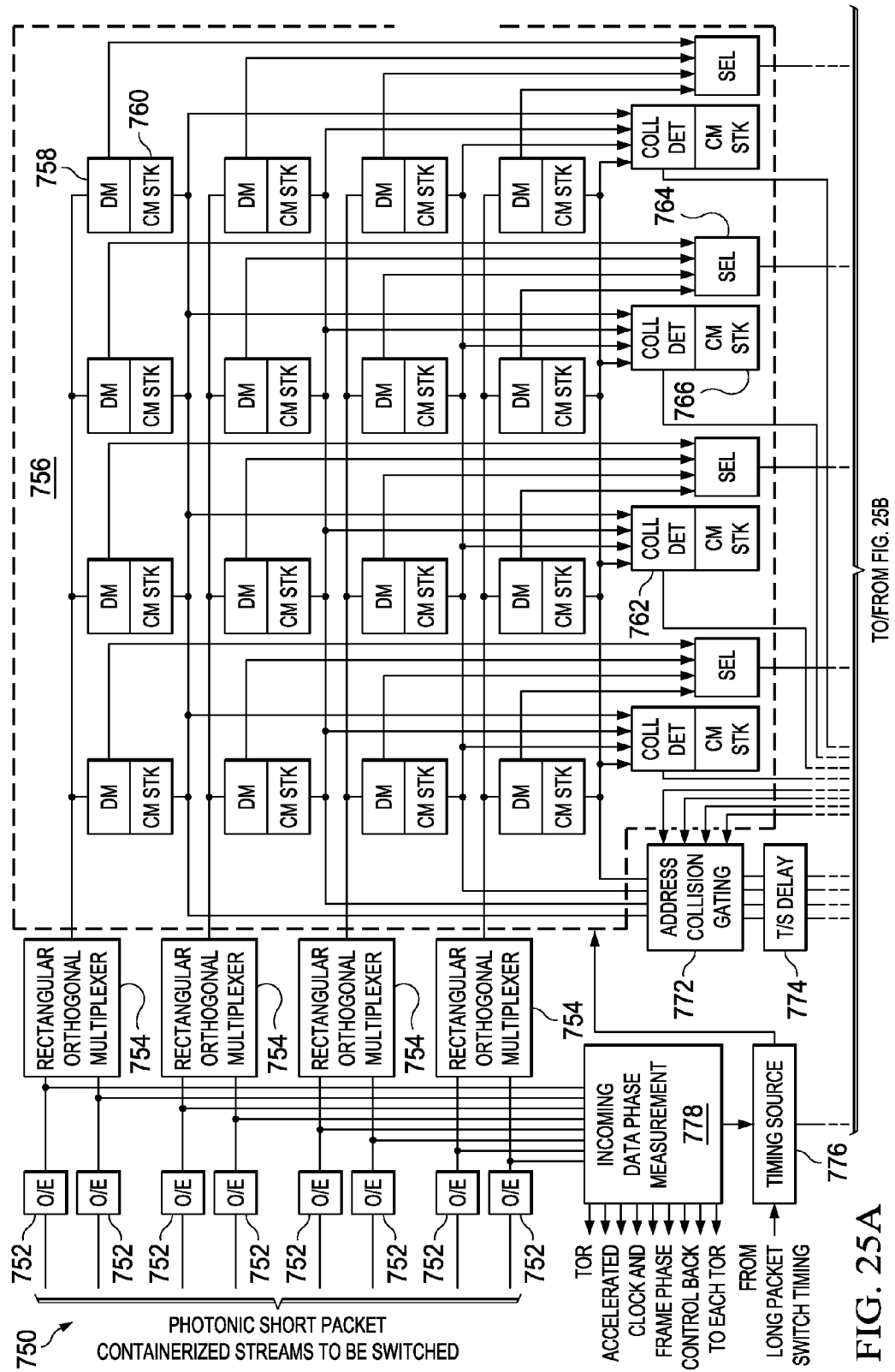
FIGS. 25A-D illustrate an embodiment electronic switch fabric.
Figure 25B:
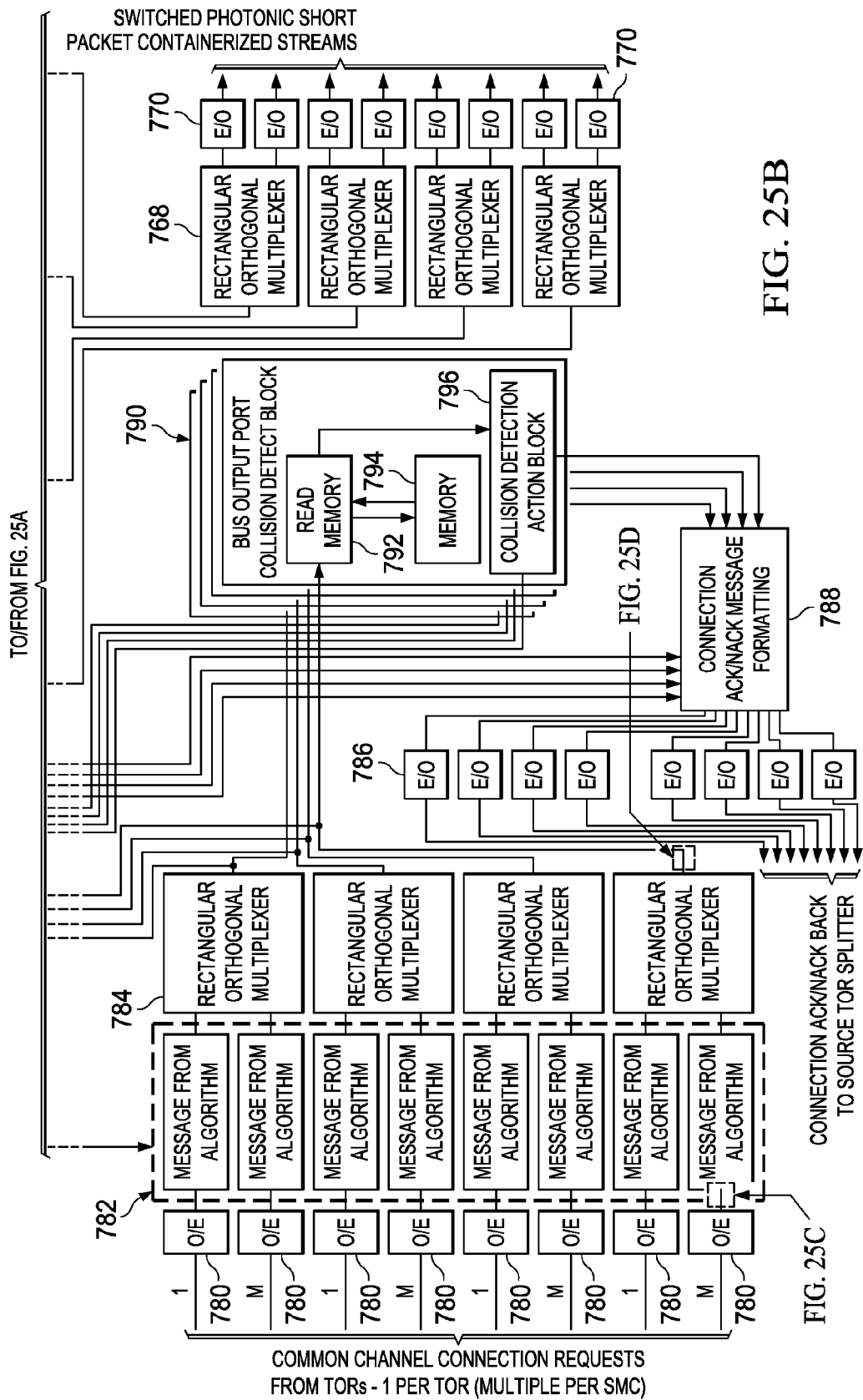
Figure 25C:
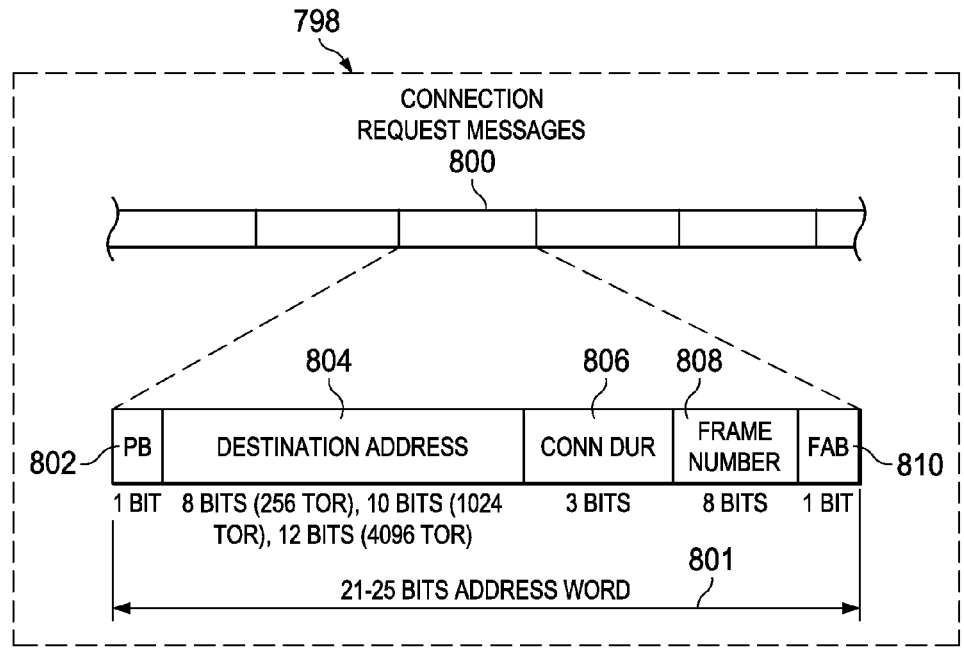
Figure 25D:
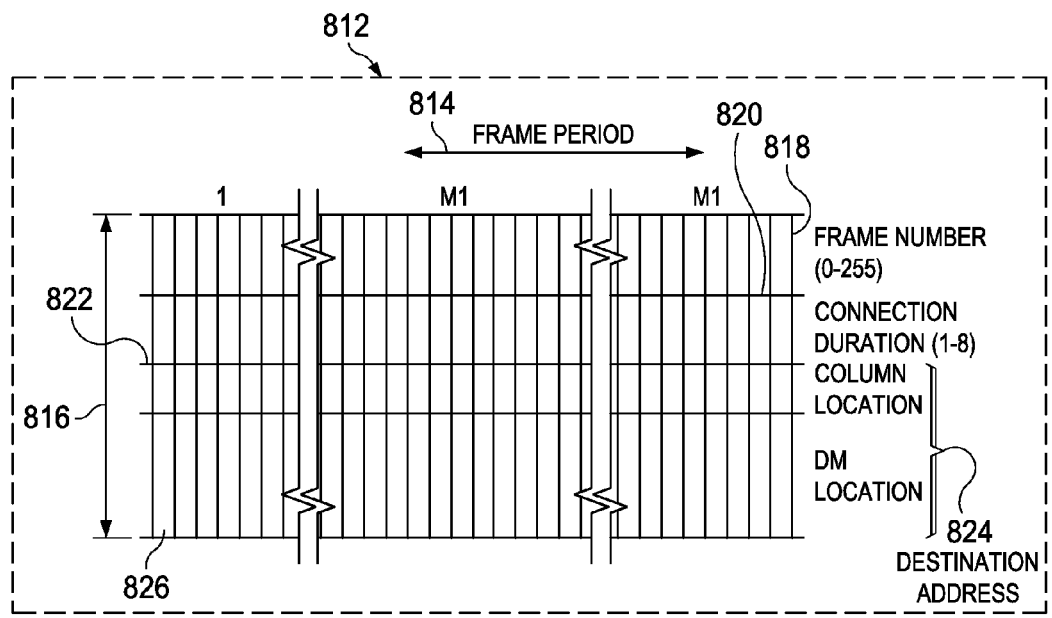

FIG. 24 illustrates photonic switch fabric 630, which may be used as a long packet photonic switch. Photonic switch fabric 630 shows photonic switch 640, a three stage Clos structure. A variety of structures, for example matrixed switching fabrics, may alternatively be used. Input stage modules 642 and output stage modules 648 are optical space switches. Center stage modules 646 may be optical space switches or arrayed waveguide gratings (AWGs). In one example, center stage modules 646 include center stage controllers (CSCs) 644. The optical space switches may be electro-optic silicon switches or GaAsInP/InP active amplifying crosspoint switches. The photonic long packet container streams are received and switched by photonic switch fabric 640.

In advance of the photonic switching, the connection requests are received by OLE converters 634 from the TORs. There is one input connection request per source TOR. The connection requests are directed towards switch fabric controller 650.

Switch fabric controller 650 performs fast pipelined control to generate connection maps at the frame rates. Switch fabric controller 650 includes source matrix controllers (SMCs) 652, orthogonal mappers 654, and group fan-in controllers (GFCs) 656. The switch fabric controller creates an ACK when a connection is achieved, and a NACK when a connection is not achieved.

Some requested connections through the switch cannot be completed, for example because more than one input requests a given output in a given timeslot. Also, the computations may not set up every connection path every time by the end of the control process. When a connection computation from a connection request is not successfully completed, a NACK is generated and returned to the appropriate packet splitter. The packet splitter attempts to retransmit the container, which has been stored. When the container path is successfully established, the switch transmits an ACK to the packet splitter, which discards the container. A large majority of containers are successfully set up. The ACKs and NACKs are transmitted to the source TORs after being converted to optical signals by E/O converters 636.

The photonic long packet containers are routed to data phase measurement module 632, which compares the phase against reference timing from timing source 638, and provides feedback to the TORs on the frame timing. This detects the received container start point phase, which is the location of the ICG, and feeds back a correction signal to the packet splitter. The containers may be correctly phase aligned with the switch clock and frame switching phase at the switch inputs.

FIGS. 25A-D illustrates a short packet electronic switch 750 based on switching BPCs and concatenated BPCs using a fast matrixed time switch with a frame-by-frame update of the switch connections. The switch is non-blocking, has deterministic path routing, and is directly addressable, in that portions of the addressed output port location are applied in a fixed deterministic manner within the switch, independently of other connections, to set up the switch. Output contention may still cause issues when more than one input attempts to reach the same output at the same time, but is resolved within the address writing processes, where the unsuccessful contending connection requests receive a NACK. Switch matrix 756 includes a variety of functional blocks, including input O/E and output E/O for advanced connection request messaging and the container streams to and from the packet combiners and packet splitters, respectively, message frame align blocks or buffers, rectangular orthogonal multiplexers for connection request signaling, transport rectangular orthogonal multiplexers for traffic ports, a switch matrix with DM and CM stacks and output bus collision detection, timing source, incoming data phase measurement block, per-bus output port collision detection block, timeslot delay block, address collision gateway, and connection ACK/NACK message formatting block.

O/E converters 752 receive photonic short packet containerized streams to be switched in optical form, and convert them to electrical form. The incoming serial high speed optical data from the peripheral is converted to a serial high speed electrical data stream inside the switch. Also, O/E converters 780 receive the common channel connection requests from the TORs, and convert the electrical signals to optical signals. The connection request streams from the packet splitter are received in the optoelectronic channel connection request optoelectronics, which are converted into serial electrical bit streams.

Likewise, E/O converters 770 convert the switched electronic containerized stream to optical form, to photonically output the switched containerized streams for transmission to the destination TOR packet combiners. The output serial electrical signals are converted into serial optical signals. E/O converters 786 convert the electrical signals providing the connection ACKs/NACKs to optical signals for transmission to the source packet splitter.

The bit rates and data rates may be high, especially on the short packet container traffic ports. For example on the short packet container traffic ports, when the overall switch is operating at an peak traffic level, with a 100 Gb/s input to the packet splitter, the short packet traffic bandwidth per port may be between 5 Gb/s for a 5/95 short/long traffic split (packet threshold=400 bytes) up to about 15 Gb/s for a 15/85 short/long traffic split (packet threshold=1400 bytes). For a moderate packet threshold value (~1000 bytes) the split would be of the order of 9/91 for 9-10 Gb/s of short traffic in a heavily loaded situation. For 64 byte BPCs with 53 byte payloads, this corresponds to 1 BPC per packet splitter every (53×8)/9 nanoseconds or 1 BPC per packet splitter every 47 ns or, for BPCs carrying 117 byte payloads in 128 byte BPCs, around 1 BPC every 117×8/9 nanoseconds=104 nanoseconds. Thus, switch frame rates of 30-40 nanoseconds to 75-80 nanoseconds, dependent on the choice of BPC length and a 9/91 or lower split point (i.e. a packet long/short split of <1,000 bytes) may be used. The signaling rates may be lower, for example in the Gb/s range, depending on the signal messaging format. The maximum short term container burst rate per input port into the packet splitter may be a short packet about every 4 ns when a specific packet splitter receives a long burst of shortest short packets. There may be a flow rate of one request per short packet switch frame within the short packet container buffer, which may buffer many more short packets for rate smoothing. With 12.8 Gb/s serial traffic port input and with 64 byte BPCs, the frame rate is about 40 ns, and with 128 byte BPCs, the frame rate is about 80 ns, providing a 40% excess capacity margin over actual smoothed short packet traffic up to about a 9/91 bandwidth split (split at 1,000 bytes) and more margin for a lower split, such as 7/93 or 5/95. For higher splits, such as a 15/85 split, the bit rate of the electronic switch is higher.

When the connection address specifies a 16 bit destination address and an 8 bit rotating frame number, for 24 bits of address per container, the worst case messaging rate may be 24×1,000,000,000/60=600 Mb/s for 64 byte BPCs and half of this or 300 Mb/s for 128 byte BPCs. In one example, a connection request link rate of about 1-2 Gb/s may be used with a small amount of short packet buffering and message flow rate buffering within the packet splitter.

Connection request message 798 includes stream 800. Within stream 800, the component blocks of information include one parity bit (PB) 802, and destination address 804, which may 8 bits, 10 bits, or 12 bits, or another value, depending on the number of TORs. The source TOR address might not be explicitly added to the message, because the source TOR address is known from the message port utilized and, once the addressing is turned into a parallel multiplexed address bus, the source address is known from the time slot occupied by the destination address on that bus. The connection request message also includes connection duration 806, which is three bits for concatenation up to 8 or four bits for concatenation up to 16, frame number 808, which is 8 bits, and frame alignment bit (FAB) 810, which is one bit. The connection duration indicates the duration of the connection, for example based on the number of concatenated packets or the size of harmonically related length containers. The connection request message has a size 801 of from about 21 bits to about 26 bits, depending on the size of the destination address.

Message frame aligners 782 align the incoming messaging address frame boundaries to align with the switch system clock frame numbers, so the serial framing messaging entering rectangular orthogonal multiplexers 784 are aligned. The bit streams are variably delayed in the message frame align buffer to align the connection request message words to the internal timing of the switch.

Timing for the synchronous switching is coordinated using timing source 776 with a timing reference supplied from the photonic switch. The timing source provides the clock, reference timing, and framing for the switch. Also, the timing source provides a reference clock, frame, and frame numbering for communications with peripherals.

Rectangular orthogonal multiplexers 784 convert multiple serial connection request messages from groups of M packet splitters into parallel words on a TDM multiplexed data bus. The rectangular orthogonal multiplexers include two orthogonal planes of multi-stage shift registers with a download capability between the two planes. In one plane, there are M shift registers all in parallel and all shifting in one direction. The shift registers are fed with the array of connection request message signals to be converted between serial individual streams and parallel TDM interleaved connection request words on a bus. When sufficient clock cycles have passed for the shift registers to be full with a set of series bits of a connection request word, they synchronously download their bit values to the corresponding shift register stage on the second plane. The second plane shift registers are organized to shift in an orthogonal direction or across the incoming shift register direction. This results in the same part of each input message being shipped out on the same output line with the timeslot the information is indicating the input from which the information originated. Thus, for M inputs, there are M timeslots, and the output bus width is equal to the total number of bits in one message. Thus, the parallel bus carries specific information on specific bus lines. For example, bus 812 contains frame numbers 818, connection durations 820, column locations 822, destination address 824, and DM location 826. The bus width 816 is the address word length or the address word length minus the parity bit and frame alignment bit. The connection duration includes the concatenation length. The frames in bus 812 have a frame period 814.

When there are M input data streams which are serial streams with words of W bits, and the output frame of parallel words will be M words long before repeating, then a first plane of M parallel shift registers, which are W bits long and clocked at a data input bit rate of C, and a second plane W of orthogonal shift registers which are M bits long and clocked at a rate of (C×M)/W. There are M inputs at a clock rate C converted into a TDM interleaves frame with a bus width of W and an M timeslot frame at a clock rate of (C×M)/W. When C=1 GHz, M=32 different inputs and W=24 bit words are carried serially in the incoming signal, the first plane has 32 parallel shift registers, where each shift register is 24 bits long. Also, a second plane of 24 shift registers which are 32 bits long produce a 32 timeslot multiplexed 24 bit wide bus at 1.333 GHz, in this example and would have a frame period of 32/1.333 ns=24 ns. The rectangular orthogonal multiplexers may move data busses to multiple serial links, and may provide a wide range of rate conversions.

Transport rectangular orthogonal multiplexers (TROMs) 754 and 768 operate somewhat similarly to rectangular orthogonal multiplexers 784 but provide a mass serial to parallel conversion function on the traffic containers. The TROMs may have a different word size, a different bus width, and operate at different clock speeds, compared to rectangular orthogonal multiplexers 784. Because the number and length of the first plane shift registers in a TROM may be high, and the clock rate may be very high, bit-level demultiplexing or de-interleaving may be performed, for example with very fast 1:4, 1:8, or 1:16 commutating switches, and a virtual monolithic TROM created by using 4, 8, or 16 smaller TROMs with parallel outputs. The resultant smaller TROMs which build up the virtual monolithic TROM function operate the serial input plane at one quarter, one eighth, or one sixteenth the clock rate, and one quarter, one eighth, or one sixteenth the input shift register length and with one quarter, one eighth, or one sixteenth the output shift register quantity. The second plane has a corresponding number of output buffers clocked at the same output rate, which is equal to the input serial clock rate divided by the overall bus width multiplied by the number of inputs handled by the overall virtual TROM. For example, with a 12.8 Gb/s input rate, 64 parallel inputs, and a 64 byte BPC generating a 512 bit wide bus to be switched, the output clock would be 12.8×64/512=1.6 GHz. When the outputs of the smaller TROMs are lined up in parallel, they form the bus and operate as if they were one large TROM.

Switch matrix 756 contains DMs 758 and CM stacks 760. Although switch matrix 756 is illustrated as a matrixed switch, a commutated or commutated matrixed space-time directly addressable switch with an extremely wide bus may be used and the switch may be architected as parallel slices of the very wide bus switch, for example with eight 64 bit wide switch slices in parallel forming a 512 bit wide switch structure. There may be multiple DMs and multiple CMs per ASIC, because the DMs are relatively small, especially in matrixed switches. The output columns of the DM outputs may be associated with selector switches instead of the pictured wire ORs. Selector switches are fed by part of the incoming address and notify the DM to be selected on each word of the switching frame. The CMs contain multiple frames of addresses, stacked to form CM stacks. The use of CM stacks facilitates connection requests which are sent ahead of the frame number, in which the actual containers will be delivered to be switched, to be processed, and the results stored in the connection stacks for use when the appropriate frame number is reached. The addressing information is previously applied from the connection request path. A frame's worth of connections for each frame number is stored for use when the frame count reaches the appropriate frame number.

Incoming data phase measurement block 778 taps the incoming optical signal or the incoming electrical signal after O/E conversion, and determines whether the timing of the signals from the peripherals is correct. The incoming data phase measurement block also determines the sign and magnitude of the error. Feedback is provided to the peripherals to correct timing, framing, or frame numbering errors, phase locking the output stage of the peripherals to the electronic switch. This facilitates a common framing and frame numbering between the peripherals and the electronic switch.

Bus output port collision detection is performed by bus output port collision detection blocks 790. A collision is detected when different input TORs on an associated bus request communication with the same destination TOR in the same frame. A memory has locations corresponding to each requested output location. Memory block 792 reads the memory location from memory block 794, which contains the memory IDs, timeslot usage, and memory map. The contents of the memory locations are initially set to zero. When a connection between a source TOR, identified by the timeslot position on the bus, and a particular destination TOR is requested, the value of the memory location corresponding to the output location is read. When the value is zero, the number of frames for which the connection is requested is written into the memory location. The number of frames is equal to the concatenation level of BPCs, because one BPC per frame may be sent from each packet splitter. Subsequent timeslots in the frame are assessed, and entered when they have a zero value. When a value other than zero is detected, a collision has been detected, and the new connection is rejected. At the end of the frame, each value in the memory is decremented by one, freeing the single BPC sites. When the BPC concatenation is greater than one, a non-zero value is left, preserving that memory position for the rest of the concatenated BPC sequence. This prevents fragmenting concatenated BPCs.

Collision detection action block 796 is notified when a collision is detected by read memory block 792. Collision detect action block 796 may generate a NACK for connection messaging block 788.

Timeslot delay block 774 delays the address timeslots sent to switch matrix 756 by a controlled time, for example between two frames and eight frames. The delay provides time for output port collision detection blocks 790, or another collision detection approach, to identify potential output collisions from the addresses across the busses. In another example, the output port collision detection block 790 only looks at collisions from groups of TORs on the same bus. An additional block (not shown), which controls the DM output switches (not shown) raises an alert when it receives two requests for the same output port in the same output timeslot. This represents an address bus-to-address bus address collision, and is fed back to the sources as another input.

Address collision gateway 772 intercepts and deletes colliding addresses when NACKs have been generated. At most, one address per output timeslot per port remains on each of the incoming address busses, but the contention between these busses has not been resolved at this point and is dealt with later in the process. Rejected addresses from the intra-input bus contention resolution are overwritten with a null request. Connection messaging block 788 returns ACKs and NACKs to source packet splitters. At this point in the process, a NACK may be generated for the rejected connection requests due to two or more TORs on the same input bus requesting the same output in the same timeslot. However, an ACK will not be generated until the remainder of the contention resolution process has been resolved. NACKs trigger retransmission of the containers, and ACKs trigger discarding the containers from the sent container store.

Rejected requests trigger a retransmission, and are blocked from setting up a connection on the original frame. The multiple connection request streams are internally contention free, but may have contention between streams.

The intra-input bus contention resolved connection request bus contents are written to the appropriate CM stack 760, which is associated with DM 758. The connection map of each frame is determined by the addresses associated with the frame number, including selecting the output column, and thus which CM in the input row is to be written, with the remainder being the CM connection timeslot addressing. When the system timing frame number matches the implied or explicit frame number associated with the incoming prior connection requests, the connection map is applied to the DM associated with the CM, causing it to read out a specific sequence of locations to implement the time switching. The activated DMs write out their data to a column line which is connected to one port of the output column selector switch 764. The selector switch 764 is controlled by its own CM stack 766, which is controlled by connection messages. In particular, the selector switch is controlled by the column select portion of the addresses, which indicates the selection of that output group in that timeslot for the input address line. Thus, the selector connects the appropriate DM in the row to the output. Collision detection block 762 operates similarly to the per-bus bus output collision detection block in that it reads the incoming connection requests, this time across the busses, to identify when more than one incoming connection request is being made across multiple incoming connection requests lines for a connection to that output block from any or all of the connection request lines in a given timeslot. This collision detector operates on the address bits which define the column address for any frame number. The collision detector block feeds the rejected connection request information to the connection messaging block 788 for messaging to the packet splitter. The selector switch, which replaces the wire-OR function of the simple matrixed switch, prevents the collision from actually happening, and the rejected connection is output from the DM which is not selected, and is lost. At this time, an ACK is generated for outputs which are selected, and NACKs are generated for outputs which are not selected.

Pipelined control may be used in the electronic switch. The overall processing may take several frames with delays of a few hundred nanoseconds to a microsecond, resulting in a CM stack of up to 25 frames with a 40 ns frame, or up to 4 frames for a 300 ns delay with an 80 ns frame.

The switch maps for particular frames are in place in time for the switching of that particular frame. At the start of the designated frame number, the incoming traffic arrives at the switch input port from the phase-locked outputs of the packet splitters, and is clocked through the TROM. Conceptually, this shifts the inputs at a BPC container granularity, using very long very fast shift registers. For example, an overall TROM first plane may be an array of multiple parallel 12.8 Gb/s 512 bit shift registers. The shift registers fill over a period of 40 ns, and synchronously dump their content values to the second orthogonal block of shift registers with a length equal to the frame length in timeslots and clocked at a clock rate related to the input clock rate by the ratio of the two planes' shift register lengths. For a 64 port input TROM, there is a frame length of 64 timeslots and an output clock rate of 1.6 GHz.

Thus, the overall TROM may be partitioned into smaller building blocks using slower technologies. In one example, each TOR input stream is received and passed through a 1:N commutating switch, for example a 1:8 commutating switch fabricated in GaAs, which may provide this function at this clock rate. This provides eight outputs which operate at one eighth of the input rate, or about 1.6 GHz. Three outputs are fed into eight parallel smaller TROMs, which shift in 64 steps to output 64 parallel lines of the output bus from the overall TROM function into the matrix of DMs. This 1:8 split matches the clock rate of the input and orthogonal output shift register arrays.

The data from the data bus lines or data bus slices is written into the control of the CM stack and read out under control of the system framing timeslots to complete the conventional single stage of switching. The output information from the DM is passed to the output selector, where it is selected and passed to the output bank of TROMs for parallel to serial conversion and transmission to the packet combiners.

Figure 26:
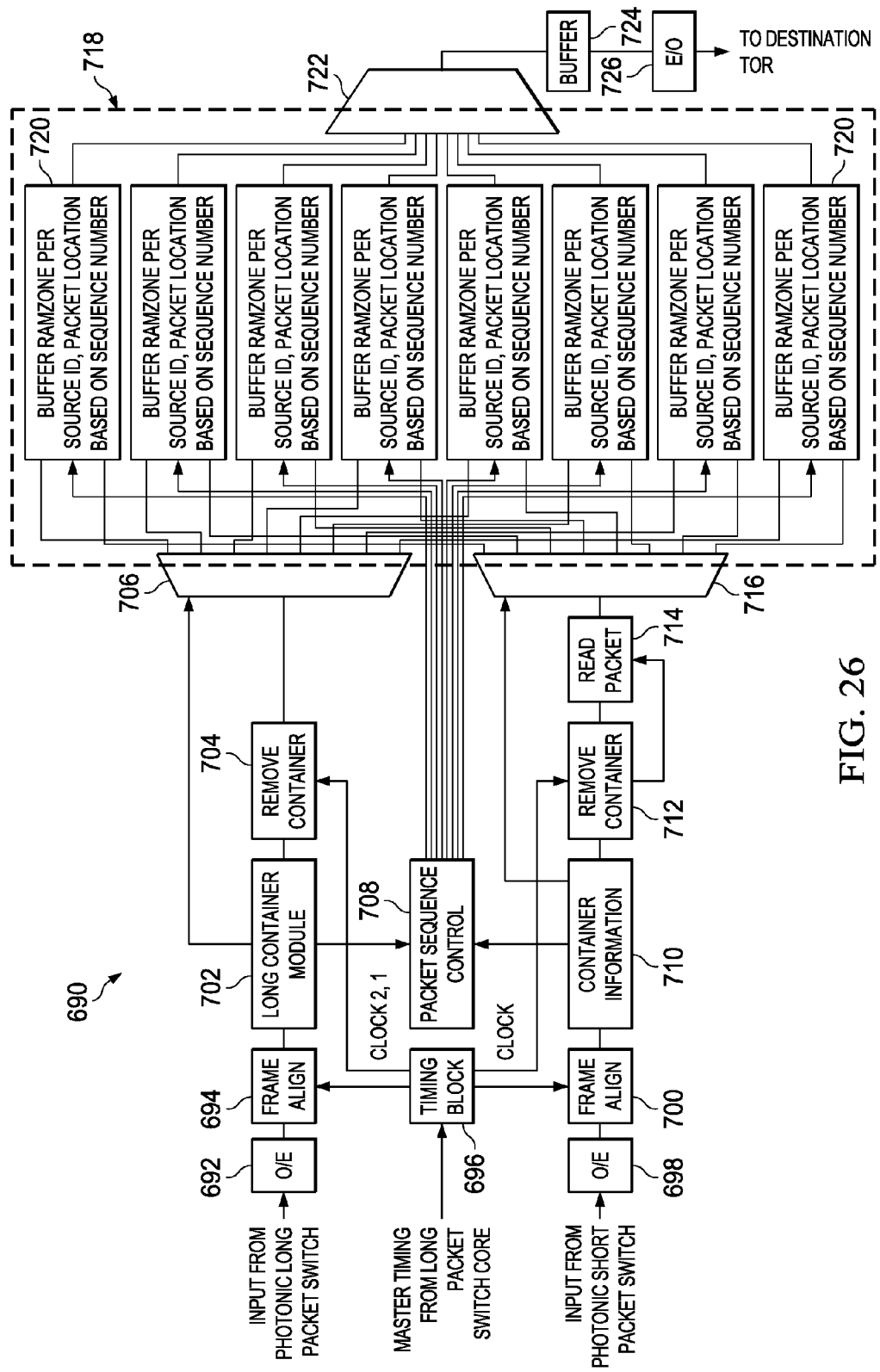
FIG. 26 illustrates an embodiment packet combiner.

FIG. 26 illustrates packet combiner 690. The packet combiner de-containerizes the packets and returns them to the base TOR clock rate by decelerating the packets. The packet combiner then reintegrates the long and short packets into a packet sequence integral stream, where the sequence of packets in each flow of the packets in an output packet stream is the same as the packet sequence of each of the flows at the packet splitter inputs. Thus, each packet flow between TORs has the same packet sequence at the destination TOR as it had at the source TOR. The functionality of the packet combiner may be implemented in hardware, software, or a combination of hardware and software. For example, the packet sequence reintegration and packet ordering within each flow may be implemented with software or firmware and a large fast memory, where the software or firmware creates flow specific buffer zones within the overall memory space in response to incoming packet streams, from which recovered packet streams are read in the correct packet sequence. The packet combiner may be integrated into a TOR or may be a stand-alone device.

The switched long packet photonic stream is received and converted from an optical stream to an electrical stream by O/E converter 692.

The long packet stream is fed into frame aligner 694. In the frame aligner, the incoming container frame start is detected, and its timing is adjusted to be aligned with the internal timing of the packet combiner. The timing is obtained in timing block 696 from the master timing from the long packet switch core.

Information is extracted from the long container in long container module 702. The container CRC is checked for correct reception. The source TOR address and the sequence number of the packet payload are read and passed to demultiplexer/routing switch 706. Also, the sequence number and source TOR number are passed to packet sequence controller 708.

Demultiplexer/routing switch 706 establishes a connection to a memory zone specific to that source address and a routing to a specific location in that memory zone, where that location is specific to that packet sequence number and source TOR.

Meanwhile, the container is stripped by remove container module 704. The packet is also decelerated to the destination TOR clock rate, which is derived from timing block 696. The packet is then written into the selected location in memory 718 by demultiplexer/routing switch 706. When a new source address starts streaming, a new zone is created.

A short packet container stream is received, and converted from an optical stream to an electrical stream by O/E converter 698.

The short packet containers are frame aligned in frame aligner 700 based on timing information from timing block 696 based from master timing from the photonic switch core.

The container information is extracted by container information block 710. The source TOR and destination TOR addresses are read, and passed to demultiplexer/routing switch 706 and to packet sequence controller 708.

The container is then removed by remove container module 712. When a packet is too long for a single BPC and has been transported by multiple concatenated BPCs, the original packet is reconstructed by reading the BPC sequence numbers (BPS) and assembling the BPC payloads in the correct order to recreate the original packet. The combined BPC payloads make up the components of a packet, and once reassembled, are read to determine the packet payload length (useful for allocating memory space), source address, sequence number, the latter two being used for packet sequencing. The packets are read in packet reader 714. The packets are then passed to demultiplexer/routing switch 716 which routes them to the appropriate memory zone based on their source address.

A connection is set up to route the packet to a specific location within the specific memory zones 720 in memory 718 for its sequence number and source TOR address. The routing is performed by packet sequence controller 708, which also creates new zones in the memory as-needed, and may remove dormant zones.

Packet sequence controller 708 builds up a table or list of the sequences in the source packet streams. Then, it causes the packets associated with completed sequences of sequence numbers to be read out in order of the sequence number, resulting in them being read out in the same order as they were originally received in the source TORs.

The packet streams are statistically multiplexed by statistical multiplexer 722.

Then the packet streams are stored in buffer 724, which performs rate smoothing.

Finally, the packet streams are read out from buffer 724, and converted from electrical streams to optical streams by E/O converter 726. The optical streams are directed to the destination TOR.

In one example, a 100 Tb/s data center has a quadranted switching core with four switches, which each handle 25.6 Tb/s and 256 TORs, each with four 100 Gb/s outputs. The packet splitting length may be about 680-850 bytes, providing a 10:1-15:1 split ratio. The packet splitters have four 100 Gb/s inputs which are split into long packet stream and short packet stream outputs. The long packet stream is switched in four 256×256 approximately 120 ns framed synchronous fast space photonic switch or space-space-space photonic switch derivatives. The short packet streams are fed into four electronic switches which have an input port rate of around 12.8 Gb/s. The throughput of the short packet electronic switch is around 3.2768 Tb/s. The short packets are carried as BPCs with a length of 128 bytes. About 117 bytes is payload, and 62.2% of the packets are carried at a concatenation level of 1, 22.2% are at a concatenation level of 2, 6.67% are at a concatenation level of 3, 4.4% are at a concatenation level of 4, 2.25% are at a concatenation level of 5, and 2.25% are at a concatenation level of 6. The switch operates at a clock rate of 800 MHz, and accepts 64 TOR streams per row, with 1024 row×64 column virtual TROMs. The virtual TROMs are implemented with 1:8 commutation with eight 128×64 TROMs operating with plane 1 at 1.6 GHz and Plane 2 at 800 MHz. The DMs are 64 words×128 bits×8 slices in parallel, and the switch is eight parallel slices at 409.6 Gb/s each. The frame time is 80 ns for a 12.8 Gb/s input. The switch has four parallel input groups and four output groups. The output selectors on the switch columns are multiple 4:1 selector switches, with a total of 16 DM/CM stack nodes to implement a 4×4 matrixed switch.

In another example, an 800 Tb/s data center has a quadranted switching core with four switches, each of which each handle 204.8 Tb/s, and 2048 TORs, each with four 100 Gb/s outputs. The packet splitting length may be about 680-850 bytes, providing a 10:1-15:1 split ratio. The packet splitters have four 100 Gb/s inputs which are split into long packet stream and short packet stream outputs. The long packet stream is switched in four 2048×2048 approximately 120 ns framed synchronous fast space-space-space photonic switches. The short packet streams are fed into four electronic switches which have an input port rate of around 12.8 Gb/s. The throughput of the short packet electronic switch is around 26.2144 Tb/s. The short packets are carried as BPCs with a length of 128 bytes. About 117 bytes is payload. 62.2% of the packets are carried at a concatenation level of 1, 22.2% are at a concatenation level of 2, 6.67% are at a concatenation level of 3, 4.4% are at a concatenation level of 4, 2.25% are at a concatenation level of 5, and 2.25% are at a concatenation level of 6. The switch operates at a clock rate of 1.6 GHz, and accepts 128 TOR streams per row, with 1024 row×128 column virtual TROMs. The virtual TROMs are implemented with 1:8 commutation for eight 128×128 TROMs operating with plane 1 at 1.6 GHz and plane 2 at 1.6 GHz. The DMs are 128 words×128 bits×8 slices in parallel, and the switch is eight parallel slices at 3.2768 Tb/s each. The frame time is 80 ns for a 12.8 Gb/s input. The switch has sixteen parallel input groups and sixteen output groups. The output selectors on the switch columns are multiple 16:1 selector switches, with a total of 256 DM/CM stack nodes to implement a 16×16 matrixed switch.

Figure 27:
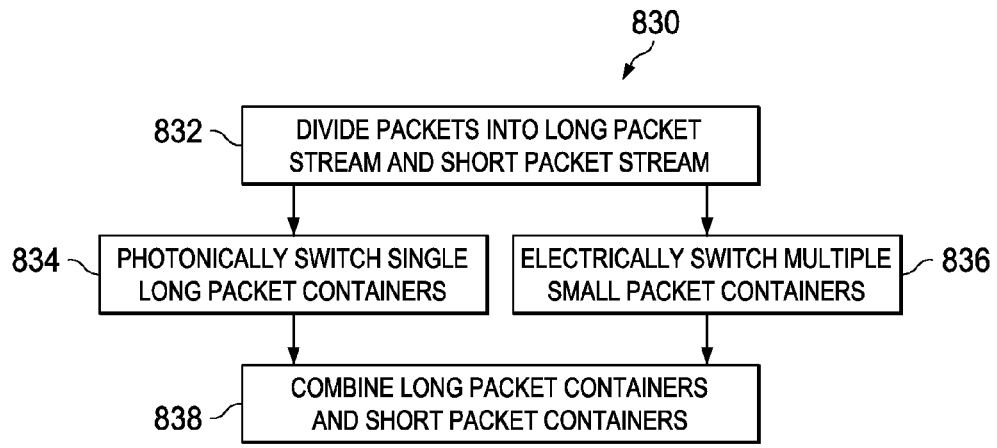
FIG. 27 illustrates a flowchart of an embodiment method of hybrid photonic electronic packet switching.

FIG. 27 illustrates flowchart 830 for a method of switching long packet containers by one photonic switch and short packet containers by an electronic switch. Initially, in step 832, the incoming packet stream is separated into a long packet container stream and a short packet container stream. The long packet containers have a single long packet as a payload, and include information for reassembling the packet streams at the destination. The short packet containers may be harmonically related containers, concatenated BPCs, variable length containers, or another container type. For concatenated BPCs, when the concatenation level is greater than one, multiple BPCs carry a single packet.

In step 834, the long packet containers are switched by a photonic switch. The long packet containers are directed to the appropriate destination TOR. The long packet photonic switch may be a three stage Clos switch, a matrixed switch, or another large photonic switch.

In step 836, the short packet containers are switched by an electronic switch to the destination TOR. The electronic switch may be a time switch. In some examples, the time switch is a matrixed switch, a commutated switch, or a matrixed commutated switch.

Finally, in step 838, the long packet container stream is combined with the short packet container stream. The packets are removed from the containers, and reassembled in the same sequence as they entered the packet splitter. When multiple concatenated BPCs are used, the packet is reassembled from the multiple concatenated BPCs.

Figure 28:
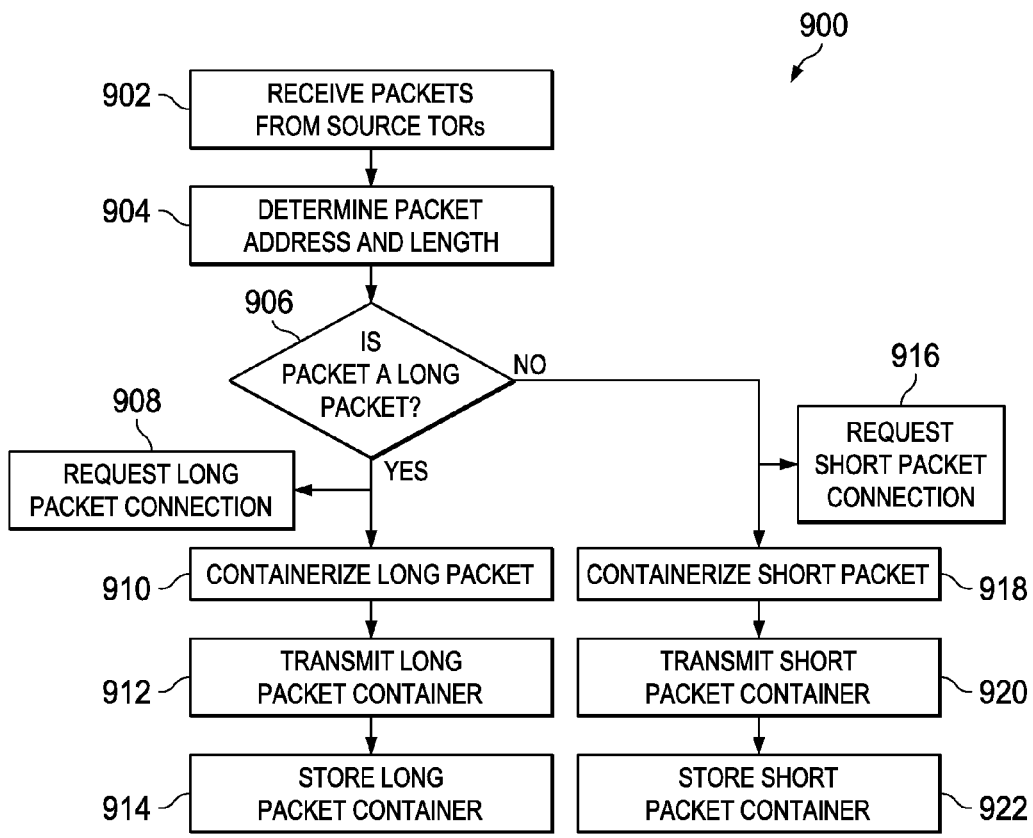
FIG. 28 illustrates a flowchart of an embodiment method of packet splitting.

FIG. 28 illustrates flowchart 900 for a method of separating long packets and short packets into separate containers. Initially, in step 902, packets are received. In one example, the packet splitter is a part of the source TOR, and the packets are received from other portions of the source TOR. Alternatively, the packet splitter is a separate device, and the packets are received from the source TOR.

Next, in step 904 the packet addresses (source TOR address and destination TOR address) and length are determined. The packet length may be determined by measuring the packet. In one example, the packet address and length are known, for example when the packet splitter is integrated in a source TOR. In other examples, the source TOR address and/or destination TOR address are extracted from the packet.

Then, in step 906, the packet splitter determines whether the packet is a long packet or a short packet. The packet length is compared to a threshold, which may be static or dynamic. For packets with a maximum length of 1500 bytes, the threshold may be between about 400 bytes and about 1000 bytes. When the packet is shorter than or equal to the threshold it is determined to be a short packet, and when it is longer than the threshold it is determined to be a long packet. When the packet is a long packet, the packet splitter proceeds to steps 908 and 910. On the other hand, when the packet is a short packet, the packet splitter proceeds to steps 916 and 918.

In step 908, the packet splitter requests a long packet connection from a photonic switch controller for a connection in the photonic switch for a future timeslot. The connection request may be an optical signal to the photonic switch controller.

Meanwhile, in step 908, the packet is placed in a long packet container. The packet is padded to a maximum size, for example 1500 bytes. A header and footer are added to the container. The header and/or footer contain the source TOR address, destination TOR address, and sequence number for reassembly of the packet stream at the destination TOR. The header and/or footer may include other information, such as a CRC check and an indicator of the amount of padding adding. Also, the clock rate of the container is accelerated.

Then, in step 912, the long packet container is transmitted to the long packet photonic switch for switching to the destination TOR. The packet splitter waits sufficient time for the connection to be set up in the long packet splitter, but does not necessarily wait for a NACK or ACK, before transmitting the long packet container.

Also, in step 914, the packet splitter stores the long packet container. The stored long packet container may later be used for retransmission.

In step 916, the packet splitter requests a connection in the electronic switch for a future timeslot. An electronic connection request may be transmitted to the electronic switch controller as an optical signal.

Meanwhile, in step 918, the short packet is placed in a short packet container, or in multiple containers when concatenated BPCs are used. The short packet container may be harmonically related length containers, concatenated BPCs, or another container type, such as a variable length container or a fixed length container. Headers and/or footers are added to the container. The payload data may include the sequence number for the packets in the container. In one example with harmonically related length containers, the container header and/or footer may include the source TOR address, the destination TOR address, a CRC check, a sequence number, a harmonic level, and a packet payload length. In another example with concatenated BPCs, the header and/or footer includes the destination address, the source address, the sequence number, CSL number, BPS number, payload number, and CRC check. In one example, the initial container, ending container, and intermediate containers contain different items in the header and footer. For example, only the ending packet contains a footer and only the first container has the destination address, source address, sequence number, and payload number. Also, the clock rate of the container may be accelerated. All packets have the preamble, CSL number, and BPS number.

In step 920, the short packet container is transmitted to the electronic switch in optical form. Before transmission of the short packet, there is sufficient time for the connection to be set up, but not necessarily sufficient time for an ACK or a NACK to be received.

In step 922, the short packet container is stored, so it may be retransmitted in the event that a NACK is received.

Figure 29:
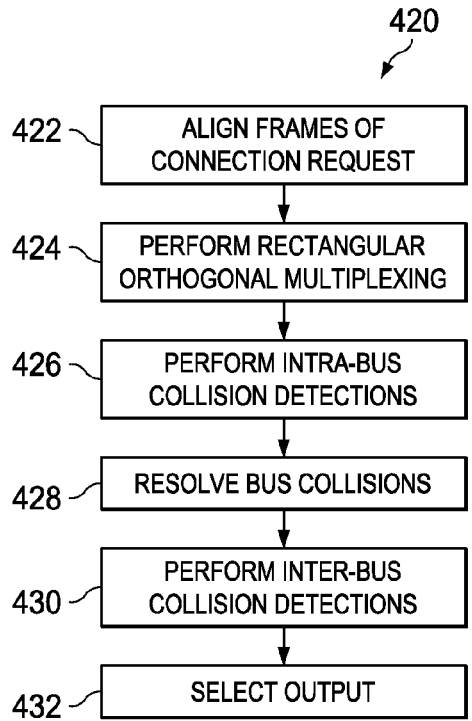
FIG. 29 illustrates a flowchart of an embodiment method of controlling an electronic switch.

FIG. 29 illustrates flowchart 420 for an embodiment method of controlling an electronic switch. Initially, in step 422, connection request frames are received and aligned.

Next, in step 424, rectangular orthogonal multiplexing is performed on the aligned connection request frames.

Then, in step 426, intra-bus collision detection is performed. The connection requests are written into specific portions of memory based on the timeslot and output. When the switch attempts to write to a slot which has already been written to, a contention is detected. When multiple concatenated containers are requested, multiple timeslots in the same output are requested, corresponding to the concatenation number.

In step 428, the intra-bus contention is resolved. One of the connections is selected, and the other requested connections for the same timeslot and output. NACKs are generated for rejected connections.

Then, in step 430, inter-bus contentions are detected. This may be performed in the electronic switch fabric.

In step 432, an output is selected by a selector switch. Outputs which are not selected are discarded. NACKs are generated for the rejected connection(s), and an ACK is generated for the selected connection.

Figure 30:
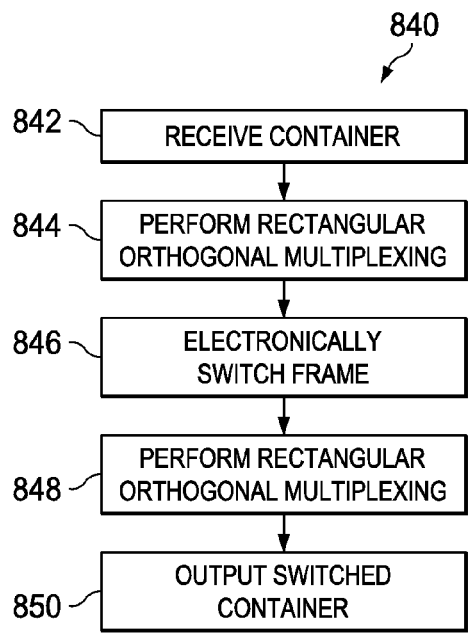
FIG. 30 illustrates a flowchart of an embodiment method of electronic switching.

FIG. 30 illustrates flowchart 840 for a method of electronic container switching. Initially, in step 842, a container is received. The container is converted from optical form to electrical form.

Next, in step 844, rectangular orthogonal multiplexing is performed on the incoming container stream.

Then, in step 846, the container is electronically switched, for example by a time switch. A matrixed switch, commutated switch, or matrixed commutated switch may be used. Also, the selected output is selected based on contention resolution. When multiple BPCs are used, the connection is held for multiple frames to switch the multiple concatenated BPCs.

Next, in step 848, rectangular orthogonal multiplexing is performed on the output switched container stream.

Finally, in step 850, the container is output. It is converted from electrical form to optical form, and transmitted to the destination packet combiner or TOR.

Figure 31:
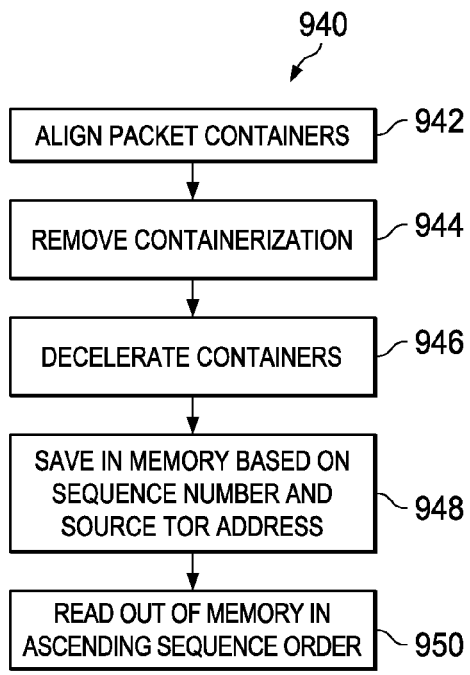
FIG. 31 illustrates a flowchart of an embodiment method of packet combining.

FIG. 31 illustrates flowchart 940 for a method of combining packet streams, for example a short packet stream and a long packet stream. Packets of a stream of long packets may be combined with packets of a stream of short packets in a packet combiner. In one example, the packet combiner is integrated in a destination TOR. Alternatively, the packet combiner may be a stand-alone device. The packets may be combined to re-establish the original packet order from the source TOR.

Initially, in step 942, the packet containers are aligned. The short packet containers and long packet containers may both be separately aligned. Master timing from the photonic switch, or from another source, such as the electronic switch, may be used to align the packet containers.

Next, in step 944, the containerization is removed. The header and/or footer are removed. For short packets, when concatenated BPCs are used, the original packet is reconstructed from the BPCs.

In step 946, the containers are decelerated. The containers may be read into a buffer at a first clock rate, and read out at a second clock rate, where the second clock rate is lower than the first clock rate. The decelerated packets may have the same clock rate that they originally had before acceleration in the packet splitter.

Then, in step 948, the packets are stored in memory. The stored packets are organized by source TOR and sequence number. For example, for each source TOR, the packets are stored in the order of their source number.

Finally, in step 950, the packets are read out of the memory in source number order. Thus, the packets are in their original order. Also, missing packets may be detected, when there is no packet in the memory for a given sequence number. When a packet is missing, the packet combiner may request that the missing packet be retransmitted by the packet combiner.

An embodiment method includes comparing a length of a first packet to a threshold, determining that the first packet is a short packet when the length of the first packet is less than the threshold, and determining that the first packet is a long packet when the length of the first packet is greater than or equal to the threshold. The method also includes when the first packet is a long packet placing the first packet in a long packet container and transmitting the long packet container to a photonic switch. Additionally, the method includes when the first packet is a short packet placing a first portion of the first packet in a first short packet container, where the first short packet container includes a sequence number, a source top-of-rack switch (TOR) address, and a destination TOR address and transmitting the first short packet container to an electronic switch.

In one embodiment, the source TOR address and destination TOR address have fewer than 64 bits. In other embodiments, the source TOR addresses and destination TOR addresses have 64 bits, 50 bits, 32 bits, or 16 bits each.

In another embodiment the short packet container further includes a concatenation sequence length number (CSL) and a basic payload container (BPC) position in sequence (BPS) number.

In an additional embodiment, the first portion of the first packet is an entirety of the first packet.

An embodiment further includes placing a second portion of the first packet in a second short packet container and transmitting the second short packet container to the electronic switch. For example, the first short packet container has a first header, where the first header has a first header size, where the second short packet container has a second header, where the second header has a second header size, and where the first header size is larger than the second header size. In another example, the second packet container includes a first trailer, and where the first packet container does not have a trailer. For example, the first trailer includes a validity check for the first short packet container and the second short packet container.

In another embodiment, the short packet container further includes a harmonic level number and a packet payload length number.

An embodiment switching structure includes an electronic switch fabric, where the electronic switch fabric includes a first plurality of rectangular orthogonal multiplexers, where the first plurality of rectangular orthogonal multiplexers is configured to receive a first plurality of container streams to produce a plurality of organized containers and a plurality of electronic switching cells electrically coupled to the first plurality of rectangular orthogonal multiplexers, where a switching cell of the plurality of switching cells is a time division multiplexing (TDM) switch, and where the plurality of electronic switching cells is configured to switch the plurality of organized containers to produce a plurality of switched containers. The electronic switching fabric also includes a second plurality of rectangular orthogonal multiplexers electrically coupled to the plurality of electronic switching cells, where the second plurality of rectangular orthogonal multiplexers are configured to output a plurality of output containers.

An embodiment further includes a photonic switch fabric, where the photonic switch fabric is configured to receive a second plurality of container streams from a packet splitter, and where the electronic switching fabric is configured to receive the first plurality of container streams from the packet splitter.

In an embodiment, the plurality of electronic switching cells is a matrixed switch.

In another embodiment, the plurality of electronic switching cells is a commutated switch.

In an additional embodiment, the plurality of electronic switching cells is a matrixed commutating switch.

In a further embodiment where the switching cell includes a data memory (DM) and a connection memory (CM) stack.

In another embodiment, the switching cell is a double buffered TDM switch.

An embodiment method includes receiving a first address request for a first output port in a first timeslot on a first bus and receiving a second address request for the first output port in the first timeslot on the first bus. The method also includes detecting a collision between the first address request and the second address request and writing the first address request to an electronic switching structure. Additionally, the method includes transmitting a negative acknowledgment message (NACK) corresponding to the second address request.

An embodiment, further includes writing a third address request for the first output on a second bus to the electronic switching structure, detecting a collision between the third address and the first address, and selecting an output container corresponding to the third address.

In an embodiment, detecting the collision between the first address request and the second address request includes selecting a first position in a memory for the first address request in accordance with the first timeslot and the first output, writing a first value in the first position in the memory, and selecting the first position in the memory for the second address request. This embodiment may further include selecting a third position in the memory for the first address request in accordance with a second timeslot and the first output, where the second timeslot is directly after the first timeslot.

An embodiment also includes transmitting an acknowledgment frame (ACK) corresponding to the first address request.

An embodiment method includes receiving, from an electronic switch, a first container, where the first container includes a first sequence number and extracting a first packet payload from the first container. The method also includes determining a first packet in accordance with the first packet payload and receiving, from a photonic switch, a second container, where the second container includes a second sequence number. Additionally, the method includes extracting a second packet from the second container and reconstructing a packet stream including the first packet and the second packet in accordance with the first sequence number and the second sequence number.

An embodiment also includes receiving, from the electronic switch, a third container and extracting a second packet payload from the second container, where determining the first packet includes forming the first packet in accordance with the first packet payload and the second packet payload.

An embodiment includes comparing a length of a first packet to a threshold, determining that the first packet is a short packet when the length of the first packet is less than the threshold, and determining that the first packet is a long packet when the length of the first packet is greater than or equal to the threshold. The method also includes when the first packet is a long packet placing the packet in a long packet container, where the long packet container only contains one packet and transmitting the long packet container to a first synchronous framed switch. Additionally, the method includes when the first packet is a short packet placing the packet in a short packet container, where the short packet container only contains one packet and transmitting the short packet container to a second synchronous framed switch.

In an embodiment, the first synchronous framed switch is a photonic switch and the second synchronous framed switch is an electronic switch.

In another embodiment, the first synchronous framed switch is directly addressable.

An embodiment further includes transmitting a connection request to the second synchronous framed switch, where transmitting the short packet container includes transmitting the short packet container after transmitting the connection request and before receiving, from the second synchronous framed switch, an acknowledgment frame (ACK) or a negative acknowledgment frame (NACK).

Another embodiment also includes storing a copy of the packet.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
comparing a first length of a first packet to a threshold;
determining that the first packet is a short packet in response to the first length of the first packet being less than the threshold;
comparing a second length of a second packet to the threshold;
determining that the second packet is a long packet in response to the second length of the second packet being greater than or equal to the threshold;
placing the second packet in a long packet container;
transmitting the long packet container to a photonic switch;
placing a first portion of the first packet in a first short packet container, the first short packet container comprising:
a sequence number,
a source top-of-rack switch (TOR) address,
a destination TOR address; and
a concatenation sequence length number (CSL) and a basic payload container (BPC) position in sequence (BPS) number, or a harmonic level number and a packet payload length number; and
transmitting the first short packet container to an electronic switch.

2. The method of claim 1, wherein the first portion of the first packet is an entirety of the first packet.

3. The method of claim 1, further comprising:
placing a second portion of the first packet in a second short packet container; and
transmitting the second short packet container to the electronic switch.

4. The method of claim 3, wherein the first short packet container has a first header, wherein the first header has a first header size, wherein the second short packet container has a second header, wherein the second header has a second header size, and wherein the first header size is larger than the second header size.

5. The method of claim 3, wherein the second short packet container comprises a first trailer, and wherein the first short packet container does not have a trailer.

6. The method of claim 5, wherein the first trailer comprises a validity check for the first short packet container and the second short packet container.

7. The method of claim 1, wherein the photonic switch is directly addressable.

8. The method of claim 1, further comprising:
transmitting a connection request to the electronic switch before transmitting the first short packet container; and
receiving, from the electronic switch, an acknowledgment frame (ACK) or a negative acknowledgment frame (NACK) after transmitting the connection request.

9. The method of claim 1, further comprising storing a copy of the first and second packets.

10. A method comprising:
receiving, from an electronic switch, a first container, the first container comprising:
a first sequence number; and
a concatenation sequence length number (CSL) and a basic payload container (BPC) position in sequence (BPS) number, or a harmonic level number and a packet payload length number;
extracting a first packet payload from the first container;
forming a first packet using the first packet payload;
receiving, from a photonic switch, a second container, the second container comprising a second sequence number;
extracting a second packet from the second container; and
reconstructing a packet stream comprising the first packet and the second packet in accordance with the first sequence number, the second sequence number, and either the CSL and the BPS number, or the harmonic level number and the packet payload length number.

11. The method of claim 10, further comprising:
receiving, from the electronic switch, a third container; and
extracting a second packet payload from the second container, wherein forming the first packet comprises forming the first packet using the first packet payload and the second packet payload.

12. The method of claim 11, wherein the third container comprises a third sequence number, and wherein forming the first packet comprises forming the first packet in accordance with the first sequence number and the third sequence number.

13. A method comprising:
comparing a first length of a first packet to a threshold;
determining that the first packet is a short packet in response to the first length of the first packet being less than the threshold;
comparing a second length of a second packet to the threshold;
determining that the second packet is a long packet in response to the second length of the second packet being greater than or equal to the threshold;
placing the second packet in a long packet container, the long packet container only containing one packet;
transmitting the long packet container to a first synchronous framed switch;
placing the first packet in a short packet container, the short packet container only containing one packet, the short packet container further comprising:
a concatenation sequence length number (CSL) and a basic payload container (BPC) position in sequence (BPS) number, or a harmonic level number and a packet payload length number; and
transmitting the short packet container to a second synchronous framed switch.

14. The method of claim 13, wherein the first synchronous framed switch is a photonic switch and the second synchronous framed switch is an electronic switch.

15. The method of claim 13, wherein the first synchronous framed switch is directly addressable.

16. The method of claim 13, further comprising transmitting a connection request to the second synchronous framed switch, wherein transmitting the short packet container comprises transmitting the short packet container after transmitting the connection request and before receiving, from the second synchronous framed switch, an acknowledgment frame (ACK) or a negative acknowledgment frame (NACK).

17. The method of claim 13, further comprising storing a copy of the first and second packets.

18. The method of claim 13, wherein the short packet container comprises a trailer having a validity check for the short packet container.

\* \* \* \* \*